(12) United States Patent
Szeto et al.

(10) Patent No.: US 10,446,948 B2
(45) Date of Patent: Oct. 15, 2019

(54) CONNECTORS WITH MOVABLE MAGNETIC COMPONENTS AND METHOD OF CONNECTING DEVICES

(71) Applicant: NANOPORT TECHNOLOGY INC., Markham (CA)

(72) Inventors: Timothy Jing Yin Szeto, Markham (CA); Jeremy Zhi-Qiao Chan, Markham (CA)

(73) Assignee: NANOPORT TECHNOLOGY INC., Markham (CA)

( * ) Notice: Subject to any disclaimer, the term of this patent is extended or adjusted under 35 U.S.C. 154(b) by 350 days.

(21) Appl. No.: 15/520,072

(22) PCT Filed: Oct. 20, 2015

(86) PCT No.: PCT/CA2015/000545
§ 371 (c)(1),
(2) Date: Apr. 18, 2017

(87) PCT Pub. No.: WO2016/061662
PCT Pub. Date: Apr. 28, 2016

(65) Prior Publication Data
US 2018/0337467 A1 Nov. 22, 2018

Related U.S. Application Data

(60) Provisional application No. 62/140,119, filed on Mar. 30, 2015, provisional application No. 62/065,969, filed on Oct. 20, 2014.

(51) Int. Cl.
*H01R 27/00* (2006.01)
*H01R 9/05* (2006.01)
(Continued)

(52) U.S. Cl.
CPC ............... *H01R 9/05* (2013.01); *G06F 1/16* (2013.01); *G06F 1/1616* (2013.01);
(Continued)

(58) Field of Classification Search
CPC ...... H01R 9/05; H01R 43/16; H01R 13/6205; H01R 11/30; H01R 13/629; G06F 1/1683;
(Continued)

(56) References Cited

U.S. PATENT DOCUMENTS 5,829,987 A  11/1998 Fritsch et al.
7,311,526 B2 * 12/2007 Rohrbach .......... H01R 13/6205
                                                      439/39
(Continued)

FOREIGN PATENT DOCUMENTS

CN  101408781 A   4/2009
CN  101409029 A   4/2009
(Continued)

*Primary Examiner* — Jean F Duverne
(74) *Attorney, Agent, or Firm* — Reno Lessard; Norton Rose Fulbright Canada LLP

(57) ABSTRACT

A connector for an electronic device has a housing with a peripheral surface and guides defining first and second paths. The second path extends from a first location proximate the peripheral surface to a second location farther from the peripheral surface and closer to the first path. A magnetic contact assembly in the housing is magnetically movable along the first path between a first position for joining the connector in data communication with an adjacent connector, and a second position withdrawn from the peripheral surface. A magnet in the housing and is movable by attraction to an adjacent connector along the second path, to magnetically hold the connector to an adjacent connector. The guides are configured so that the magnet and the
(Continued)

magnetic contact assembly magnetically bias one another inwardly along the first and second paths.

17 Claims, 59 Drawing Sheets

(51) Int. Cl.
  *H01R 13/62* (2006.01)
  *H01R 43/16* (2006.01)
  *G06F 1/16* (2006.01)
  *H01R 11/30* (2006.01)
  *H04M 1/02* (2006.01)

(52) U.S. Cl.
  CPC .......... *G06F 1/1626* (2013.01); *G06F 1/1681* (2013.01); *G06F 1/1683* (2013.01); *H01R 11/30* (2013.01); *H01R 13/6205* (2013.01); *H01R 43/16* (2013.01); *H04M 1/022* (2013.01); *H04M 2250/16* (2013.01)

(58) Field of Classification Search
  CPC .... G06F 1/1681; G06F 1/1626; G06F 1/1616; G06F 1/16; H04M 1/022; G02B 6/3886
  USPC ........................................................ 439/217
  See application file for complete search history.

(56) References Cited

U.S. PATENT DOCUMENTS

| | | | | |
|---|---|---|---|---|
| 9,791,634 B2 * | 10/2017 | DiFonzo | .............. | G02B 6/3886 |
| 10,014,624 B2 * | 7/2018 | Chun | ................. | H01R 13/6205 |
| 10,050,378 B2 * | 8/2018 | Szeto | .................... | H01R 11/30 |
| 10,177,491 B2 * | 1/2019 | Davies | ................ | H01R 13/629 |

FOREIGN PATENT DOCUMENTS

| | | |
|---|---|---|
| CN | 202455400 U | 12/2011 |
| CN | 203086539 U | 1/2013 |
| JP | H08267974 A | 10/1996 |
| JP | 2003504815 A | 2/2003 |

\* cited by examiner

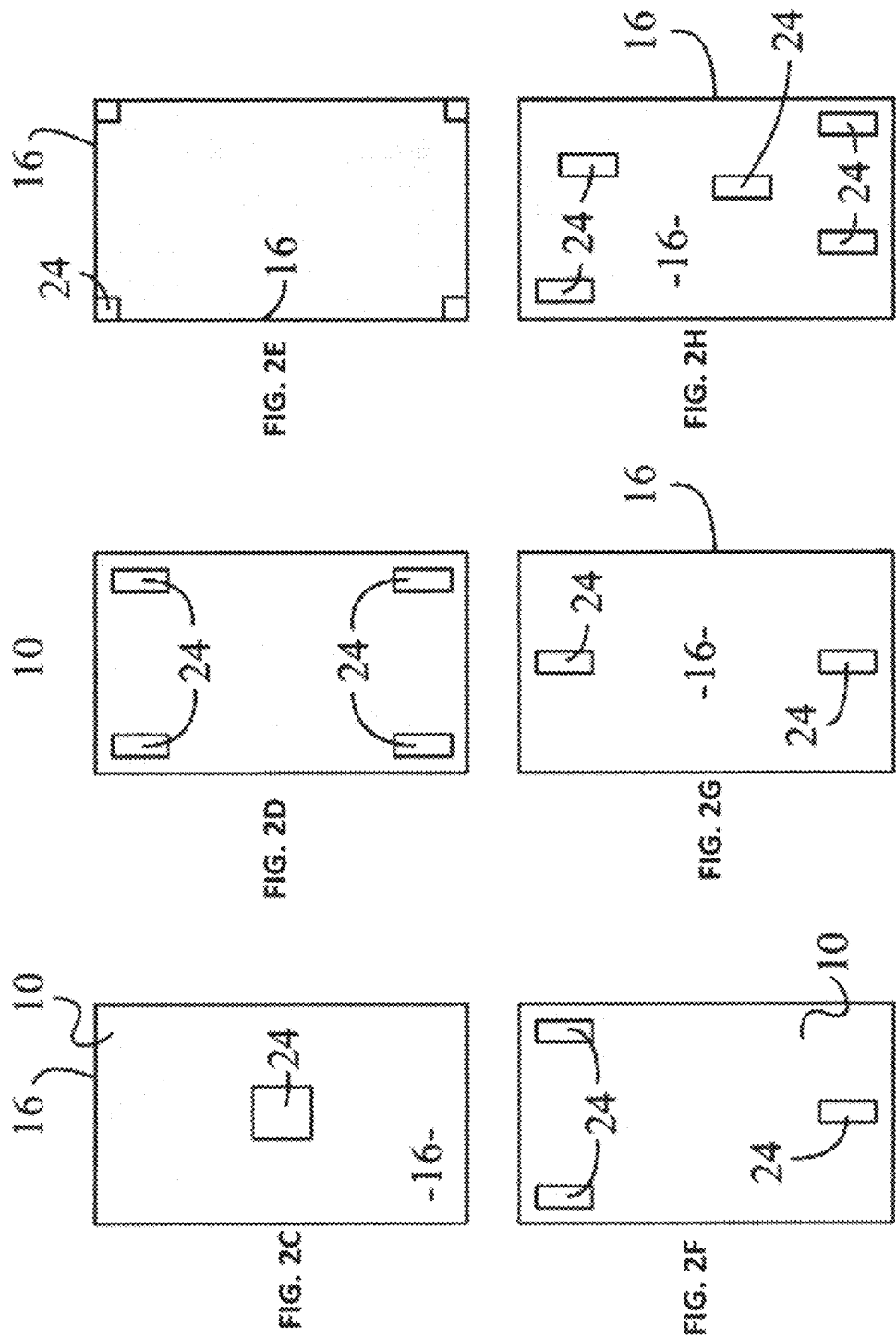

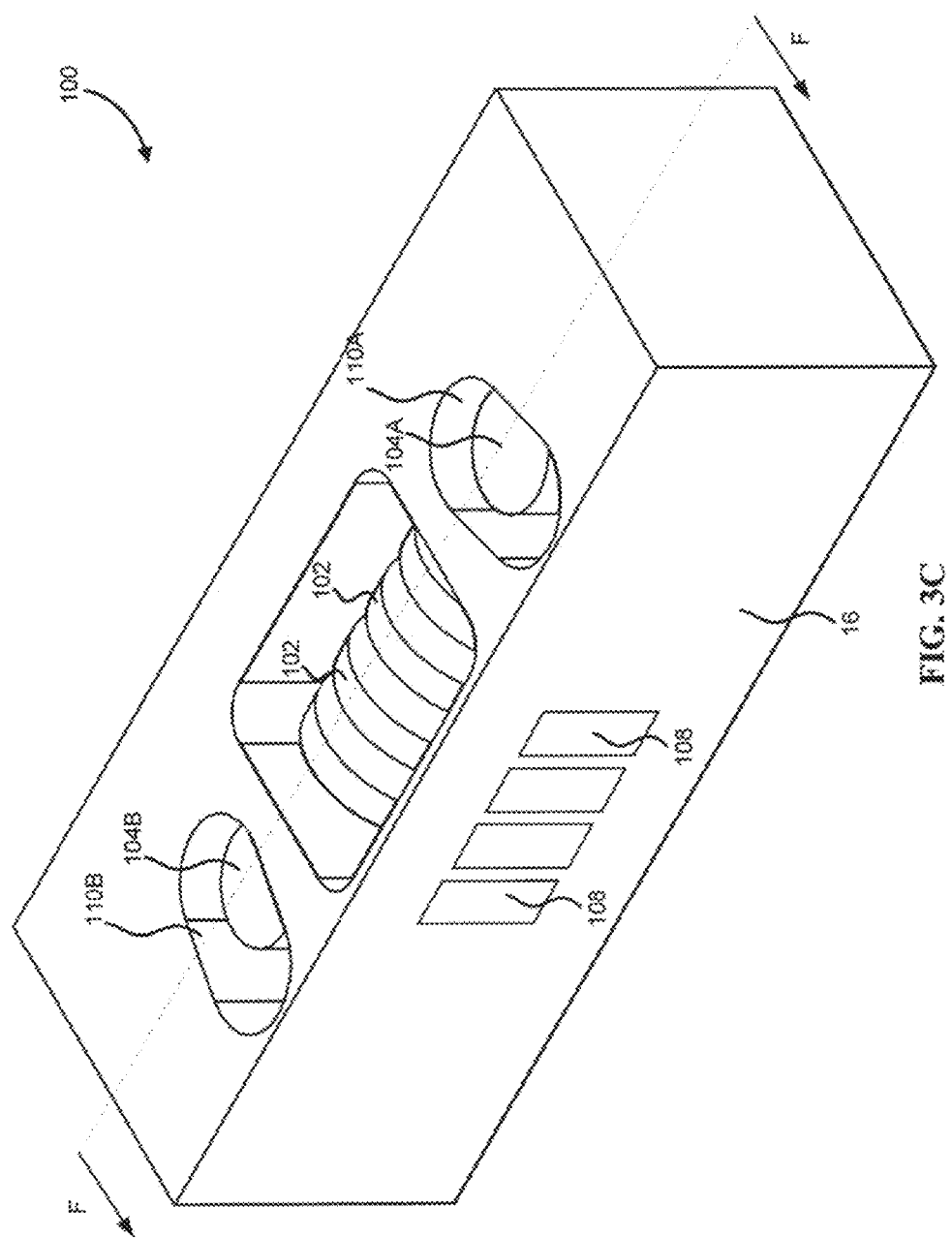

Section F-F

Section F-F

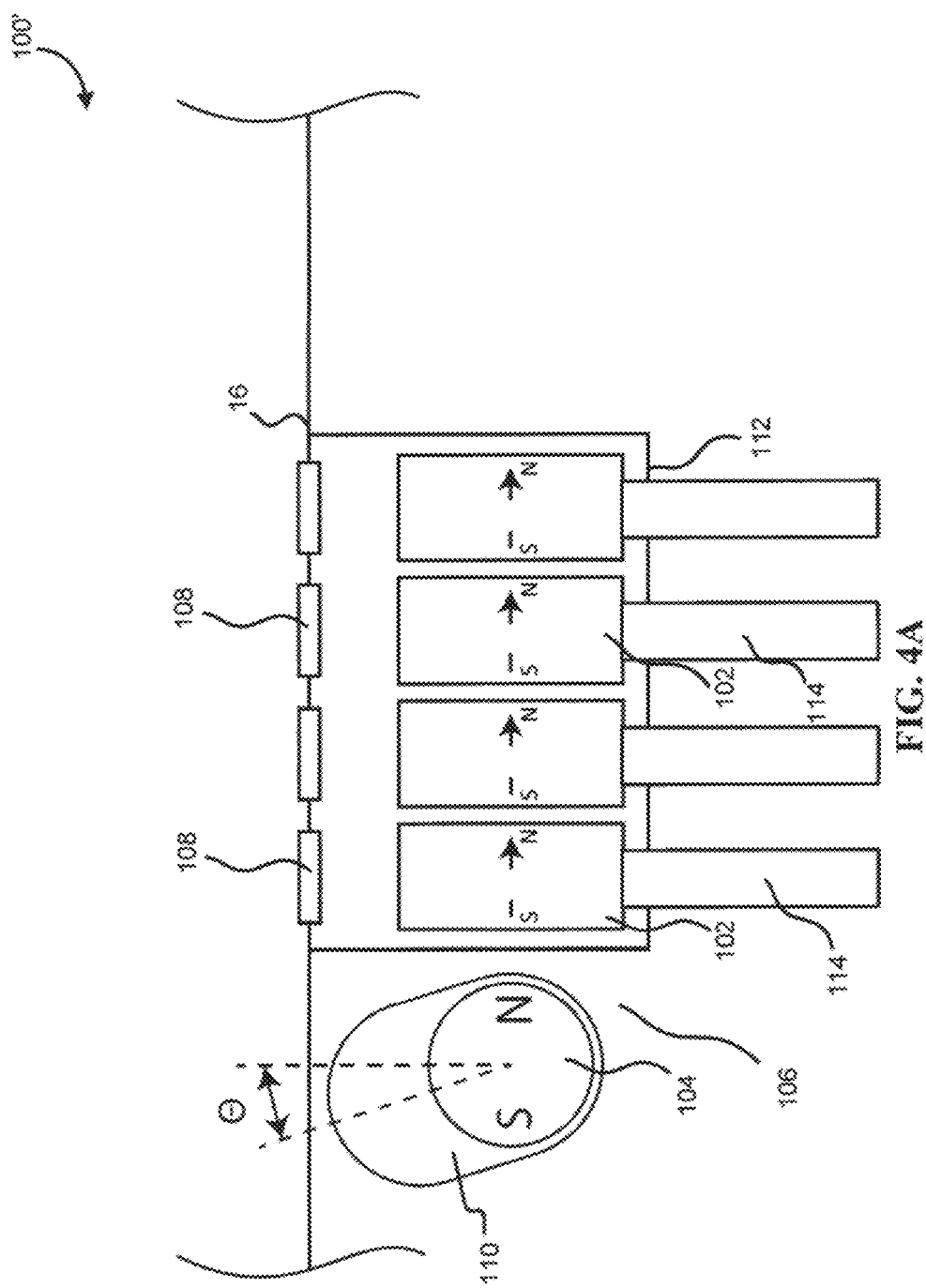

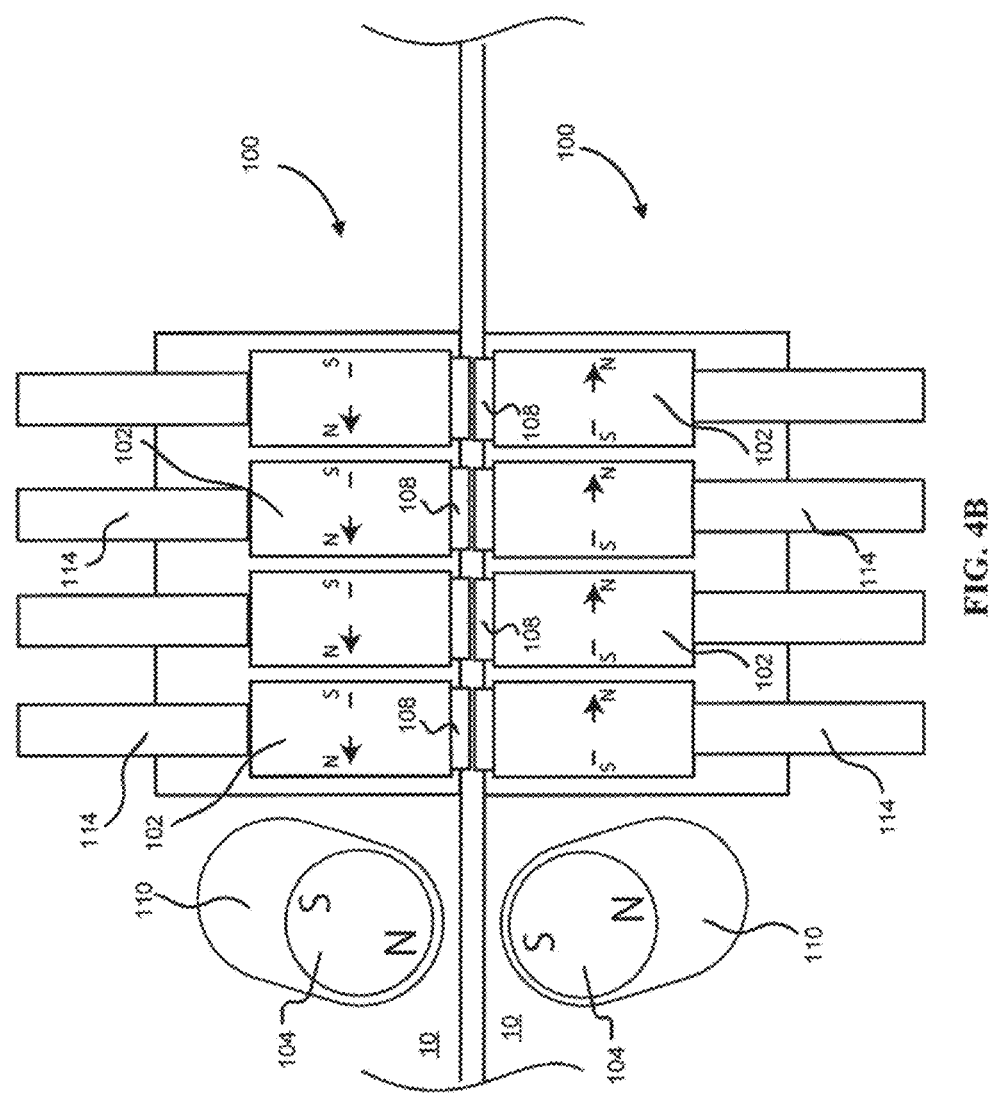

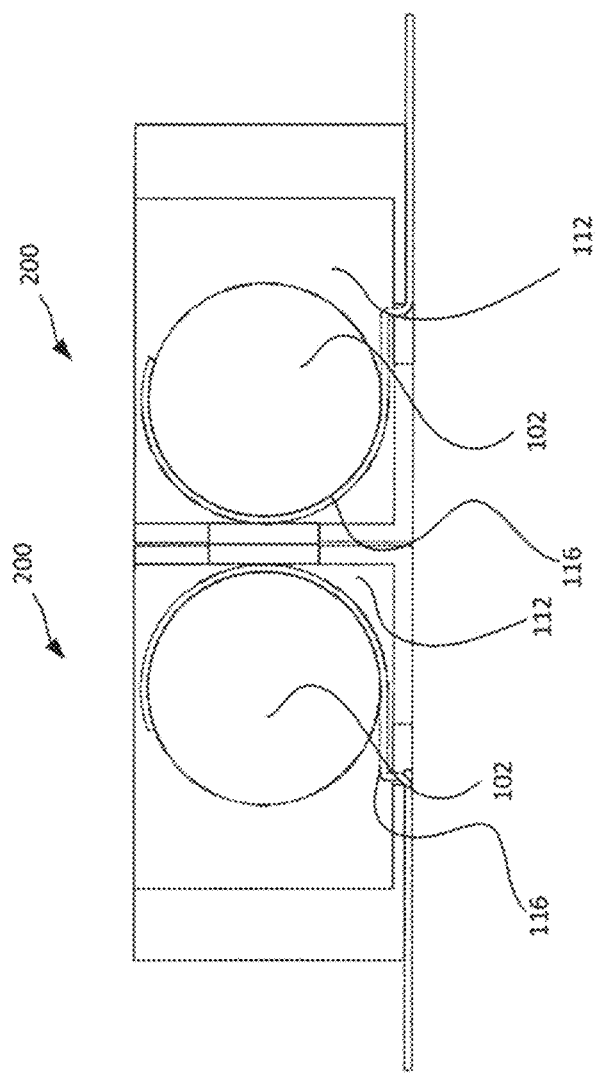

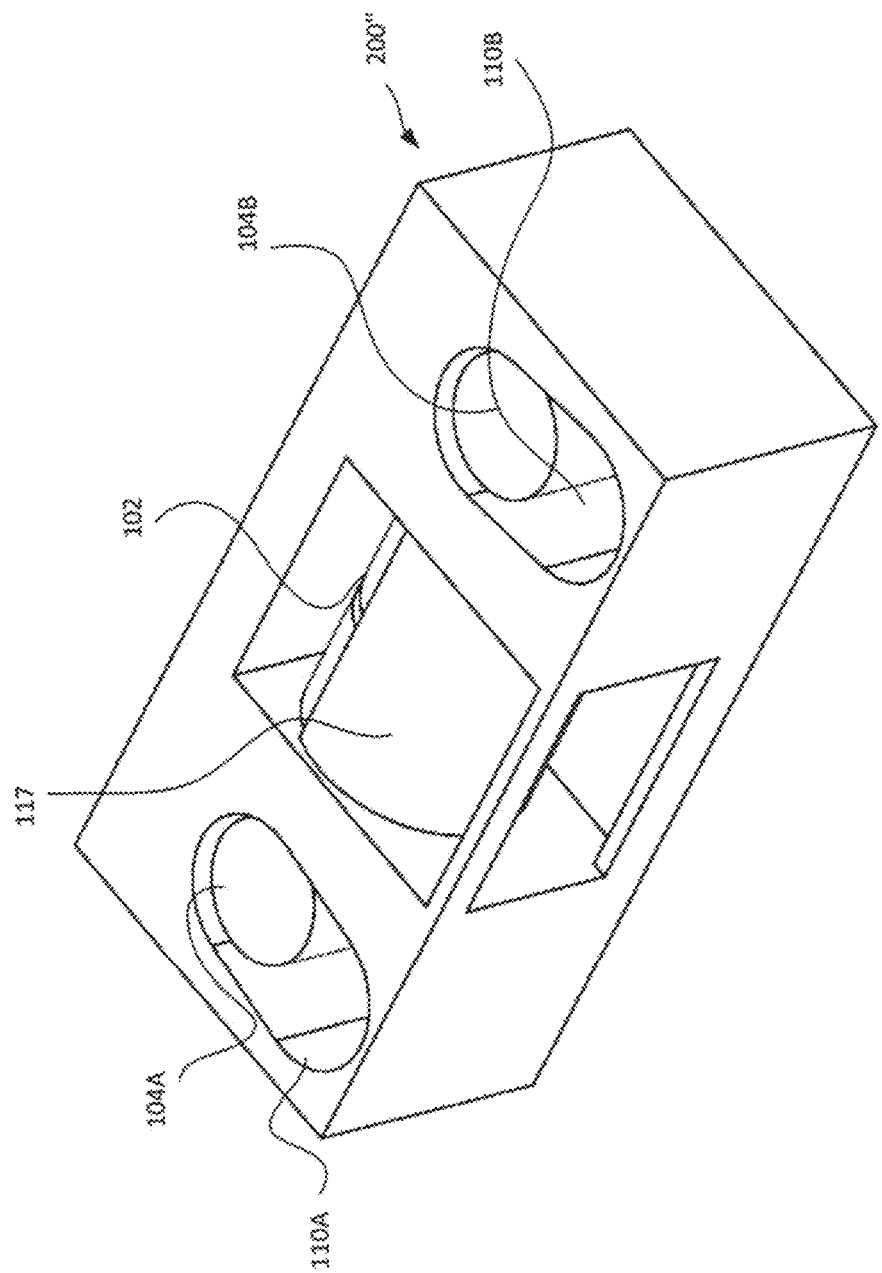

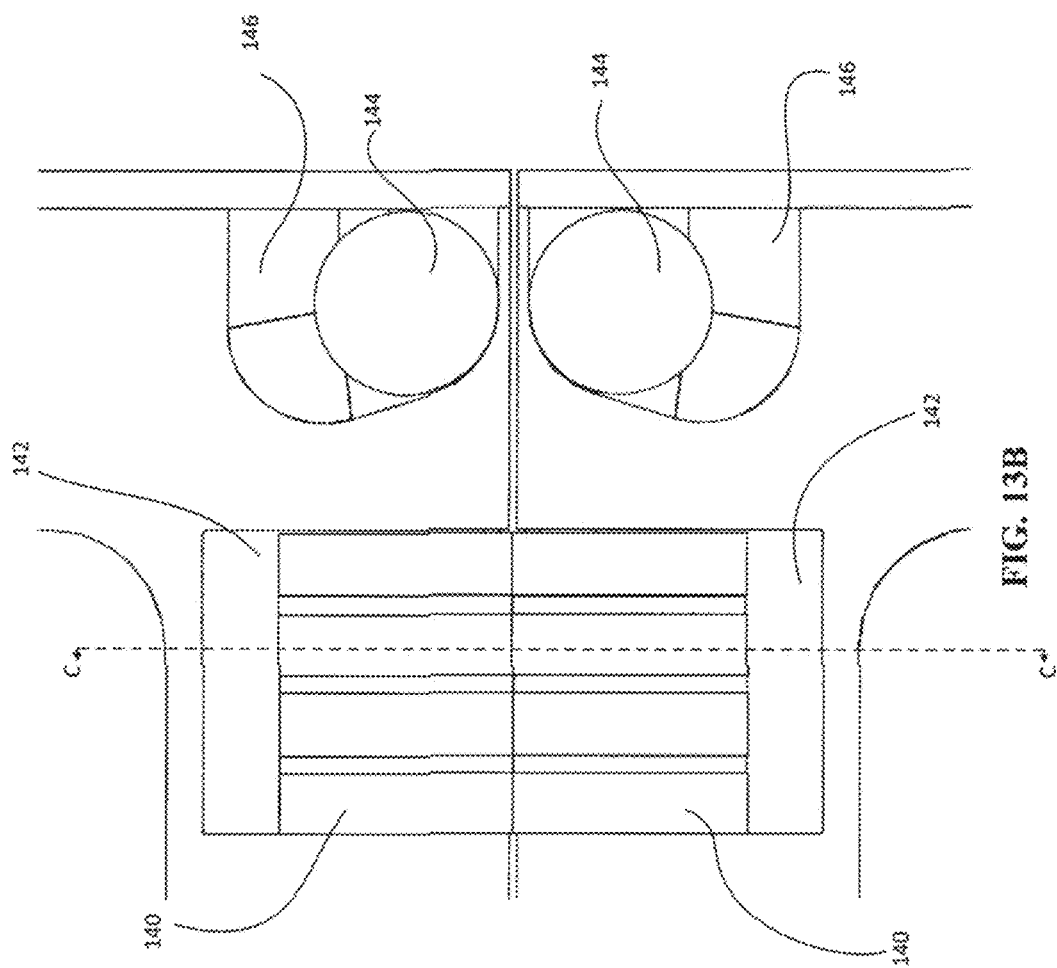

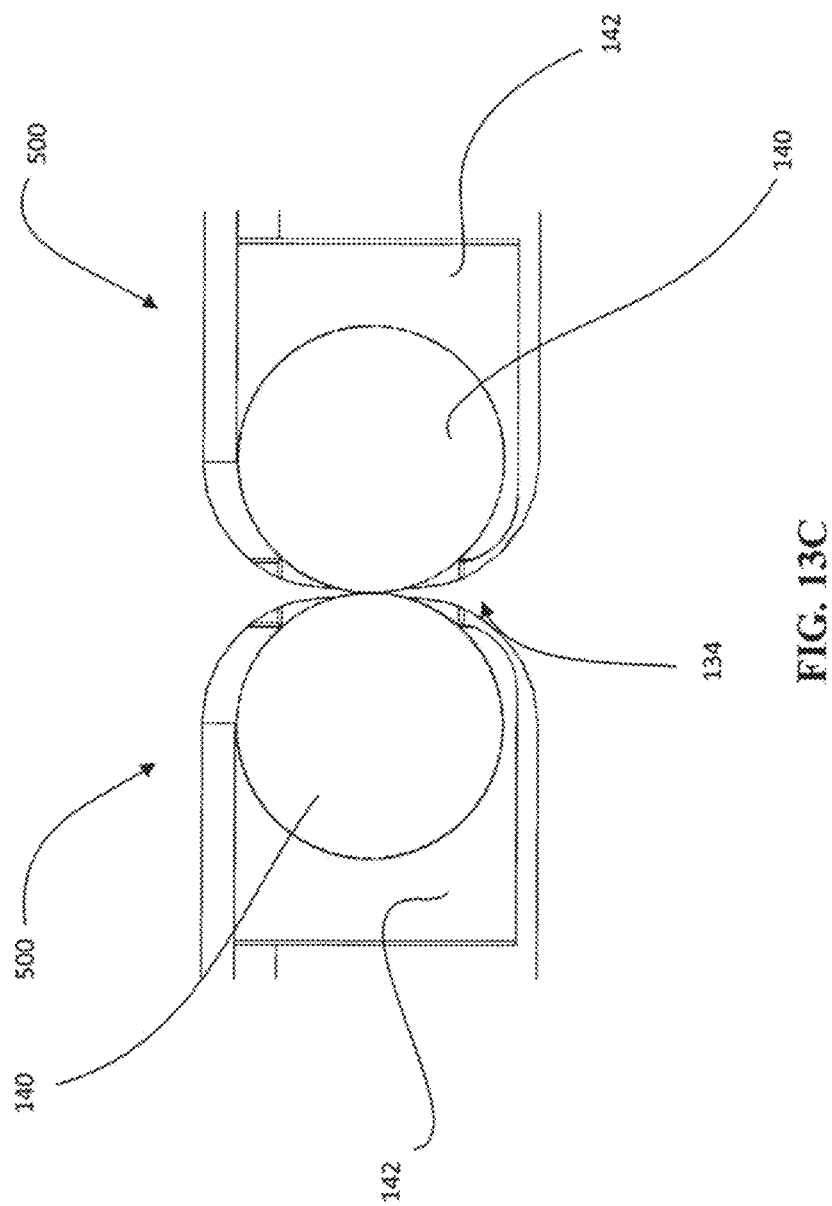

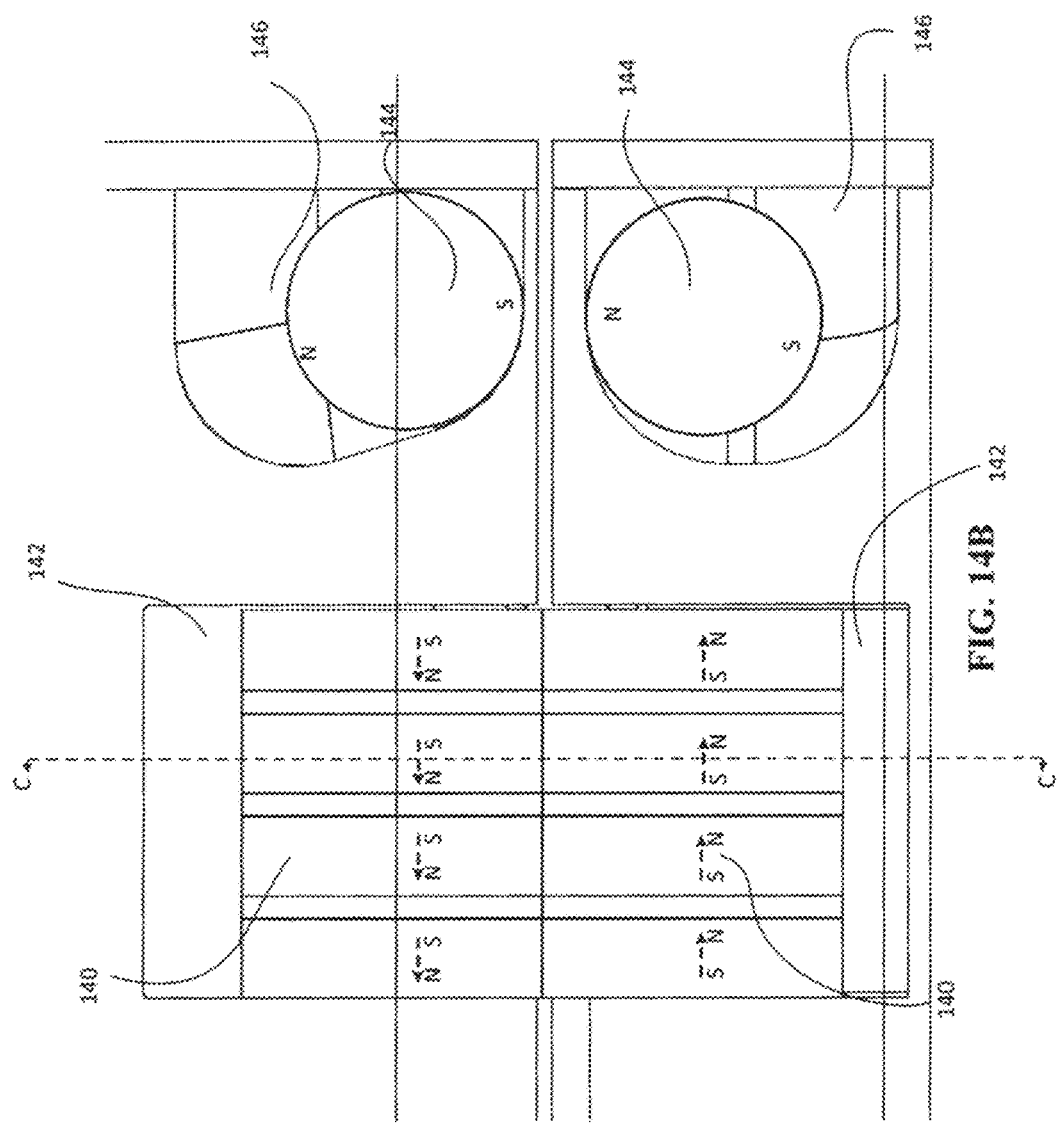

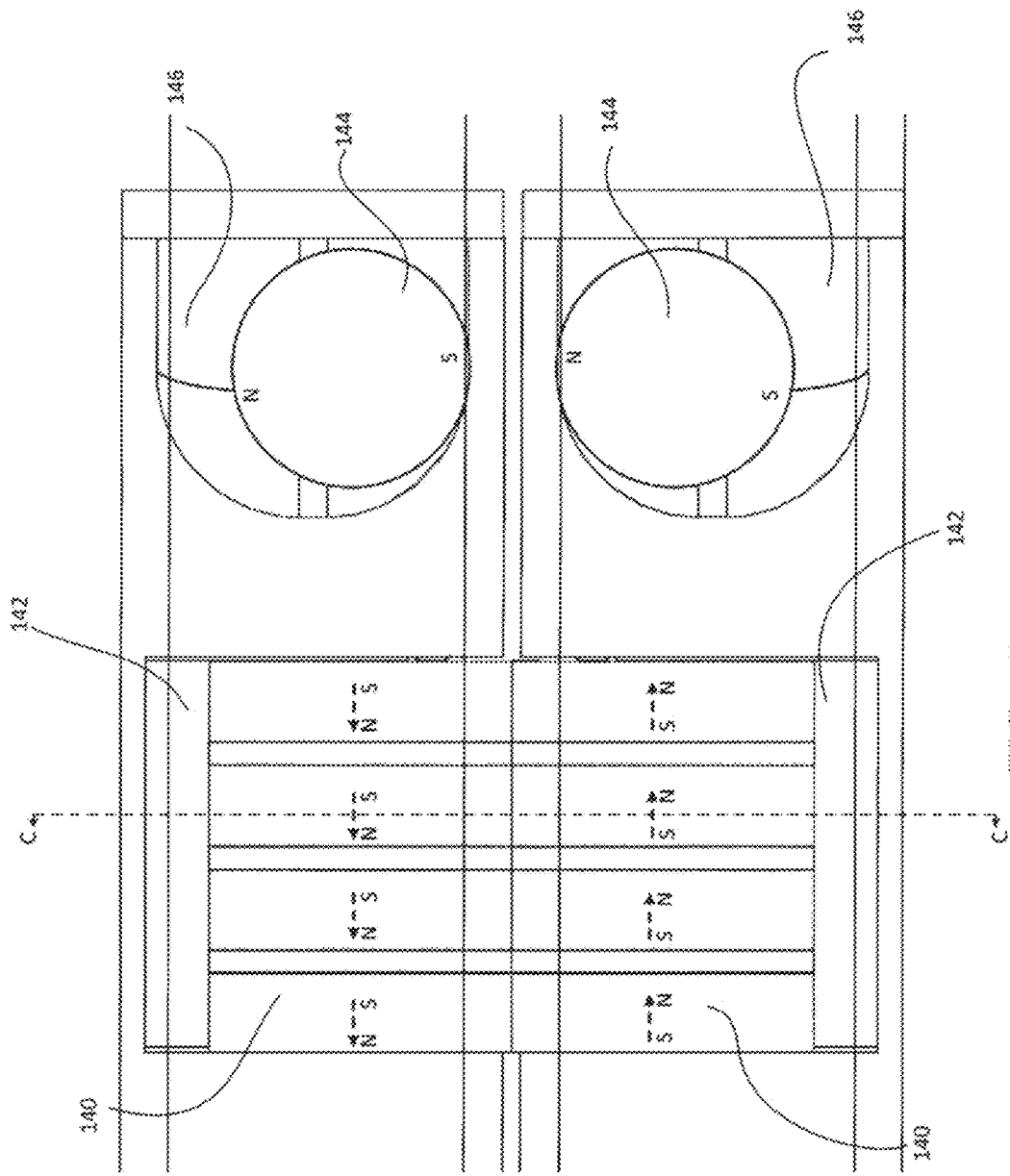

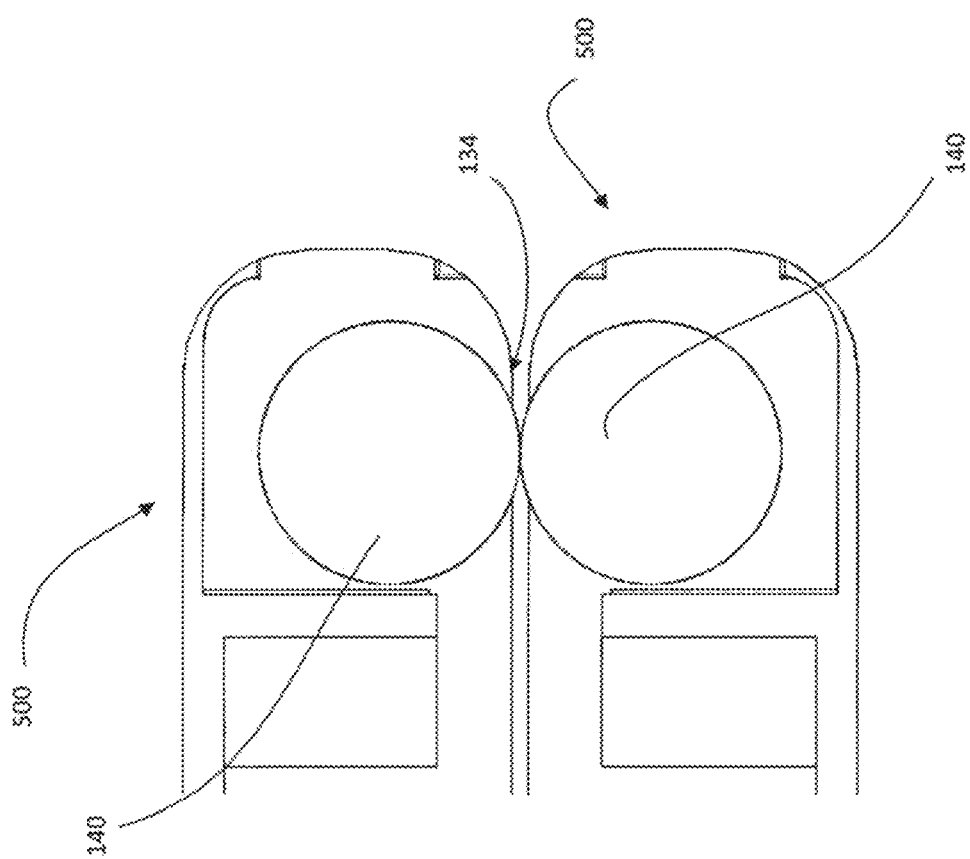

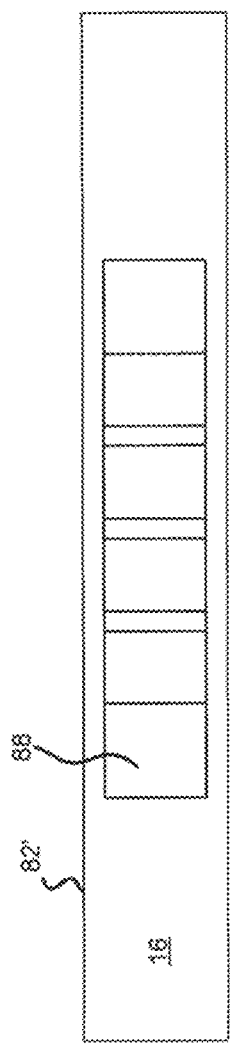
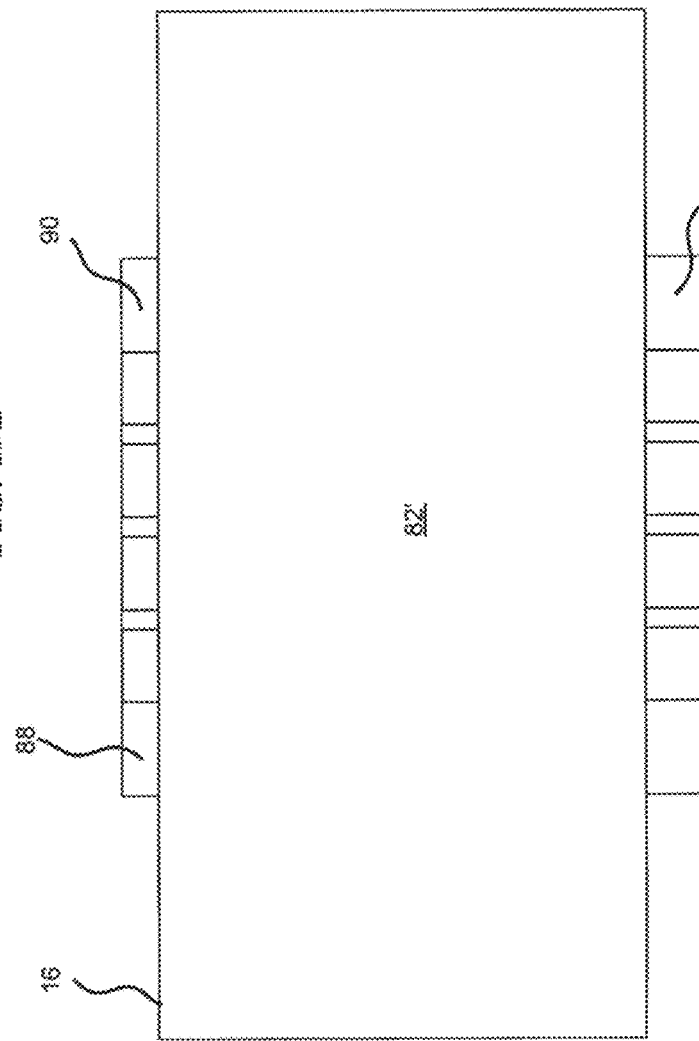
FIG. 19B
FIG. 19C

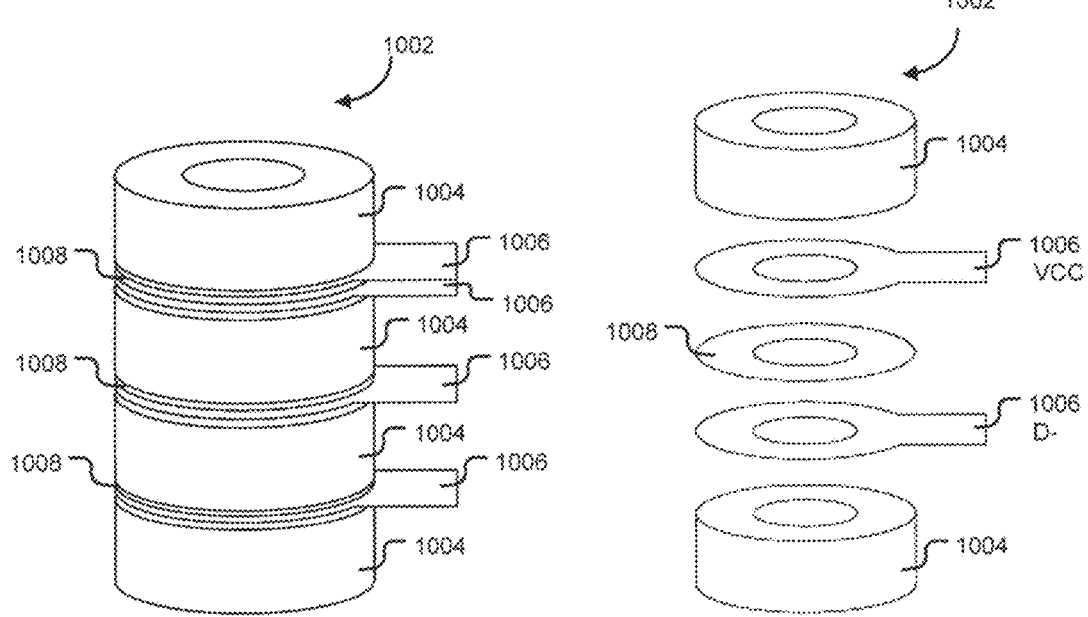
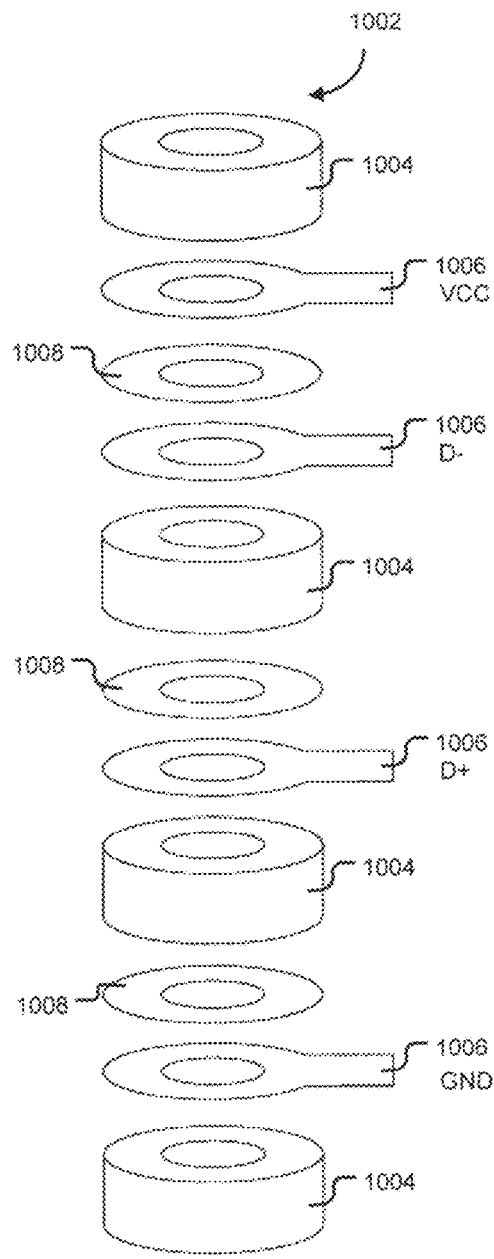
FIG. 21A
FIG. 21B

CONNECTORS WITH MOVABLE MAGNETIC COMPONENTS AND METHOD OF CONNECTING DEVICES

CROSS-REFERENCE TO RELATED APPLICATIONS

This application claims priority from U.S. provisional patent application No. 62/065,969, filed Oct. 20, 2014 and U.S. provisional patent application No. 62/140,119, filed Mar. 30, 2015 both of which are incorporated herein by reference in their entirety.

FIELD

This disclosure relates to magnetic connectors for connecting devices to one another.

BACKGROUND

Mobile electronic devices (e.g. mobile phones, tablet computers, laptop computers, or the like) are usually provided with a plurality of connection options which allow the devices to communicate with one another electronically, or to supply energy to the internal battery to recharge the battery, or to add functionality to the device, such as connecting a peripheral device (e.g., keyboard, mouse, speakers, or the like).

Connection of devices mechanically and/or electrically integrates the multiple devices to provide complementary functions. To establish such connections it is necessary to orientate the devices relative to one another and to facilitate mechanical and/or electrical communication between the devices, e.g., by way of a contacts, ports, sockets, and other interfaces, which may be collectively referred to as connectors. The relative orientation of the devices is obtained through mechanical connections. It is desirable for these mechanical connections to be robust, simple to use, and aesthetically pleasing.

Electrical communication between the devices is typically provided either through wires or through wireless communications. Wires or cables are cumbersome to carry and increase the physicality of the devices. Provision must also be made on the device to permit connection of the cables to the device, which again presents aesthetic challenges to the design of the device. Wireless connections are less secure, with the possibility of eavesdropping on communications, require more energy and therefore consume more power from the battery and are subject to interference from external sources.

Therefore, it is desired to provide an improved connector that obviates or mitigates some or all of the above disadvantages.

SUMMARY

An example connector for an electronic device, comprises: a housing having a peripheral surface; first and second guides defining first and second paths, respectively, within the housing; a magnetic contact assembly received in the housing, the contact assembly magnetically movable along the first path between a first, extended position for joining the connector in data communication with an adjacent connector, and a second position withdrawn from the peripheral surface; a magnet received in the housing, and movable by attraction to an adjacent connector along the second path, from a retracted position to an extended position closer to the peripheral surface and farther from the first path for magnetically holding the connector to the adjacent connector; the second channel configured so that the magnet and the magnetic contact assembly magnetically bias one another along the paths to the retracted position and the second position, respectively.

A method of connecting electronic devices, comprises: positioning a connector of a first device adjacent a connector of a second device; magnetically drawing a magnet of the first device toward the second device to magnetically hold the first and second devices together, thereby overcoming a magnetic bias between the magnet and a contact assembly of the first device; and magnetically drawing the contact assembly toward the second device to form a data connection.

BRIEF DESCRIPTION OF THE DRAWINGS

Embodiments of the invention will now be described by way of example only with reference to the accompanying drawings in which:

FIGS. 2C, 2D, 2E, 2F, 2G and 2H are schematic views showing locations of connectors on an electronic device;

FIG. 3C is a perspective view of the connector of FIG. 3A;

FIG. 4A is a top view of another connector with a biasing side magnet; and

FIG. 4B is a schematic view of two connectors of FIG. 4A when engaged;

FIGS. 5D and 5E are top and side cross-sectional views, respectively, of two connectors of FIG. 5A when engaged;

FIGS. 6C and 6D are perspective views of another connector;

FIGS. 13B and 13C are cross-sectional views of the connectors of FIG. 13A;

FIGS. 14B and 14C are cross-sectional views of the connectors of FIG. 14A;

FIGS. 15B and 15C are cross-sectional views of the connectors of FIG. 15A;

FIGS. 19A, 19B and 19C are perspective, front and top views, respectively, of another connector;

FIG. 21A is side view of a connector assembly;

FIG. 21B is an exploded side view of the connector assembly of FIG. 21A;

DETAILED DESCRIPTION

Figure 1A:
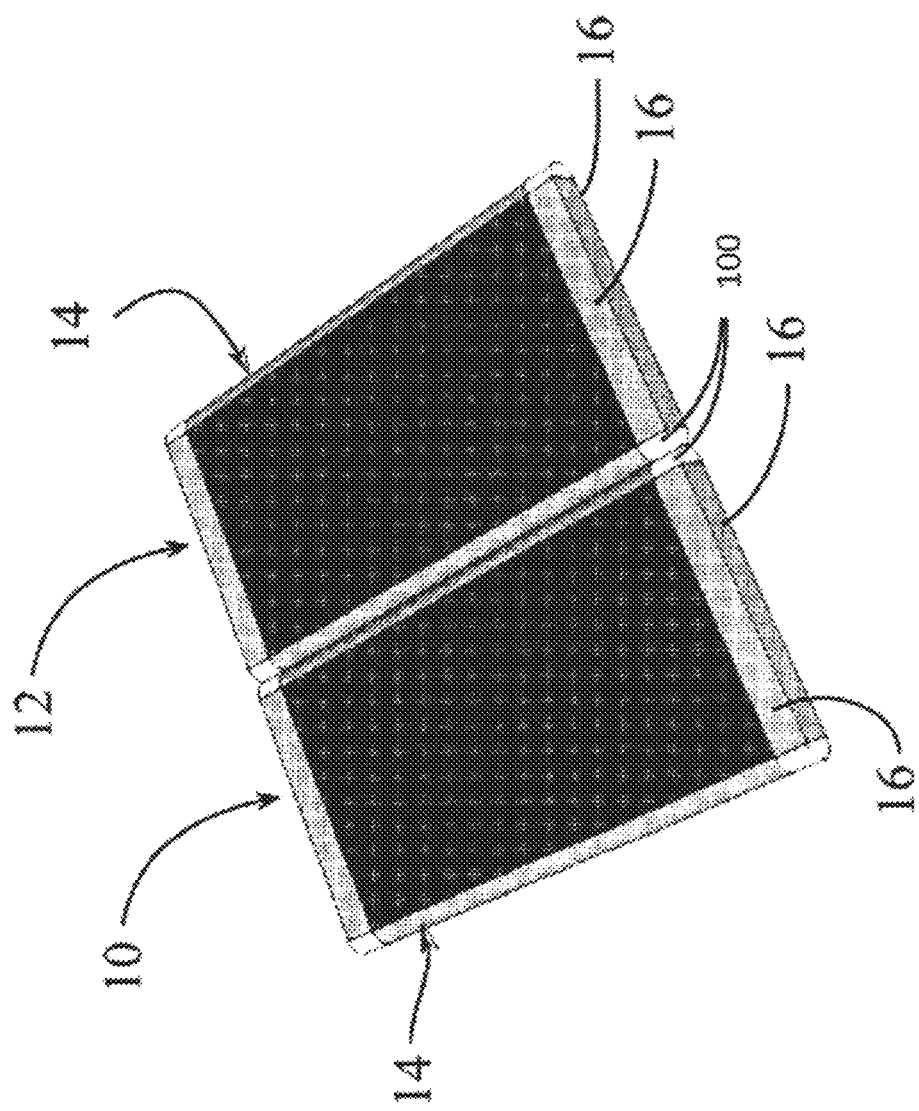
FIGS. 1A, 1B, and 1C are perspective views of a pair of electronic devices, in three respective configurations.
Figure 1B:
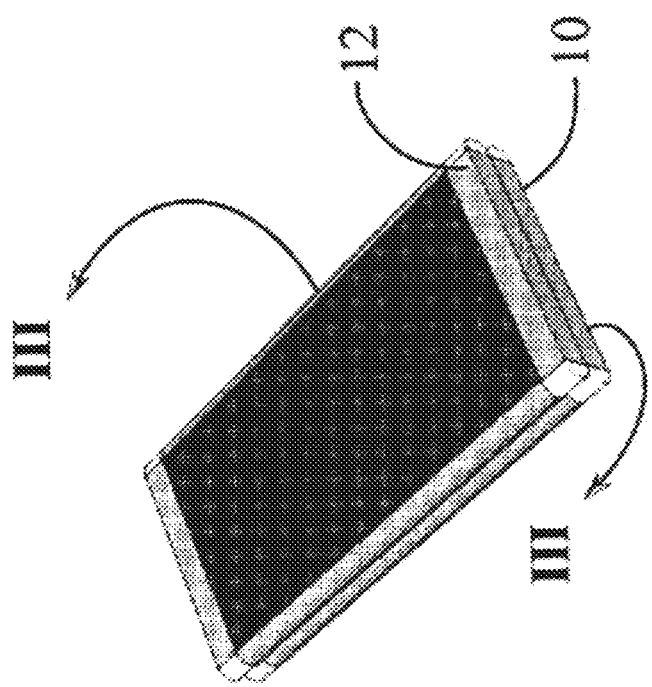
Figure 1C:
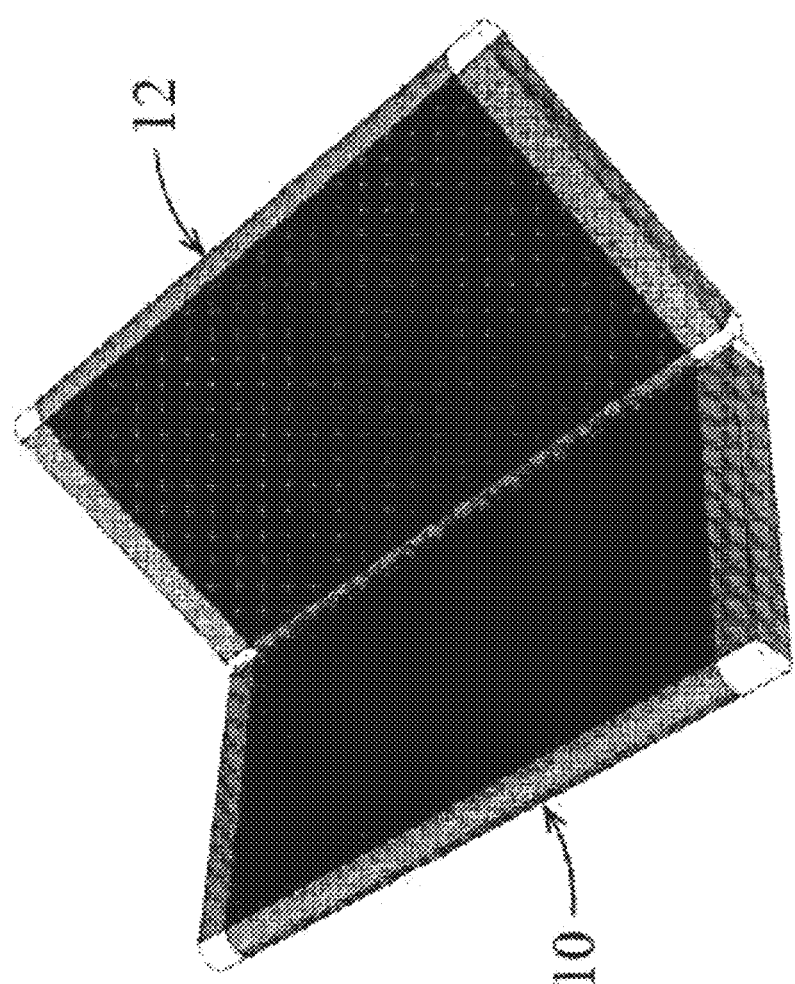

Referring now to FIGS. 1A, 1B and 1C, a pair of electronic devices 10, 12 each include a housing 14 defined by contiguous external surfaces 16. The devices 10, 12 may be any electronic devices that interface with one another and provide complementary functions. As depicted, each device is a smartphone. In other embodiments, one device may be smartphone and the other an accessory, such as a speaker. As further examples, one of the devices may be a smartphone and the other a viewing screen, or both may be viewing screens, or one may be a screen and the other a keyboard; one device may be a touchscreen enabled device and the other a router to communicate to the Internet, or one may be a camera and the other a smart phone to store images from the camera. These examples are non-limiting and it will be apparent that many mutually complementary devices exist that benefit from interconnection and interoperation.

As shown in FIG. 1A, the devices 10, 12 may be arranged side by side with a pair of surfaces 16, e.g. lateral surfaces, juxtaposed, typically when in use, or, as shown in FIG. 1B, in a stacked configuration with a different pair of surfaces, e.g. front and back surfaces, juxtaposed for storage or for alternative functions.

Devices 10, 12 include connectors 100 at each corner of their respective housings. As will be described in further detail below, each connector may include one or more magnets movably mounted within the respective device housing 14. Such magnets may be made from rare earth materials, such as Neodymium-Iron-Boron (NdFeB), Samarium-cobalt, as are generally available. Such magnets may also be made from iron, nickel or other suitable alloys. Alternatively or additionally, each connector may include one or more members susceptible to movement by magnetic fields, e.g. metallic or ferromagnetic members. Indicators may be incorporated into the housing 14 to provide an indication of the state of the connectors 100 (e.g., the location or orientation of a magnet). The indicators may be conveniently made from a magnetically transparent material, such as aluminum or copper that also enhances the aesthetics of the casing.

Devices 10, 12 may be used in a variety of positions. For example, two devices may be placed side-by-side, with lateral surfaces 16 abutting, as shown in FIG. 1A. Devices may also be placed on top of one another, so that a top or bottom surface of one device abuts a top or bottom surface of another device as shown in FIG. 1B. In some embodiments, devices may be placed side-by-side and pivoted relative to one another, as shown in FIG. 1C. In each of the depicted orientations, respective connectors 100 of the two devices are positioned proximate one another. Other orientations are possible, as will be apparent.

With the devices 10, 12 in the position of FIG. 1A, a connector 100 of one device 10 is positioned adjacent a connector 100 of the other device 12. In this position, the magnets of the connectors 100 are adjacent one another. So positioned, the magnets of the adjacent connectors 100 may interact to magnetically or electrically engage one another. For example, one or more of magnets may slide or rotate so that that the respective north and south poles of adjacent magnets are aligned. As further detailed below, in some embodiments, once the magnets are engaged, an electrical connection may be formed for providing data and/or power paths. In some embodiments, the electrical connection may be formed through contacts disposed on housings 14, the contacts being in electrical communication with respective magnets. In another embodiment, the magnets may protrude through respective housing such that they contact each other directly. In other embodiments, electrical connections may be formed through leads carried by the magnets, rather than the magnets themselves.

A significant magnetic force is applied between the components to retain the components in the desired configuration. The magnets of connectors 100 are mounted such that they are free to move under the magnetic forces present from an adjacent magnet and thereby provide the requisite magnetic field strength to retain the components in that configuration.

Figure 2A:
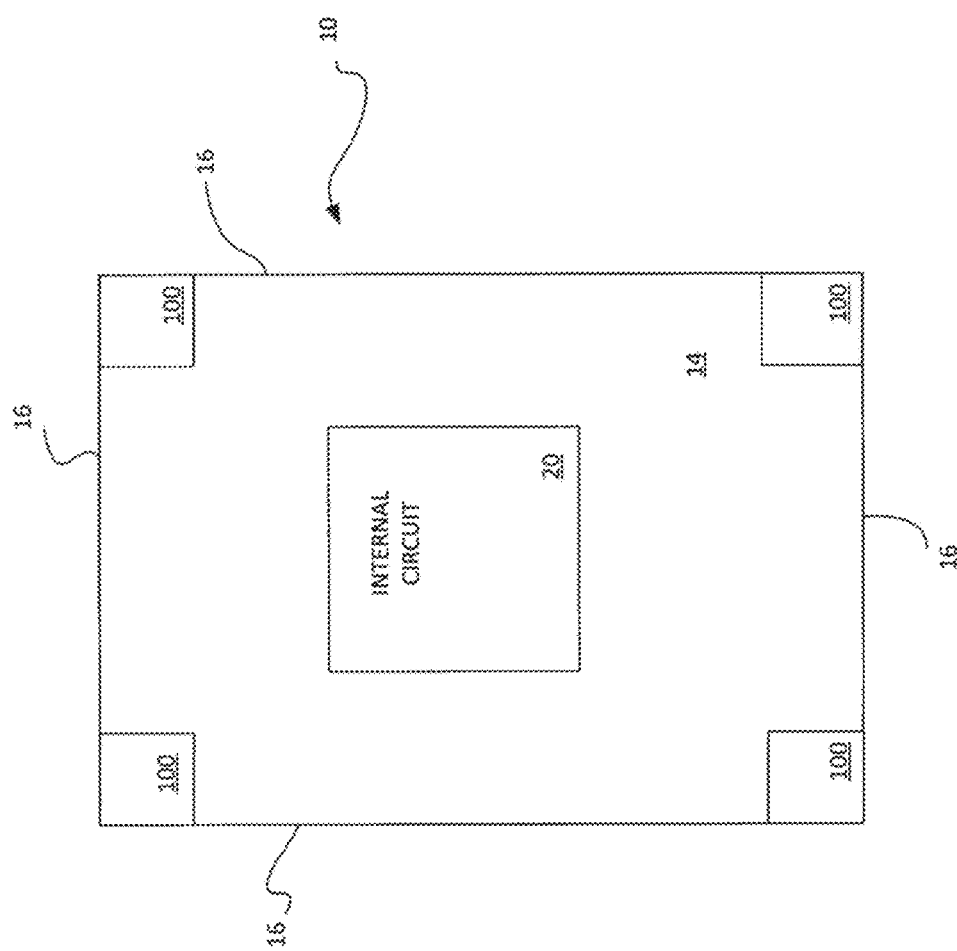
FIGS. 2A, 2B are schematic views showing components of an electronic device.

FIG. 2A depicts a schematic view of device 10 in greater detail. As noted, device 10 is a smartphone. However, the disclosure herein is applicable to other types of electronic devices, such as a tablet computers, laptop computers, desktop computers, workstations, servers, portable computers, personal digital assistants, interactive televisions, video display terminals, gaming consoles, electronic reading devices, any other portable electronic device, or a combination of these. Device 10 may be integrated with a household appliance (e.g., a fridge, oven, washing machine, stereo, exercise bike, alarm clock, or the like), or a vehicle (e.g., on a vehicle dashboard).

Figure 2B:
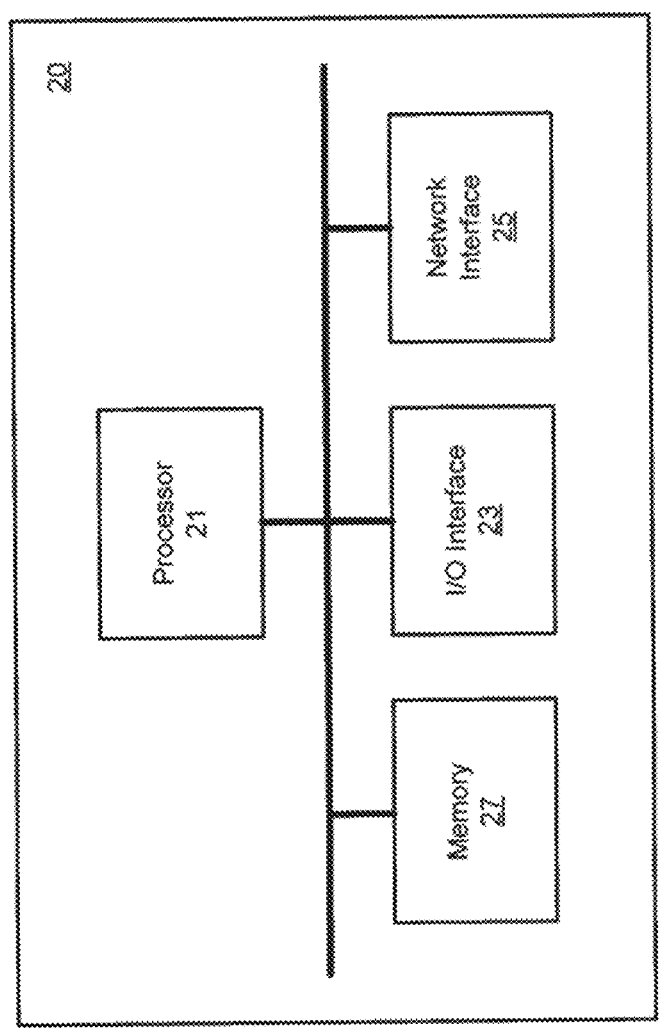

Device 10 has a housing 14 defining front and rear surfaces and peripheral surfaces 16. Device 10 includes at least one internal circuit 20 which provides certain functions of device 10. for example, as depicted in FIG. 2B, internal circuit 20 may include a processor 21, an input/output (I/O) interface 23, a network interface such as a Wi-Fi or cellular radio 25, memory 27, and a power delivery circuit (not shown) for receiving power from an external input and converting or conditioning it for delivery to other components of device 10. Components of internal circuit 20 may be formed on a single semiconductor die such as a system-on-chip, or as a plurality of components formed on separate semiconductor chips, mounted to a printed circuit board.

Processor 21 may be any type of processor, such as, for example, any type of general-purpose microprocessor or microcontroller (e.g., an ARM™, Intel™ x86, PowerPC™ processor or the like), a digital signal processing (DSP) processor, an integrated circuit, a programmable read-only memory (PROM), or any combination thereof.

Memory 27 may include a suitable combination of any type of electronic memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), or the like.

I/O interface 23 enables device 10 to communicate through connectors 100, e.g., to interconnect with other devices 10. I/O interface 23 also enables device 10 to interconnect with various input and output peripheral devices. As such, device 10 may include one or more input devices, such as a keyboard, mouse, camera, touch screen and a microphone, and may also include one or more output devices such as a display screen and a speaker.

Network interface 25 enables device 10 to communicate with other devices (e.g., other devices 10) by way of a network.

Device 10 may be adapted to operate in concert with one or more interconnected devices 10. In particular, device 10 may store software code in memory 27 and execute that software code at processor 21 to adapt it to operate in concert with one or more interconnected devices 10. The software code may be implemented in a high level procedural or object oriented programming or scripting language, or a combination thereof. The software code may also be implemented in assembly or machine language.

As noted, device 10 also includes a plurality of connectors 100 for connecting device 10 to external devices. Each connector 100 may be capable of connecting device 10 with, for example, smartphones, speakers, power supplies input/output peripherals or the like. Connectors 100 may be connected to one or more components of internal circuit 20 for data or power transmission. In some embodiments, connectors 100 may for example provide universal serial bus (USB) connections to external devices. Device 10 may act as a host or client device using such connections.

For enhanced flexibility, it will be appreciated that a connector 100 at each corner of the housing 14, as depicted in FIG. 2A, is preferred. However, in different devices, it may not be necessary to provide a connector in each corner, but rather distribute the connectors about the housing at convenient locations. FIGS. 2C-2H illustrate, non-exhaustively, a variety of possible locations. Thus, connectors 24 may be located centrally, as shown in FIG. 2C, inset from each corner as shown in FIG. 2D or at the corners as described above and shown in FIG. 2E. It is also possible to arrange the connectors so that only a preferred orientation is available, for example by arranging the connectors at the apexes of a triangle as shown in FIG. 2F, or only selected areas of the housing 14 as shown in FIG. 2H. A flexible orientation can be provided by arranging the connectors along a major axis of the housing 14 as shown in FIG. 2G so that the connection is attained in either of two positions.

As noted above, in some embodiments, the magnets may be utilized to connect the devices both mechanically and electrically.

Figure 3A:
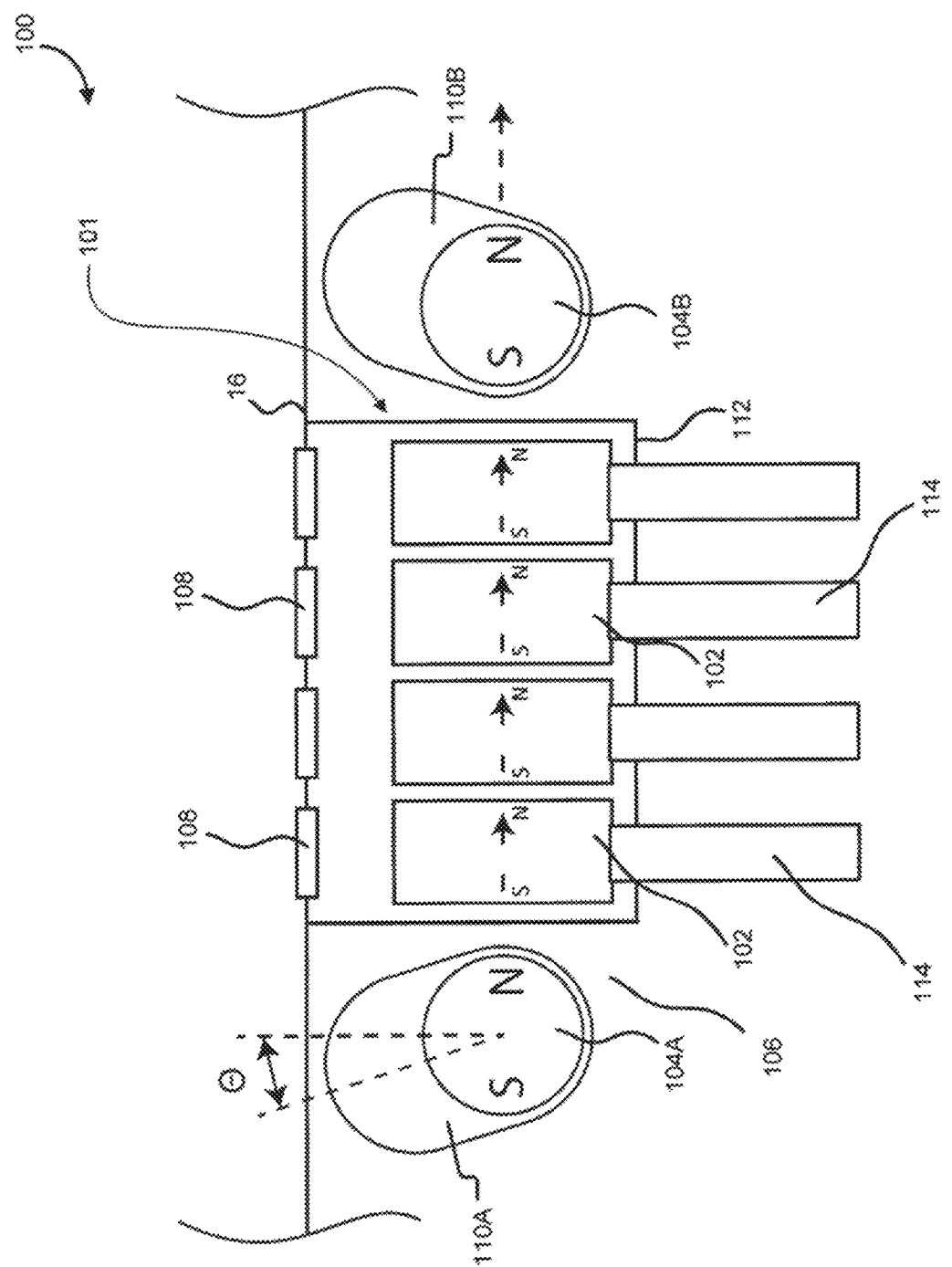
FIG. 3A is a top view of a connector with biasing side magnets.

An example connector 100 is shown in top view in FIG. 3A, with a top housing surface omitted for purposes of illustration. This example arrangement includes a magnetic contact assembly 101 with four magnets 102 (which may be referred to as "core magnets"), received a connector housing 106 and movable in a path defined by a guide, such as a channel 112. Connector 100 further includes two side magnets 104A and 104B disposed within connector housing 106. Housing 106 may be formed from suitable materials that are insulating and may be readily shaped, such as, e.g., polybutylene terephthalate (PBT), polyethylene terephthalate (PET), or the like. Housing 106 may be integral with device housing 14 or may be a separate component received within housing 14. Some embodiments described herein include a discrete connector housing (e.g. housing 106). In other embodiments, the connector housing is integral with the device housing (e.g. housing 14). It should be understood that these possibilities are interchangeable. Accordingly, references to a device housing (e.g. housing 14 could be replaced with a discrete connector housing (e.g. housing 106) and vice-versa. A plurality of external electrical terminals 108 are disposed on the surface 16 of housing 106 for contacting corresponding contacts of another connector in electrical communication. External electrical terminals 108 may be formed from any suitable electrically conductive (e.g., metallic) material.

A plurality of leads 114 are electrically connected to magnets 102. Each internal contact corresponds to an external terminal 108 and is electrically connected to one or more components of internal circuit 20 (FIG. 2A). For example, one or more leads 114 may be connected to I/O interface 25 for data communication and one or more leads 114 may be connected to a power delivery circuit for power transmission. Magnetic contact assembly 101 includes magnets 102 and leads 114 and may also include insulating elements (not shown), for example, nylon spacers, between magnets 102 to electrically insulate magnets 102 from one another. Thus, leads 114 and magnets 102 may carry different signals.

Magnetic contact assembly 101 is contained in a channel 112 formed in housing 106. Channel 112 acts as a guide. Magnetic contact assembly is slidable along a path defined by channel 112 between a withdrawn position in which magnets 102 are spaced inwardly from surface 16, as shown in FIG. 3A, and an extended position, in which magnets 102 abut terminals 108 to form an electrical connection between terminals 108 and the respective leads 114.

As shown in FIG. 3A, magnets 102 share a common orientation, namely, an orientation that provides a north-south alignment parallel to surface 16, indicated in FIG. 3A by arrows marked S-N. In such orientation, the north pole of one magnet 102 is adjacent the south pole of an adjacent magnet 102. Further, in such orientation, each magnet 102 presents both north and south poles to a terminal 108.

Side magnets 104A and 104B are disposed in channels 110A and 110B, respectively. Channels 110A and 110B are formed in housing 106 of connector 100 on right and left sides of core magnets 102, respectively. Channels 110A and 110B act as guides and define paths which extend inwardly away from surface 16 and converge towards one another and toward channel 112. As shown, channel 110A is oriented at an angle θ away from the normal line of surface 16 while channel 110B is oriented at an opposite angle. Each of channels 110A and 110B has a first end proximate surface 16 and a second end farther away from surface 16 and closer to channel 112 and thus, magnetic contact assembly 101. Each of channels 110A and 110B is formed such that each of magnets 104A and 104B may slideably move along a path defined by its respective channel between an extended position at the first end and a withdrawn position at the second end, i.e., to be closer or farther from surface 16.

Further, channels 110A and 110B and side magnets 104A and 104B are shaped such that each side magnet may rotate within its respective channel. In particular, each of magnets 104A and 104B may rotate between a first orientation in which the magnets are oriented with a north-south alignment parallel to surface 16 and a second orientation in which the magnets are oriented with a north-south alignment diagonal relative to surface 16.

In the depicted embodiment, each of side magnets 104A and 104B has a cylindrical shape, and the channels 110A and 110B are formed to allow each side magnet to rotate about its cylindrical axis. In other embodiments, each of side magnets 104A and 104B may have a different shape allowing each to rotate between the noted first and second orientations. For example, each of side magnets 104A and 104B may have a spherical shape, a hemispherical shape, an ovoid shape, etc.

FIG. 3A shows side magnets 104A and 104B each positioned at the second end of the respective channel 110A or 110B, retracted from surface 16. Magnetic contact assembly 101 is also in a position retracted from surface 16 (and terminals 108). Magnets 102, 104A and 104B assume the depicted positions when the connector 402 is not engaged with a complementary connector 402, which may be referred to as a "resting" state, a "retracted", or a "disengaged" state of the connector 402.

Magnets 102, 104A and 104B are drawn towards the depicted positions as a result of mutual attraction between magnets 102, 104A and 104B. In particular, mutual attraction between magnets 102, 104A, and 104B causes side magnets 104A and 104B to move along a respective channel 110A or 110B towards magnets 102 and towards one another. As side magnets 110A and 110B move towards magnets 102, the angle of the channel causes the side magnets to move away from surface 16. The mutual attraction between magnets 102, 104A, and 104B also draws magnets 102 away from surface 16. Further, this mutual attraction causes side magnets 104A and 104B to rotate such that they have the same north-south alignment as magnets 102, i.e., parallel to surface 16.

In this way, mutual attraction between magnets 102 of magnetic contact assembly 101 and side magnets 104A and 104B biases each of the magnets towards a retracted position away from surface 16. Conveniently, no mechanical biasing (e.g., by way of a spring) is required. With magnets 102, 104A, 104B in their retracted positions, connector 100 is in a disengaged state and terminals 108 are not electrically connected to the internal connectors or to the internal device circuit. Further, when connector 100 is in the "disengaged" state and magnets 102, 104A, and 104B are retracted from surface 16 magnetic flux at surface 16 may be significantly reduced.

Conversely, connector 100 may be drawn into an engaged state, in which magnets 102, 104A, 104B are in their respective extended positions, by an adjacent connector.

Figure 3B:
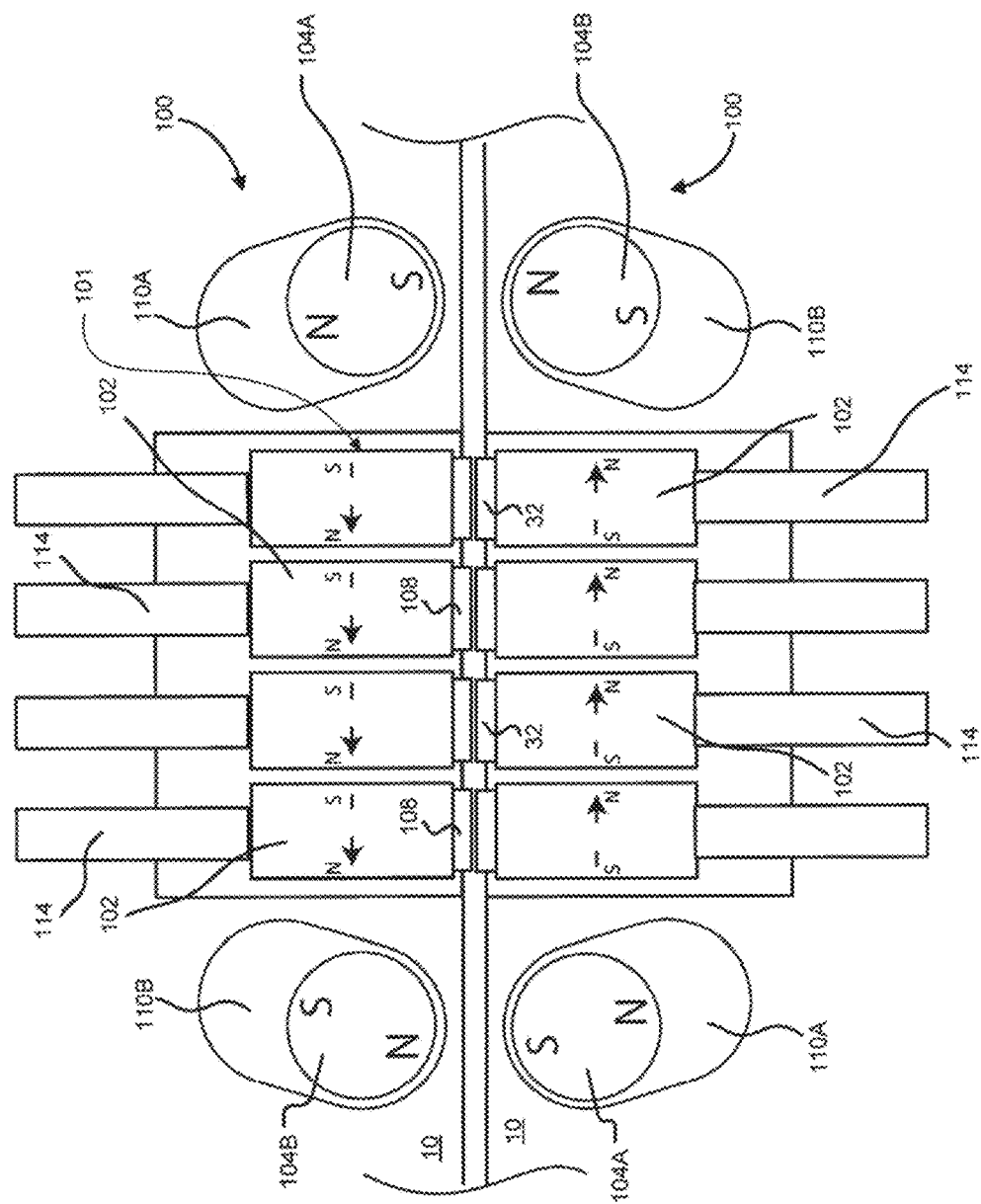
FIG. 3B is a schematic view of two connectors of FIG. 3A when engaged.

FIG. 3B shows two connectors 100 having the arrangement depicted in FIG. 3A. As shown, the two connectors 100 are engaged, such that each connector 100 is in an "engaged" state. When in this state, terminals 108 and corresponding magnets 102 of the two connectors 100 may form electrical connections between two devices 10 for power or data transmission. In one specific example, each pair of corresponding magnets 102 of the two connectors 100 may form a connection for a particular USB pin/wire, e.g., VCC, D−, D+, GND. As a result, a USB connection may be provided. In other embodiments, connector 100 may have a fewer or greater number of magnets 102 to provide for a greater number of pins/wires. Connections other than USB (e.g., Firewire) may be provided.

As shown, in the engaged state, side magnets 104A and 104B are positioned in their extended positions at the first end of a respective channel 110A or 110B, proximate surface 16. Side magnets 104A and 104B of a first device 10 are drawn to the first end, by sliding movement along a respective channel 110A or 110B, as a result of attraction between the side magnets 104A and 104B and corresponding side magnets 104A and 104B of a second device 10. So, when the connectors 100 of the two devices 10 are engaged, side magnet 104A of the first device 10 is aligned with and magnetically coupled with side magnet 104B of the second device 10. Similarly, side magnet 104B of the first device 10 is aligned with and magnetically coupled with side magnet 104A of the second device 10.

As side magnets 104A and 104B are drawn towards surface 16 along a respective channel 110A or 110B, the angle of the channel causes side magnets 104A and 104B to each move away from core magnets 102. Further, as side magnets 104A and 104B in the first device move along a respective channel 110A or 110B, mutual attraction between the side magnets 104A and 104B and the corresponding side magnets 104A and 104B in the second device causes each of the side magnets to rotate within its respective channel towards the second orientation noted above, in which the poles of magnets 104A, 104B are oriented diagonally to surface 16. Consequently, in each device 10, mutual attraction between magnets 102, 104A, and 104B decreases, and the bias of magnets 24 towards a retracted position is reduced. While magnets 104A, 104B are aligned with magnets 102 (as in the disengaged position), magnetic attraction between magnets 102, 104A, 104B may be sufficiently strong that an adjacent magnet 102 of another connector cannot cause magnet 102 to move outwardly. However, rotation of side magnets 104A, 104B due to the presence of an adjacent magnet 104A, 104B reduces magnetic attraction between magnets 102, 104A, 104B. Thus, such rotation releases magnets 102 from the inwardly-biased disengaged position; once magnets 104A, 104B are rotated toward their diagonal orientations, magnet 102 can be drawn outwardly toward the engaged position by an adjacent magnet 102 of another connector.

In each device 10, movement of side magnets 104A and 104B towards surface 16 draws magnets 102 towards the surface by magnetic attraction. Further, as magnets 102 of the first device move towards the surface, they become drawn by the corresponding magnets 102 in the second device 10, and vice versa. In this way, magnets 24, 104A and 104B of each device 10 collectively move towards the engaged positions shown in FIG. 3B.

As noted, when the connectors 100 are engaged, each side magnet 104A and 104B may have a north-south alignment that is diagonal relative to surface 16. The attraction between a side magnet 104A/104B of a device 10 and a complementary side magnet 104β/104A of an engaged device 10 tends to cause each side magnet to rotate towards an orientation perpendicular to surface 16. Meanwhile, the attraction between a side magnet 104A/104B and core magnets 102 in the same device tends to cause each side magnet to rotate towards an orientation parallel to surface 16. As a result, when the connectors 100 are engaged, each side magnet 104A and 104B maintains a diagonal orientation. Thus, when engaged, magnets 104A, 104B pull devices 10 toward one another and magnetically hold the devices together.

Each of channels 110A and 110B may be oriented at an angle θ (FIG. 3A) between 0 degrees and 90 degrees. In some embodiments, the angle θ may be between 0 degrees and 20 degrees. As will be appreciated, a larger angle θ causes side magnets 104A and 104B to move farther away from magnets 102 when a connector 100 transitions from a resting state to an engaged state.

Magnets 102, 104A, 104B and channels 112, 110A, 110B may be configured to ensure that, when two connectors 100 are placed in abutment as depicted in FIG. 3B, attraction between magnets 102, 104A or 104B of one connector 100 and the corresponding magnets 102, 104A, 104B of the other connector 100 is sufficient to overcome the magnetic attraction between magnets 102, 104A, 104B of a single connector biasing the connector to the disengaged state. In other words, the configuration of magnets 102, 104A, 104B and channels 112, 110A, 110B is such that two connectors 100 can overcome the magnetic bias toward the disengaged state to draw one another into the engaged state. For example, magnets 104A 104B may be at least twice as far from one another as they are from device edge 16. Suitable sizes, orientations and spacing of channels 112, 110A, 110B depends on the strengths of magnets 102, 104A, 104B and will be apparent to skilled persons based on the present disclosure. In an example, magnets 102, 104A, 104B are neodymium-iron-boron (NdFeB) magnets. FIG. 3F depicts an example connector 100, annotated with references to identify example dimensions. Corresponding example values of those dimensions are listed in table 1.

FIG. 3C is a perspective view of a portion of device 10 including a connector 100 shown in FIG. 3A. For the sake of illustration, the top surface of this portion is shown as being cut away to reveal magnets 102, channels 110A/110B, and side magnets 104A/104B within. As shown in FIG. 3C, the connector 100 is in a disengaged state with magnets 102 and magnets 104A/104B in their respective withdrawn positions retracted from surface 16.

As shown in FIG. 3C, each magnet 24 has a disk shape. However, in other embodiments, each magnet 102 may have a different shape. Further, there may be a fewer or greater number of magnets 102. The arrangement of magnets 102 shown in FIG. 3C may be replaced with another arrangement of magnets, as described herein. Similarly, although four terminals 108 are shown, there may be a fewer or greater number of terminals. Though the connector of FIG. 3C has one magnet 102 corresponding to each terminal 108, some embodiments may have more than one terminal per magnet.

Figure 3D:
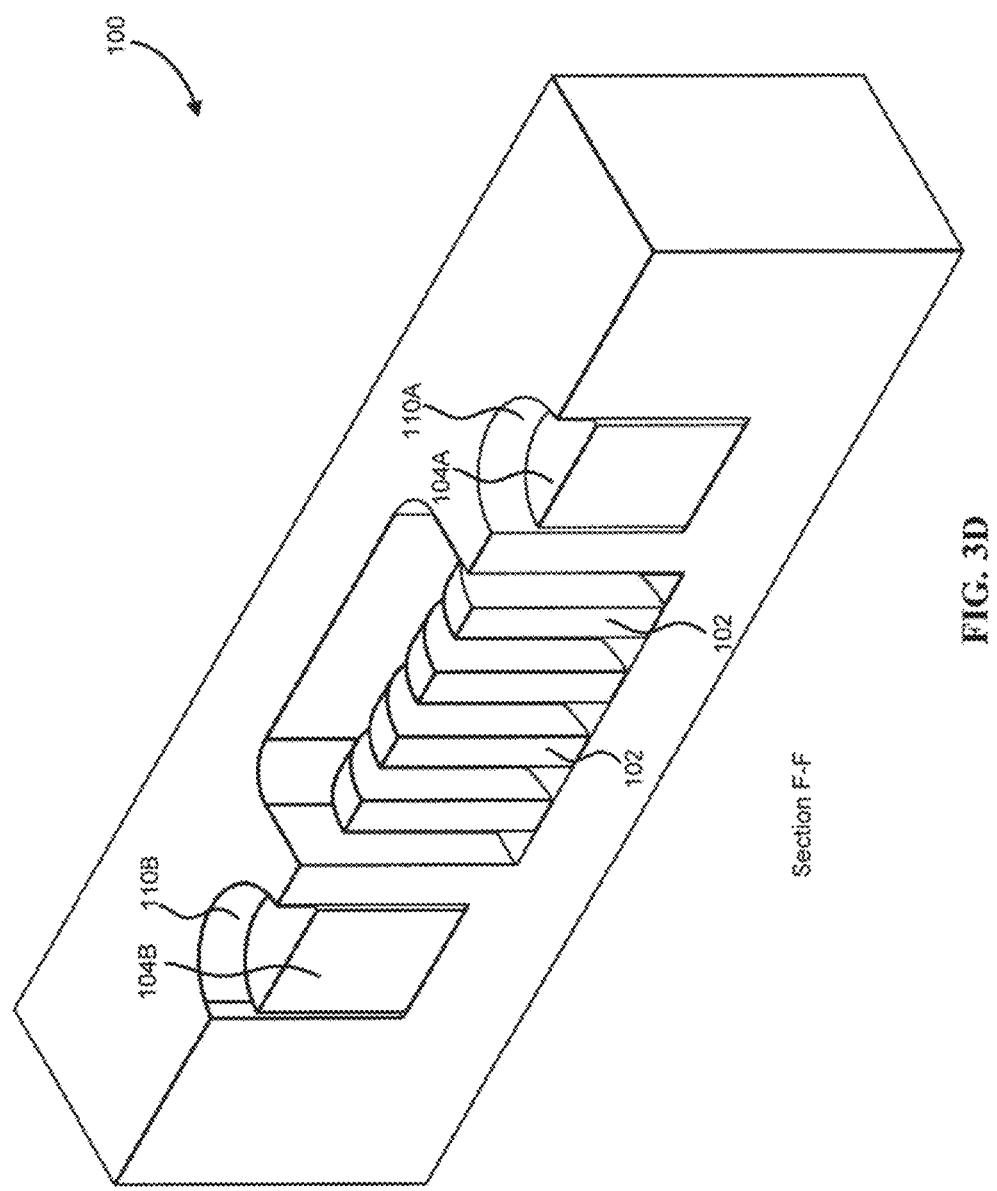
FIG. 3D is a perspective cross-sectional view of the connector of FIG. 3A.
Figure 3E:
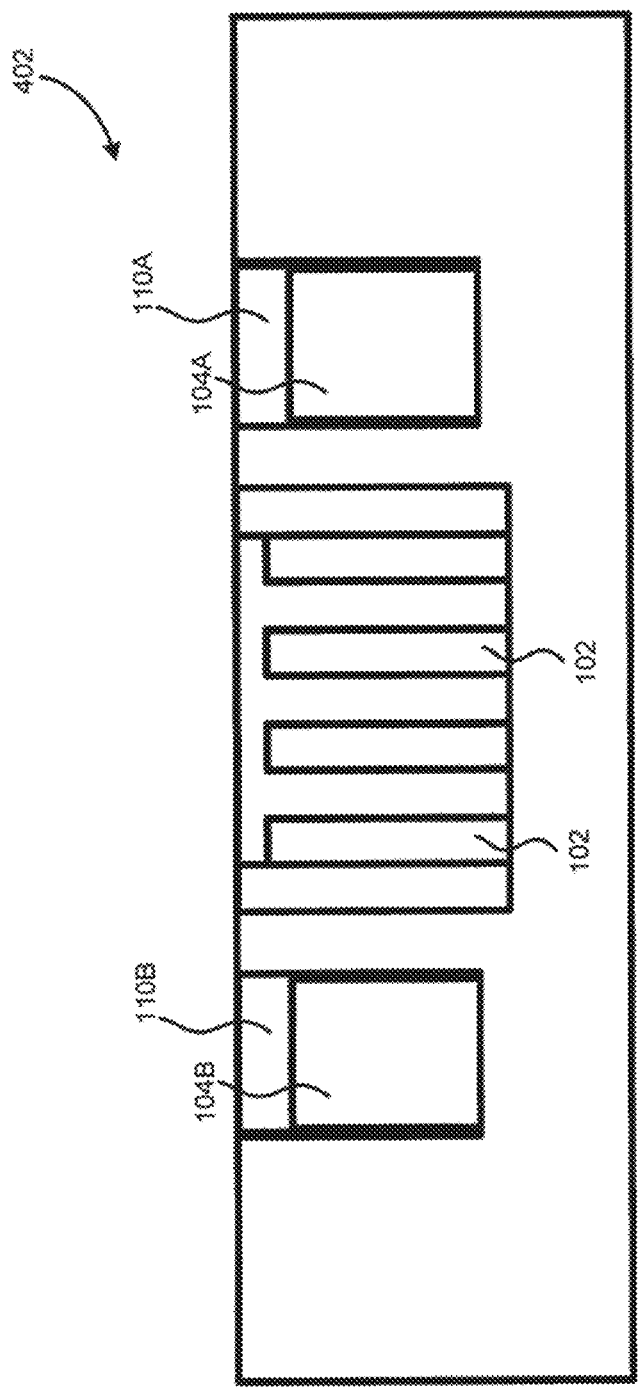
FIG. 3E is a side cross-sectional view of the connector of FIG. 3A.
Figure 3F:
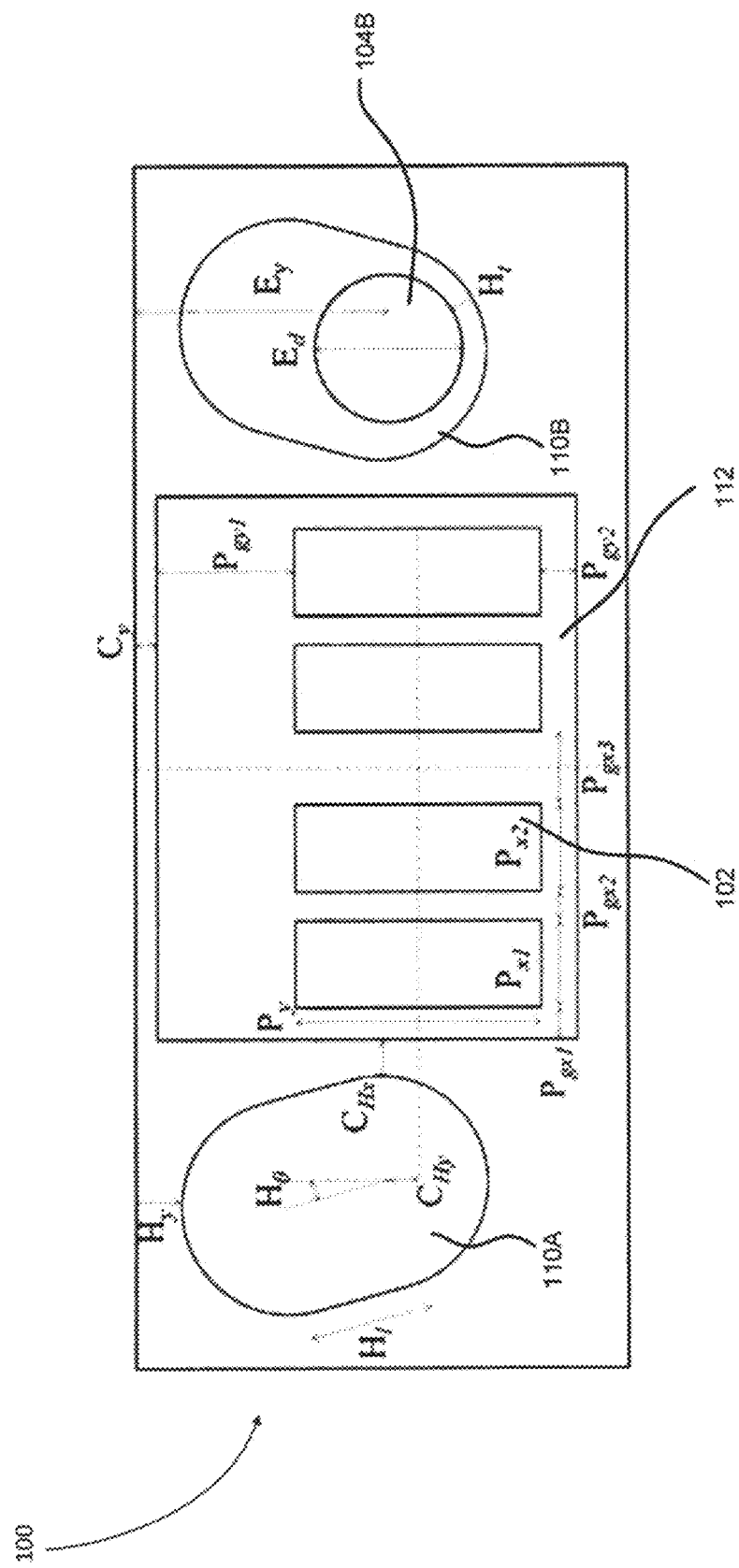
FIG. 3F is a top view of the connector of 3A, showing example dimensions.

FIG. 3D is a perspective cross-sectional view of the connector 100 of FIG. 3C, taken along line F-F. FIG. 3E is a side cross-sectional view of the connector 100 of FIG. 3C, taken along line F-F. As best seen in FIGS. 3D and 3E, channel 110A/110B has a shape complementary to cylindrical side magnet 104A/104B, allowing magnets 104A/104B to slide and rotate within respective channels 110A/110B in manners described herein.

In some embodiments, magnets 102 may be replaced with passive magnetic materials. For example, magnets 102 may be replaced with ferrous elements or other magnetizable elements. In such embodiments, movement of side magnets 104A, 104B to their engaged positions may magnetically draw contact assembly 101 to its engaged position.

In some embodiments, connectors may have only one side magnet. For example, FIG. 4A depicts a top view of one such connector 100', which is identical to connector 100 except that it has only a single side magnet 104, received in a channel 110. FIG. 4B depicts a top view of two connectors 100' in an engaged state. Top housing surfaces are omitted in FIGS. 4A-4B for purposes of illustration In some embodiments, the magnetic contact assembly may include leads on the outward-facing side of magnets 102.

Figure 5A:
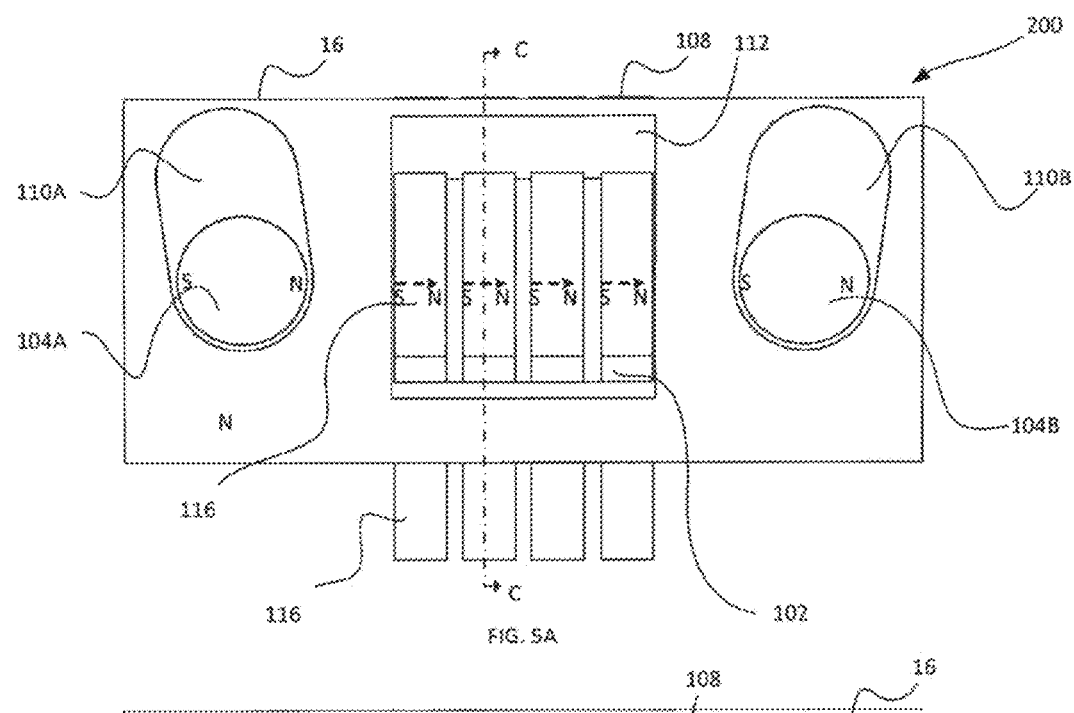
FIGS. 5A, 5B and 5C are top, front and side cross-sectional views, respectively, of another connector.
Figure 5B:
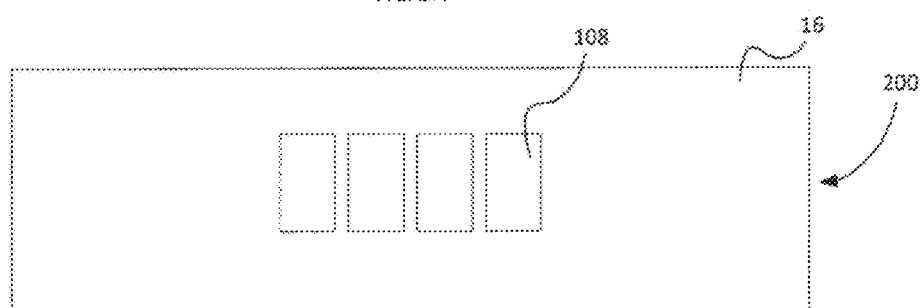
Figure 5C:
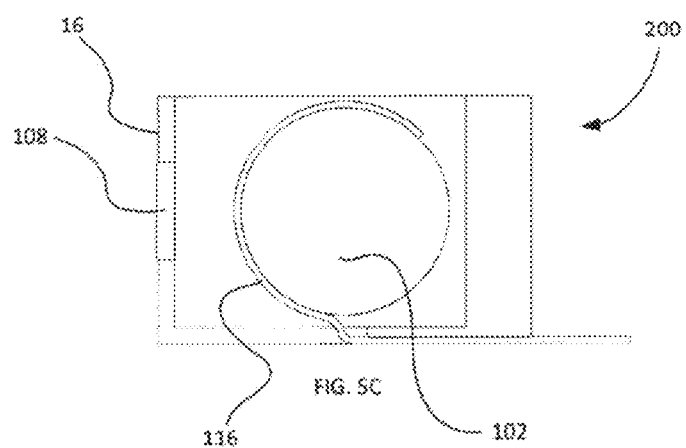

For example, FIGS. 5A-5B depict top and front views, respectively of a connector 200, with a top housing surface omitted in FIG. 5A for purposes of illustration. FIG. 5C depicts a side cross-sectional view of connector 200 along line C-C shown in FIG. 5A. Connector 200 is generally identical to connector 100 except as otherwise described, and like components are identified with like reference characters.

As is best shown in FIGS. 5A, 5C, connector 200 has a magnetic contact assembly 201 including leads 116. Each lead 116 is connected to internal circuit 20 of device 10. In an example, each lead 116 may correspond to a particular USB pin (e.g., VCC, D−, D+, GND) such that connector 200 may provide a USB connection.

Leads 116 are wrapped around magnets 102 such that portions of leads 116 are positioned on the outer side of magnets 102, facing contacts 108. Leads 116 may be electrically insulated from magnets 102, for example, by an insulative sleeve or coating applied to one or both of leads 116 and magnets 102. In such embodiments, insulation between magnets 102 may be omitted. Alternatively, leads 116 may electrically contact magnets 102, in which case magnets 102 may be insulated from one another to isolate signals on different leads 116.

Leads 116 may be formed from a ferrous material and of sufficient conductivity to allow for high speed data transfer. Their thickness may be sufficiently low to allow for high flexibility.

Leads 116 may magnetically adhere to the adjacent core magnets 102. Leads 116 may, for example, be coiled around magnets 102 and held against magnets 102 by magnetic attraction. As magnets 102 move, the coiled leads 116 may change in shape slightly. For example, when magnets 102

TABLE 1

| Ed | Ht | Hy | Hθ | Ey | Hi | Px1 | Px2 | Py | Pgx1 | Pgx2 | Pgx3 | Pgy1 | Pgy2 | Cy | CHx | CHy |
|----|----|----|----|----|----|-----|-----|----|----|----|----|----|----|----|-----|-----|
| 5 | 0.2 | 0.25 | 11 | 2.95 | 3.62 | 1.5 | 1.5 | 1.5 | 1.59 | 1.6 | 1.6 | 2 | 0.5 | 0.5 | 1.6 | 0 | move inwardly, the coil may tighten as magnetic attraction holds leads 116 tightly to magnets 102. Conversely, when magnet 102 moves outwardly, the coil may stretch.

Figure 5D:
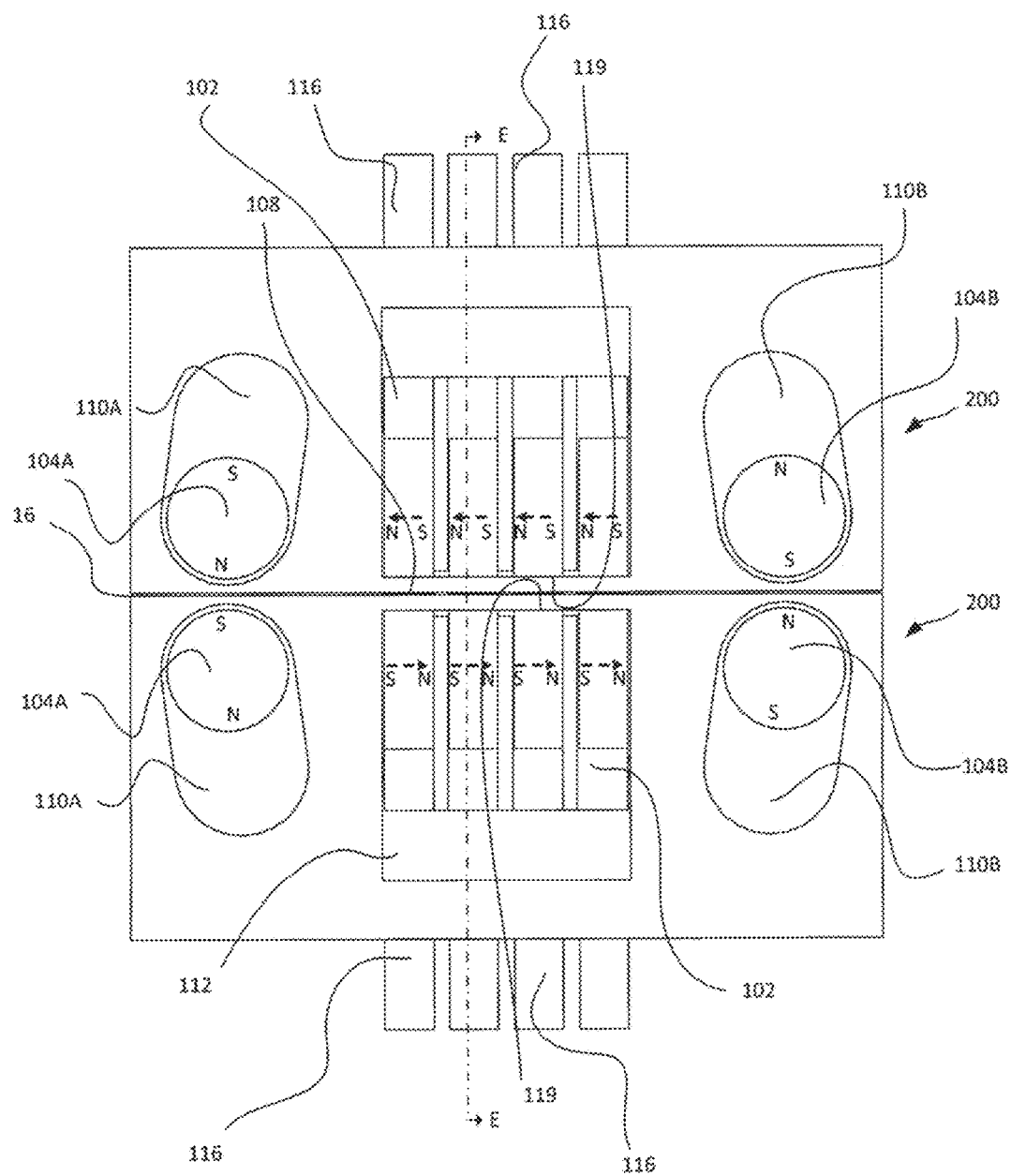

FIGS. 5D, 5E depict top and side cross-sectional views, respectively, of a pair of connectors 200 in their engaged states, the latter taken at line E-E of FIG. 5D. Top housing surfaces are omitted in FIG. 5D for purposes of illustration. As is best shown in FIG. 5E, in the engaged state, magnets 102 urge leads 116 outwardly against contacts 108. Thus, an electrical connection may be formed through lead 116 and an associated contact 108 of one connector 200, and a corresponding lead 116 and contact 108 of another connector. As noted, the electrical connection may be used for power or data transmission.

Figure 6A:
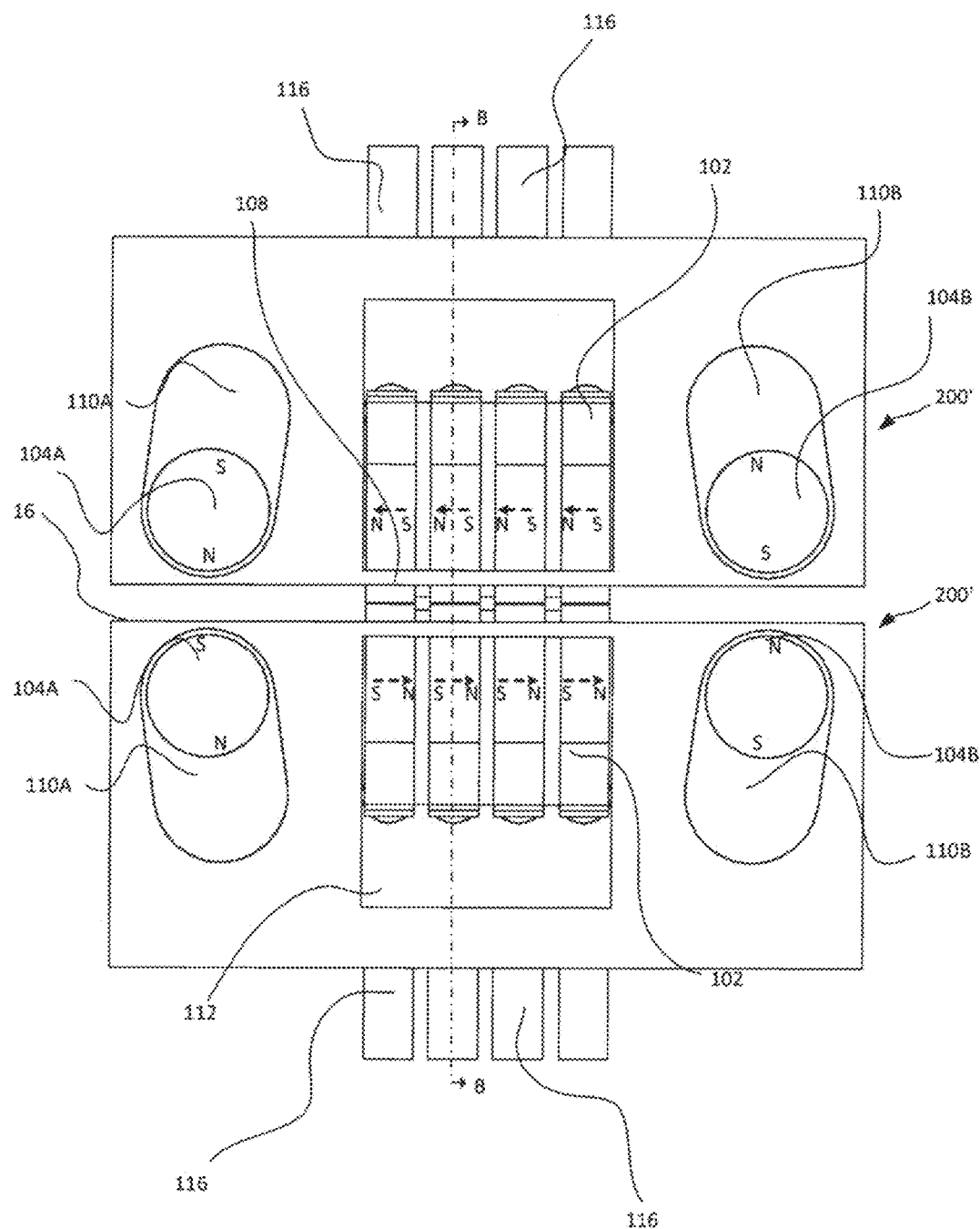
FIG. 6A is a top view of two connectors when engaged.
Figure 6B:
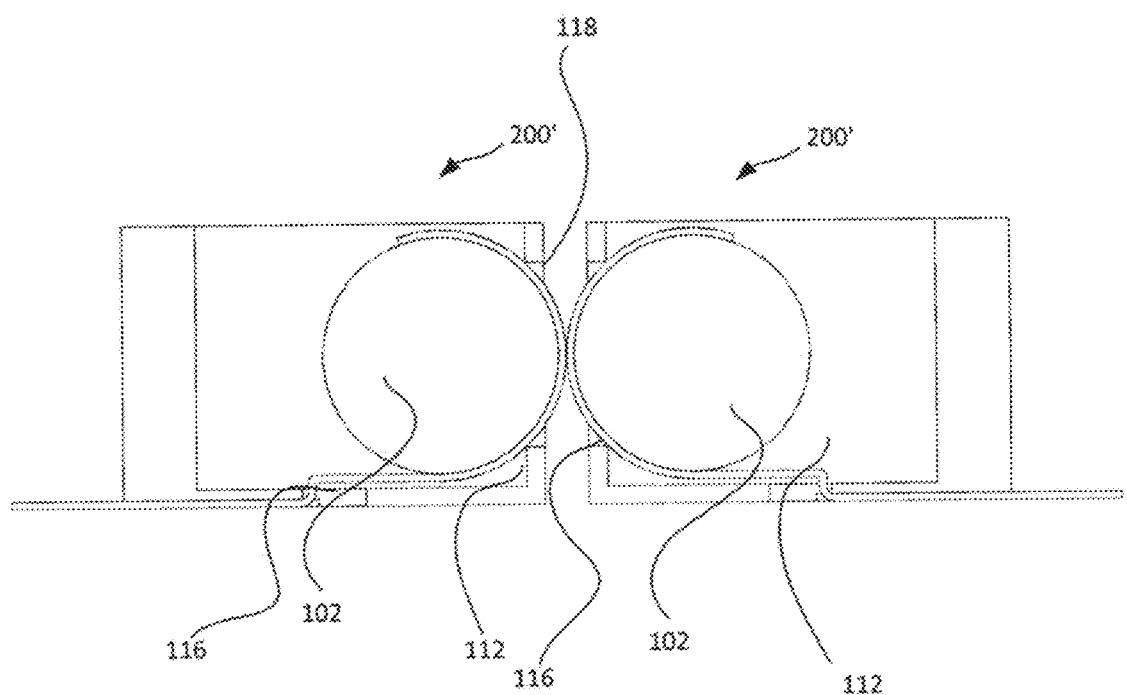
FIG. 6B is a side view of the connectors of FIG. 6A.

In some embodiments, contacts 108 may be omitted, such that magnets 102 or leads 116 protrude from housing 14 in the engaged state. FIGS. 6A and 6B show two connectors 200' exemplary of such an embodiment, the latter view taken along line B-B of FIG. 6A in top and side cross-section views, respectively, the latter taken at line B-B of FIG. 6A. Top housing surfaces are omitted in FIG. 6A for purposes of illustration. Connectors 200' are identical to connectors 200 except as otherwise described and like components are indicated with like numerals.

As best shown in FIG. 6B, Connectors 200' lack contacts 108. Instead, connectors 200' have openings 118 through which magnets 102, leads 116 protrude in the engaged state. Thus, in the engaged state, electrical connections are directly formed between leads 116 of the two connectors 200'.

Figure 6D:
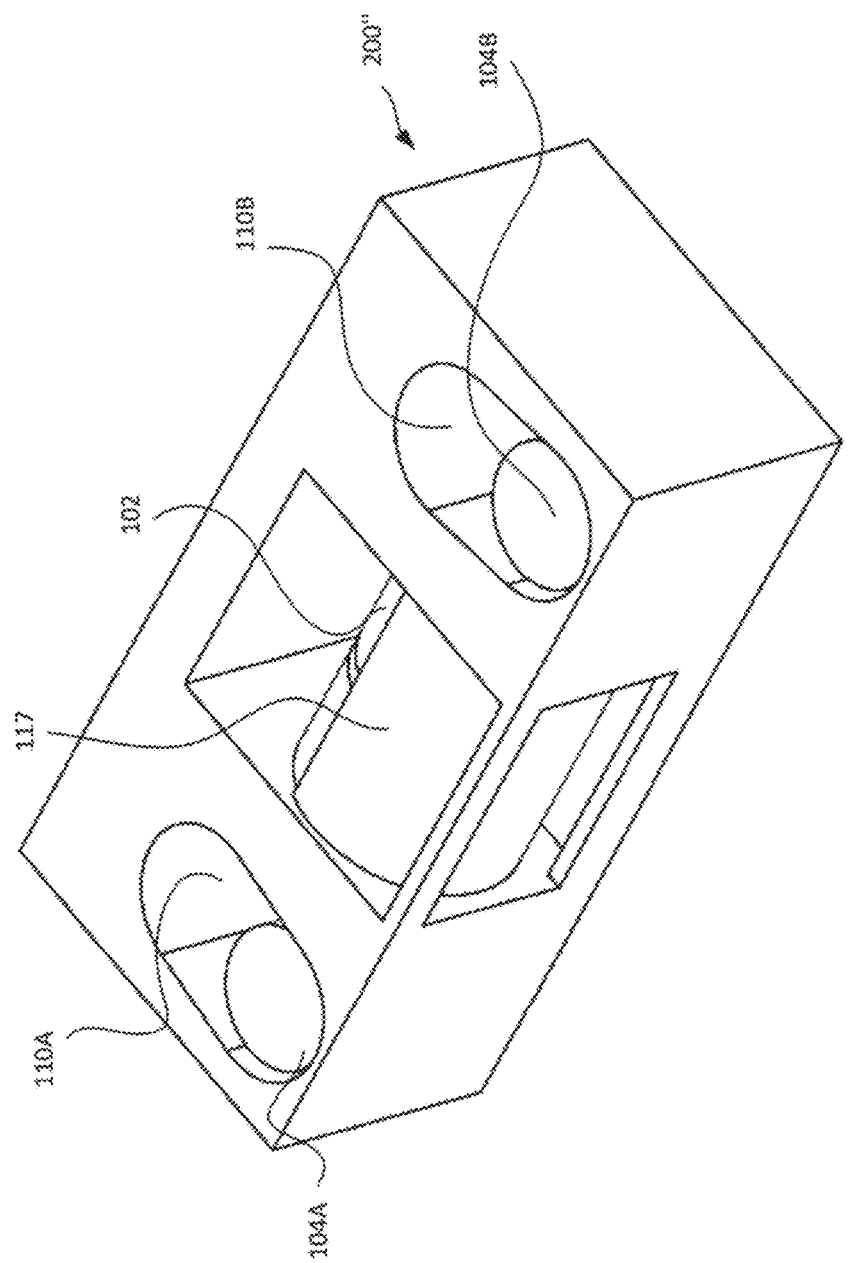

In some embodiments, leads 116 may be bonded to core magnets 102, for example, using adhesives. Leads 116 may be bonded to a flexible substrate, constraining and insulating the individual traces. For example, FIGS. 6C-6D depict perspective views, of connectors 200" in disengaged and engaged states, respectively, in which leads 116 are incorporated in a conventional flat flexible cable (FFC) 117, which may be bonded to magnets 102. Bonding of leads 116 to a substrate may allow for tighter pitch between leads 116, relative to individually attaching leads 116 to magnets 102.

In other embodiments, magnets 102 of two connectors may directly contact one another, rather than leads 116, an electrical connection may be formed between magnets 102.

In each of connectors 100, 200, 200', magnets 102 are disc-shaped. In other embodiments, magnets may be provided in different shapes. For example, magnets 102 may be replaced with bar magnets. In addition, in each of connectors 200, 200', each magnet 102 is associated with one lead 116. In other embodiments, magnets 102 may be associated with multiple leads. For example, magnets 102 may be replaced with a single bar magnet, which may be associated with any number of leads.

As depicted, magnets 102 are oriented with their poles aligned generally parallel to peripheral surface 16. Likewise, magnets 102 present to one another contacting surfaces 119 (FIG. 5D) that are generally parallel to the north-south alignment of the magnets. In such an arrangement, attractive magnetic forces between opposing magnets 102 may be greatest at the edges of the contacting faces. In other words, magnetic flux may be greatest proximate the edges. Accordingly, in an example, two leads may be associated with each magnet 102, each lead being aligned proximate an edge of the contacting surface 119 of the magnet 102, in the vicinity of the maximum magnetic attractive force. Such a configuration may promote strong electrical connection between corresponding leads.

In other embodiments, magnets 102 may be oriented with their north-south poles generally perpendicular to surface 16 and to the contacting surfaces magnets 102 present to one another.

Figure 7A:
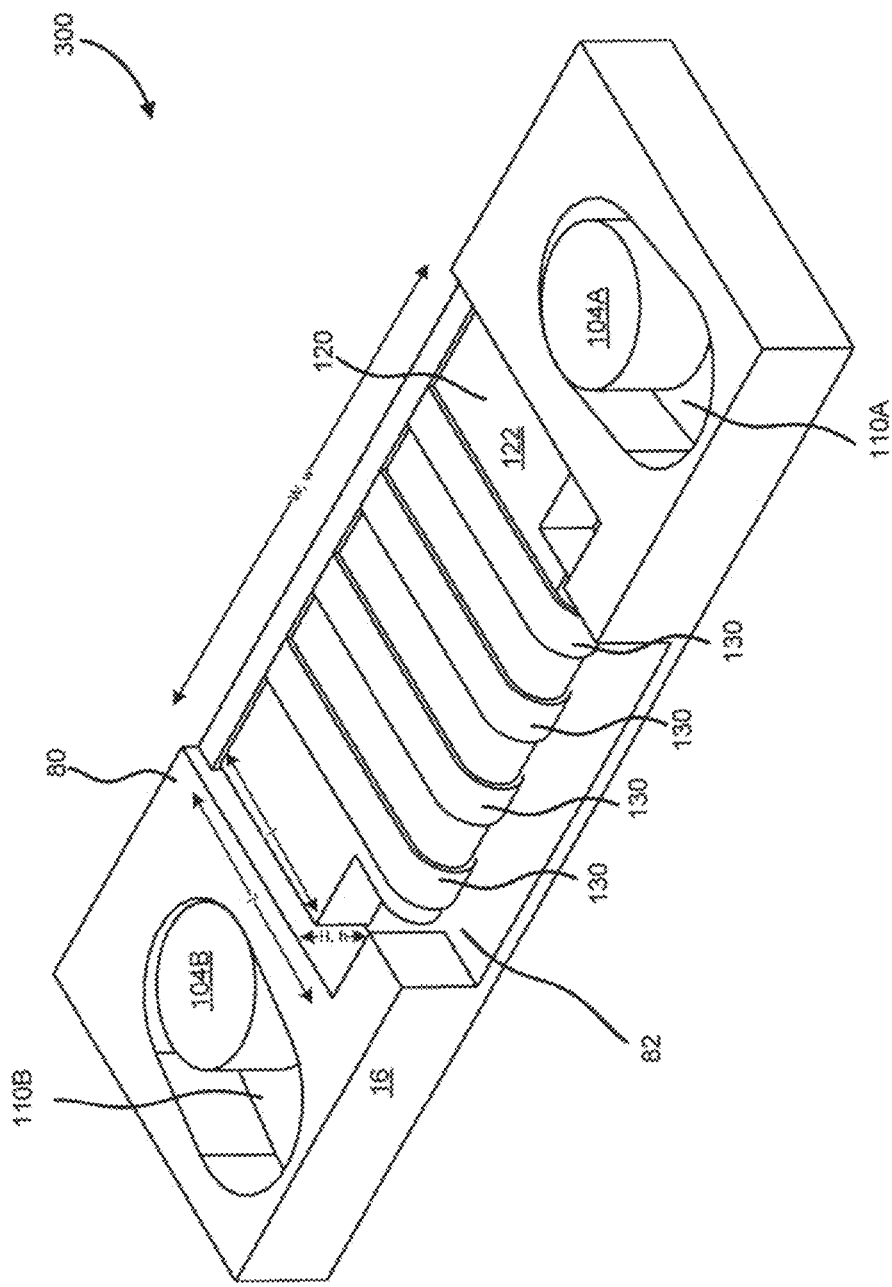
FIGS. 7A and 7B are perspective views of another connector, when disengaged and engaged, respectively.
Figure 7B:
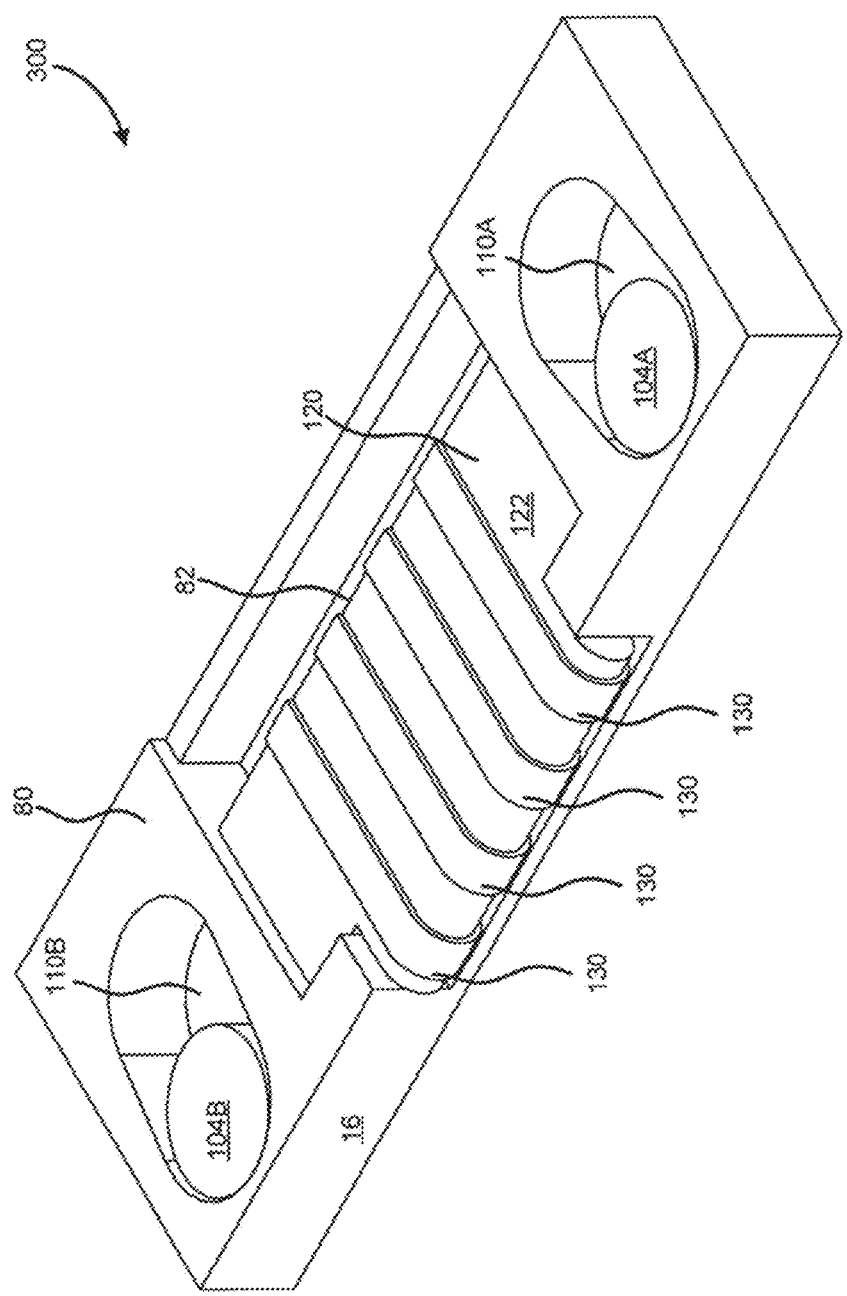

FIGS. 7A and 7B each is a perspective view of a connector 300, with top housing surfaces omitted for purposes of illustration. In particular, FIG. 7A depicts connector 300 in a disengaged (retracted or resting) state and FIG. 7B depicts connector 300 in an engaged (extended) state. In some embodiments, the shaping of components within connector 300 allows connector 300 to be formed to be substantially thinner (e.g., having a lower profile) than connector 100.

Figure 8A:
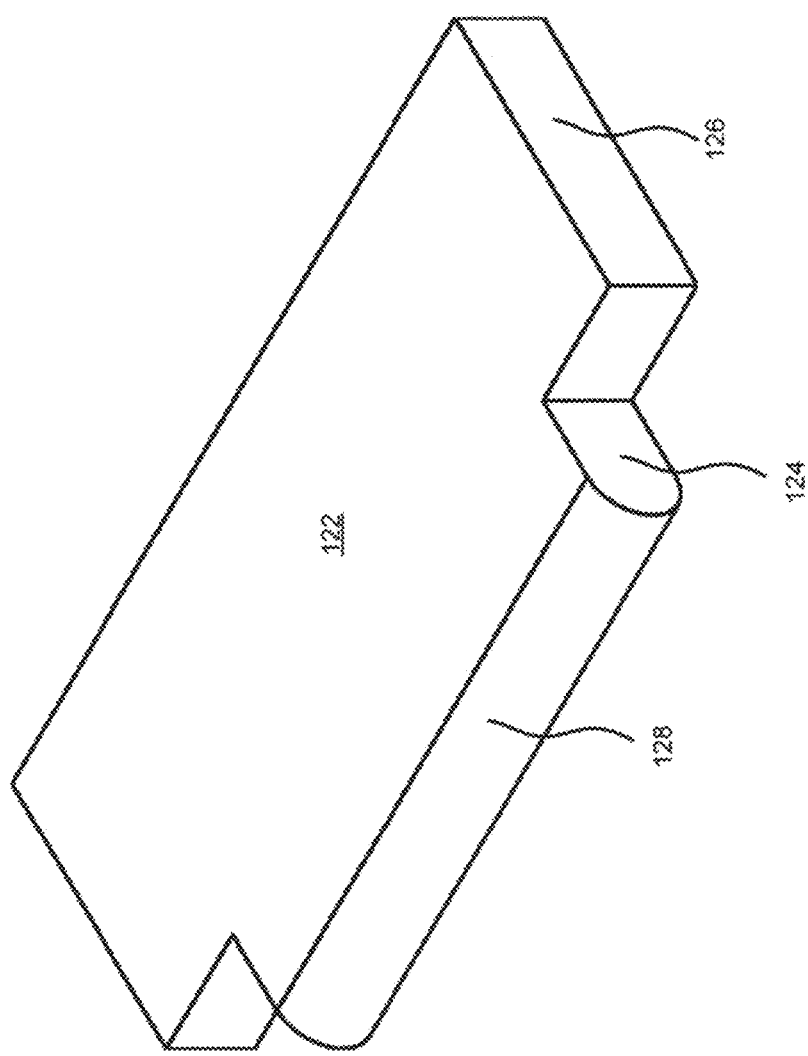
FIGS. 8A, 8B and 8C are perspective, top and side views, respectively, of a magnet of the connector of FIG. 7A.
Figure 8C:
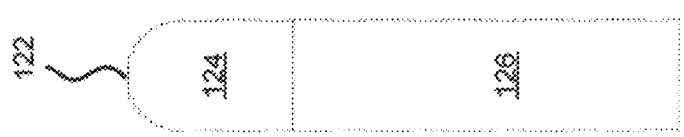
Figure 8B:
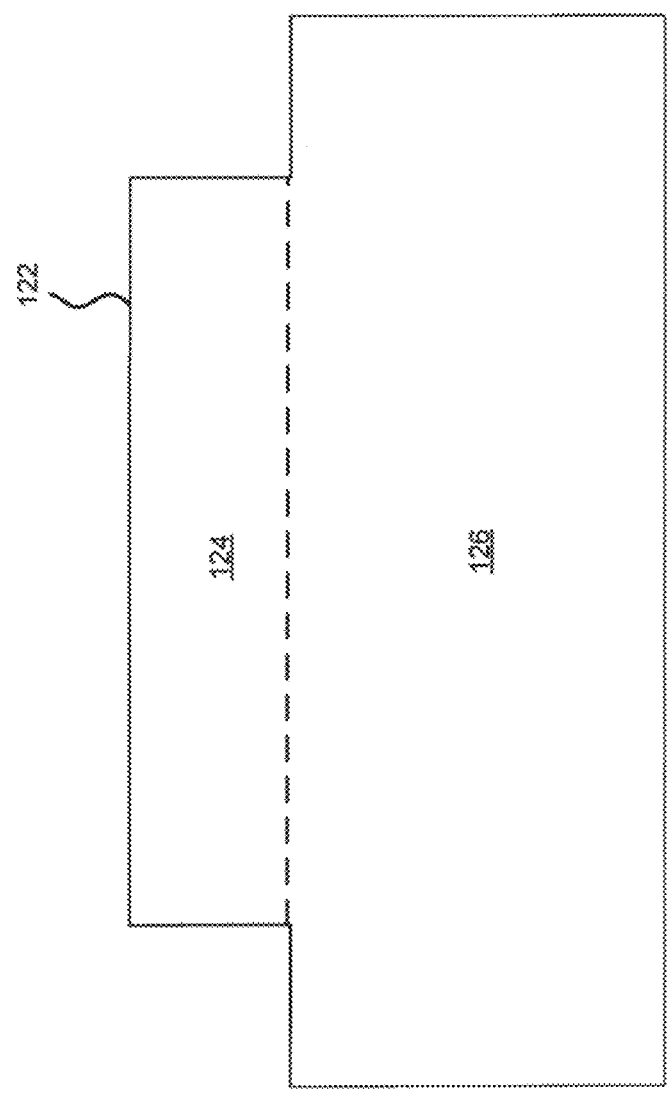

Unlike connector 200 which includes four core magnets 102 disposed within a housing, connector 300 includes a magnetic contact assembly 120 with a single magnet 122. FIGS. 8A-8C depict perspective, top elevation and side elevation views, respectively, of magnet 122.

Assembly 120 is disposed within a connector housing 80. As detailed below, assembly 120 may move (e.g., slide) within housing 80 as connector 300 transitions between its disengaged and engaged states. In FIGS. 7A and 7B, the top surface of housing 80 is not shown, for clarity of illustration.

Assembly 120 includes a single magnet 122. As best seen in FIGS. 8A, 8B, and 8C, magnet 122 is T-shaped, and includes a crossbar portion 126 and a stem portion 124. Crossbar portion 126 is substantially rectangular in shape. Stem portion 124 has approximately the same height as crossbar portion 126, but is smaller in width and length. Stem portion 124 has a rounded end 128, in the shape of a semi-cylinder. During operation, end 128 of stem portion 124 may 124 from an opening in surface 16 of housing 80 (FIG. 7B). In this way, stem portion 124 may engage another connector (e.g., another connector 300) to form magnetic and electrical connections therewith, or to form a connection with a metal surface.

The rounded shape of end 128 allows two connected connectors to be rotated relative to one another without interrupting the mechanical or electrical connections therebetween. This rounded shape also provides points of contact between two connected connectors along a single line, thereby localizing contact forces to this line.

Assembly 120 also includes a plurality of conductive wires 130. Each wire 130 may carry a separate electrical signal (data or power). In one specific example, each wire 130 may correspond to a particular USB pin (e.g., VCC, D−, D+, GND) such that connector 300 may provide a USB connection.

The plurality of conductive wires 130 are electrically isolated. As shown, the wires are spaced from one another. Further, to prevent conduction through magnet 122, each wire 130 may include an insulating backing material. Alternatively or additionally, magnet 122 may be coated with an insulating material such as enamel, plastic, or the like.

In the depicted embodiment, assembly 120 includes four wires 130. However, in other embodiments, assembly 120 may include a fewer or greater number of wires 130. Further, connections other than USB (e.g., Firewire) may be provided.

In the depicted embodiment, each wire 130 extends over the coated surface of magnet 122 along the length of assembly 120 and wraps around rounded end 128. In this way, the part of wire 130 extending over end 128 may contact parts (e.g., wires/pins) of another connector for establishing electrical connections therewith.

In another embodiment, channels may be formed on the surface of magnet 122, and wires 130 may be received in and may extend along these channels. The channels may have a depth corresponding to the thickness of wires 130. Accordingly, when wires 130 are received in the channels, the top surface of the wires 130 may be flush with the top surface of magnet 122. This allows, for example, electrical connection between wires 130 and contacts pressed to the top surface of magnet 122. Conveniently, providing these channels may allow the overall height of assembly 120 to be reduced in some embodiments.

Referring now to FIGS. 7A and 7B, housing 80 may be formed from suitable materials that are insulating and may be readily shaped, such as PBT, PET, or the like. Housing 80 includes a cavity 82 having a height (H) and width (W) sized to correspond to the height (h) and width (w) of assembly 120. Cavity 82 has a length (L) greater than the length (l) of assembly 120. Accordingly, assembly 120 may move within cavity 82 along length (L) between a first position in which assembly 120 is adjacent a back wall of housing 80 (when connector 300 is in its disengaged state), and a second position in which assembly 120 is adjacent a front wall of housing 80 when connector 300 is in its engaged state. In the second position, stem portion 124 extends through an opening in the front wall (e.g., to connect with another connector, a metal surface, etc.).

Connector 300 also includes two side magnets 104A and 104B disposed, respectively, in channels 110A and 110B. Magnets 104A/104B and channels 110A/110B are provided in connector 300 to be substantially similar to the same components in connectors 100,200. Further, magnets 104A and 104B interact with assembly 120 in connector 300 in substantially the same manner that magnets 104A and 104B interact with core magnets 102 in connectors 100, 200.

So, channels 110A and 110B are formed in connector 300 on right and left sides of assembly 120, respectively. Channel 110A is oriented at an angle θ (see FIG. 3A for angle θ) away from the normal line of surface 16 while channel 110B is oriented at an opposite angle. Each of channels 110A and 110B has a first end proximate surface 16 and a second end farther away from surface 16. Each of channels 110A and 110B is formed such that magnets 104A and 104B may slideably move within its respective channel between the first end and the second end, i.e., to be closer or farther from surface 16.

Further, channels 110A and 110B and side magnets 104A and 104B are shaped such that each side magnet may rotate within its respective channel. In one example, assembly 120 may have a magnetic orientation as shown for magnets 102 in FIG. 3A, namely, with a north-south alignment parallel to surface 16 and north being in the direction of channel 110B. In this example, each of magnets 104A and 104B may rotate between a first orientation in which the magnets are oriented with a north-south alignment parallel to surface 16 (e.g., as shown in FIG. 3A) and a second orientation in which the magnets are oriented with a north-south alignment diagonal relative to surface 16 (e.g., as shown in FIG. 3B).

In the depicted embodiment, each of side magnets 104A and 104B has a cylindrical shape, and channels 110A and 110B are formed to allow each of side magnets 104A and 104B to rotate about its cylindrical axis. In other embodiments, each of side magnets 104A and 104B may have a different shape allowing each to rotate between the noted first and second orientations. For example, each of side magnets 104A and 104B may have a spherical shape, a hemispherical shape, an ovoid shape, etc.

FIG. 7A shows side magnets 104A and 104B each positioned at the second end of the respective channel 110A or 110B, retracted from surface 16. Assembly 120 is also in a position retracted from surface 16 and adjacent a back wall of housing 80. Assembly 120 and side magnets 104A and 104B assume the depicted positions when the connector 300 is in its disengaged state.

Assembly 120 and side magnets 104A and 104B are drawn towards the depicted positions as a result of mutual attraction between assembly 120 and magnets 104A and 104B. In particular, mutual attraction between assembly 120 and side magnets 104A and 104B causes side magnets 104A and 104B to move along a respective channel 110A or 110B towards assembly 120. As side magnets 104A and 104B move towards assembly 120, the angle of their respective channels 110A and 110B causes the side magnets to move away from surface 16. The mutual attraction between assembly 120 and side magnets 104A and 104B also draws assembly 120 away from surface 16. Further, this mutual attraction causes side magnets 104A and 104B to rotate such that they have the same north-south alignment as assembly 120, i.e., parallel to surface 16.

In this way, mutual attraction between assembly 120 and side magnets 104A and 104B biases them towards a retracted position away from surface 16. Conveniently, no mechanical biasing (e.g., by way of a spring) is required. Further, when connector 300 is in its disengaged state and assembly 120 and magnets 104A and 104B are retracted from surface 16, magnetic flux at surface 16 may be significantly reduced.

FIG. 7B shows connector 300 with side magnets 104A and 104B each positioned at the first end of the respective channel 110A or 110B, i.e., proximate surface 16. At the same time, assembly 120 is a position proximate surface 16 such that stem portion 124 extends past surface 16. Assembly 120 and side magnets 104A and 104B assume the depicted positions when the connector 300 is in its engaged state.

Side magnets 104A and 104B of the connector 300 (which may referred to the first connector 300) are drawn to the first end of the respective channel 110A or 110B by sliding movement along a respective channel 110A or 110B, as a result of attraction between the side magnets 104A and 104B and corresponding side magnets 104A and 104B of a second connector 300 (not shown).

As side magnets 104A and 104B are drawn towards surface 16 along a respective channel 110A or 110B, the angle of the channel causes side magnets 104A and 104B to each move away from assembly 120. Further, as side magnets 104A and 104B in the first connector 300 move along a respective channel 110A or 110B, mutual attraction between the side magnets 104A and 104B in the first connector 300 and the corresponding side magnets 104A and 104B in the second connector 300 causes each of the side magnets to rotate within its respective channel towards the second orientation noted above. Consequently, in each connector 300, mutual attraction between assembly 120 and side magnets 104A, and 104B decreases, and biasing towards a retracted position is reduced.

In each connector 300, movement of side magnets 104A and 104B towards surface 16 draws assembly 120 towards surface 16 Further, as the assembly 120 of the first connector 300 moves towards surface 16, it becomes drawn by the assembly 120 of the second connector 300, and vice versa. In this way, assemblies 120, and side magnets 104A and 104B of the first and second connectors 300 collectively move towards the engaged positions shown in FIG. 49B.

When the two connectors 300 are engaged, side magnet 104A of the first connector 300 is aligned with and magnetically coupled with side magnet 104B of a second connector 300 (in substantially the same manner as shown in FIG. 3B for connectors 100). Similarly, side magnet 104B of the first connector 300 is aligned with and magnetically coupled with side magnet 104A of the second connector 300.

When two connectors 300 are engaged, each side magnet 104A and 104B may have a north-south alignment that is diagonal relative to surface 16 (e.g., as shown in FIG. 3B for connectors 100).

Each of channels 110A and 110B may be oriented at an angle θ (e.g., as shown in FIG. 3A) between 0 degrees and 90 degrees. In some embodiments, the angle θ may be between 0 degrees and 20 degrees. As will be appreciated, a larger angle θ causes side magnets 104A and 104B to move farther away from assembly 120 when a connector 300 transitions from a resting state to an engaged state.

Figure 9A:
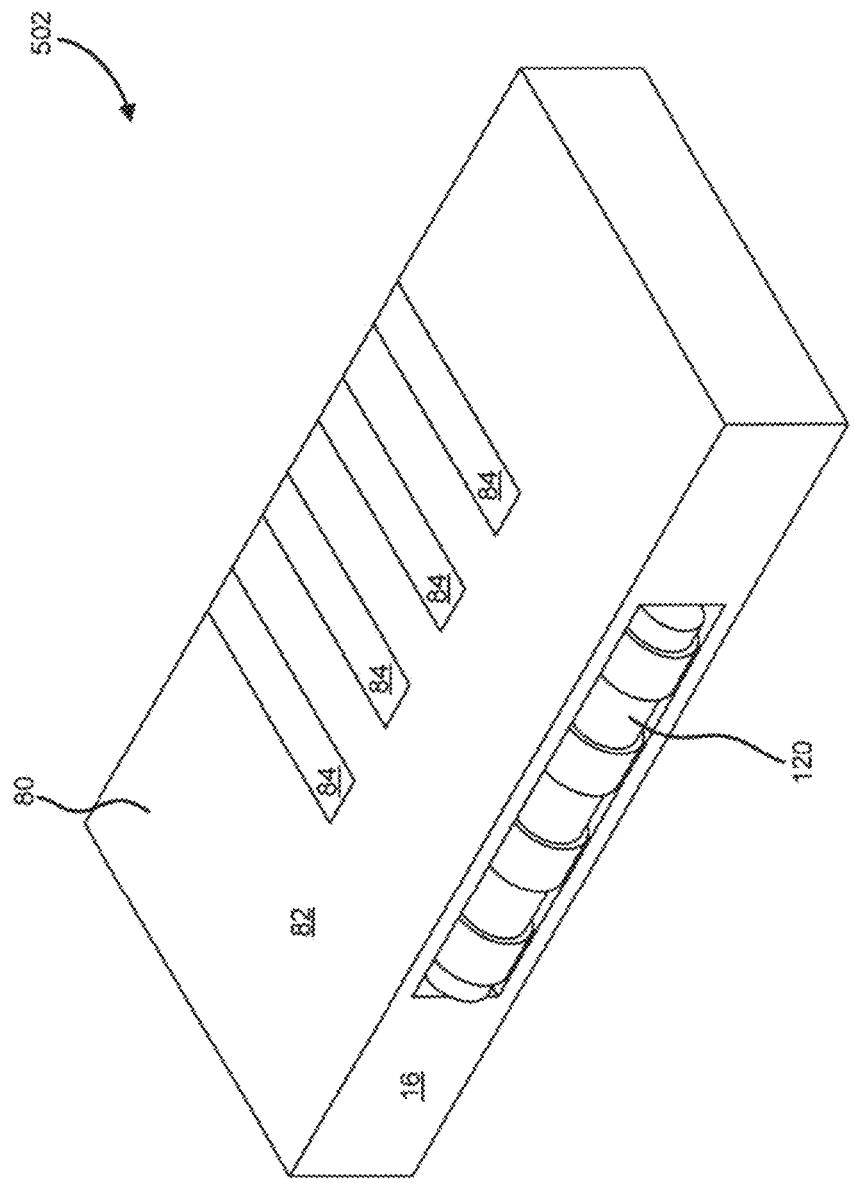
FIGS. 9A, 9B and 9C are perspective, front and top views, respectively, of another connector.
Figure 9B:
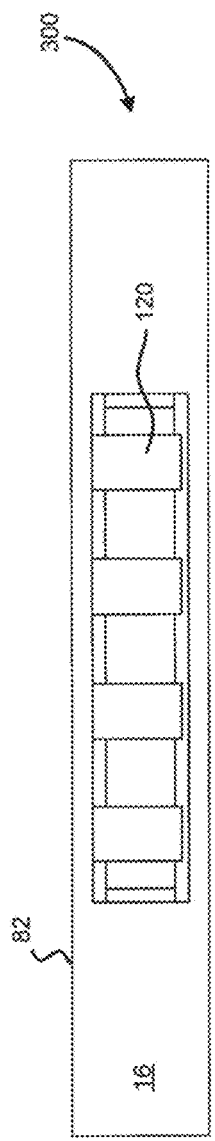
Figure 9C:
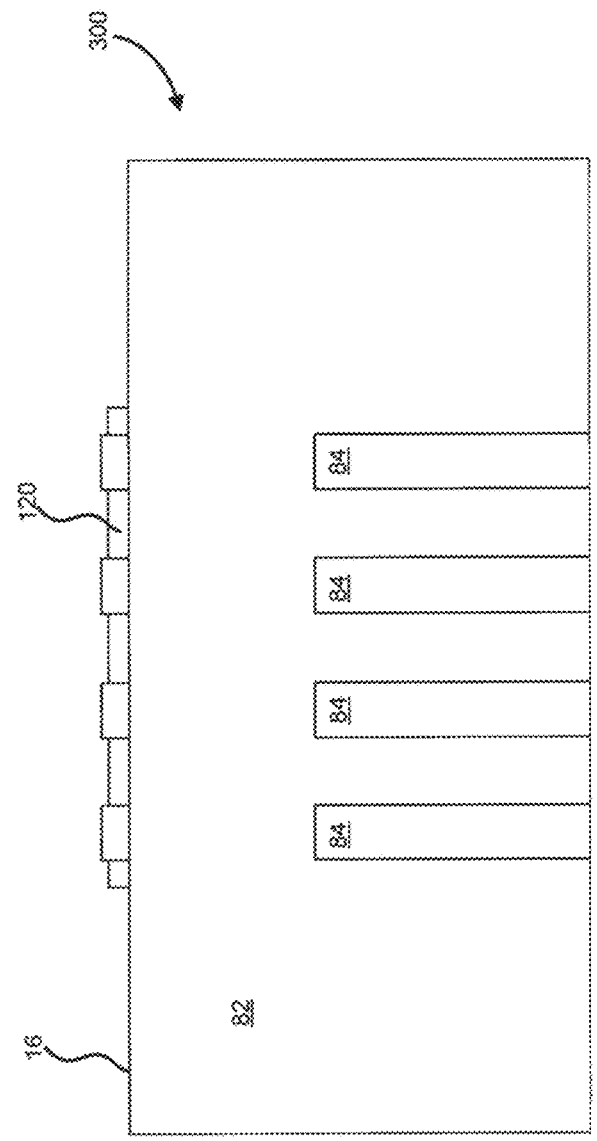

FIGS. 9A, 9B, and 9C are, respectively, a perspective view, a front view, and a top view of connector 300 with a top surface 82 of housing 80 shown. As depicted, top surface 82 includes a plurality of electrical contacts 84, each in electrical communication with a corresponding wire 130 of assembly 120. Electrical contacts 84 allow electrical signals carried by wires 130 to be provided to internal circuitry of a device in which connector 300 is disposed. For example, electrical contacts 84 may serve as solder points for connection of electrical wiring (not shown).

In FIGS. 9A, 9B, and 9C, connector 300 is shown to be in its engaged state such that assembly 120 extends out of housing 80 (as best seen in FIG. 9C).

Figure 10A:
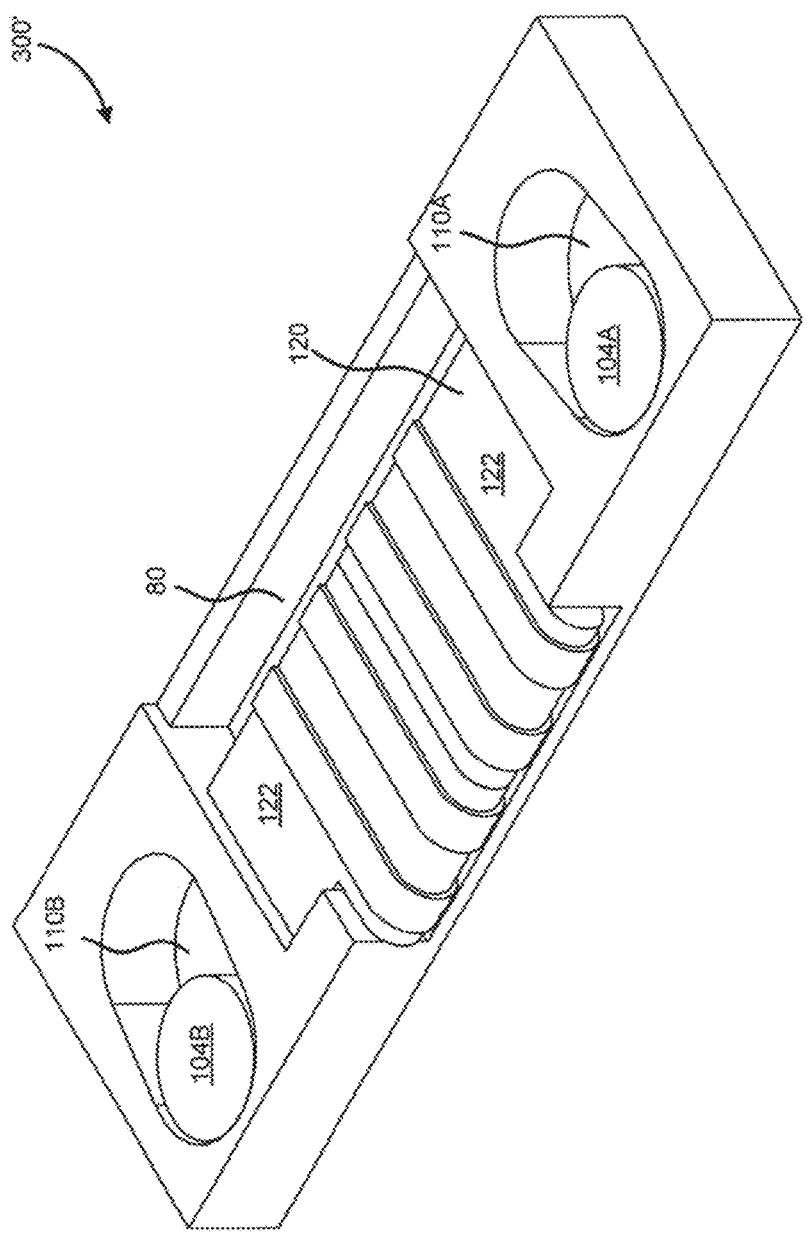
FIGS. 10A, 10B and 10C are perspective views of another connector.
Figure 10B:
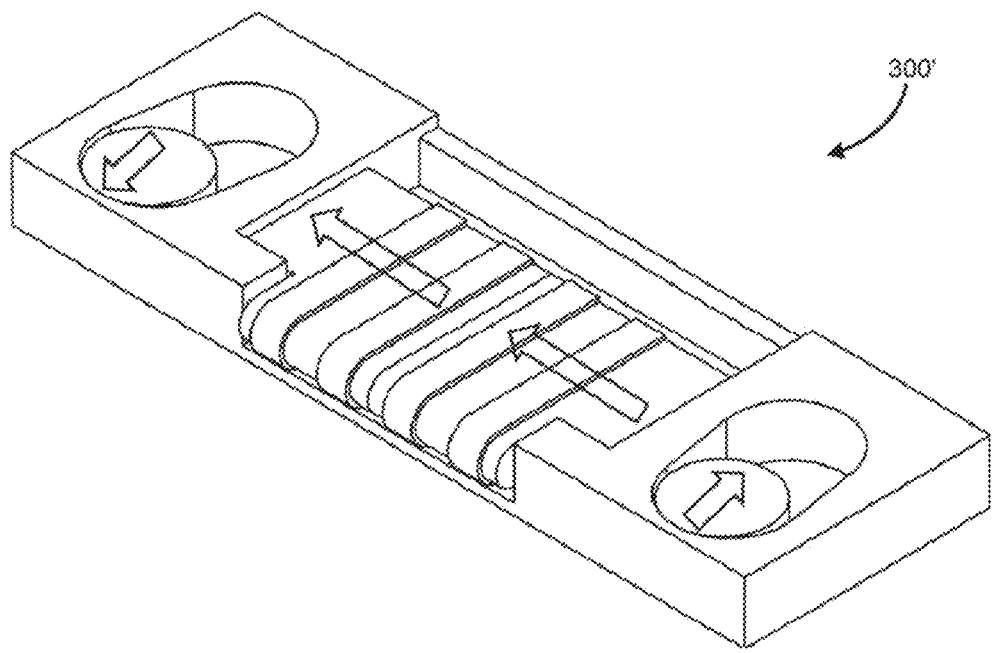
Figure 10C:
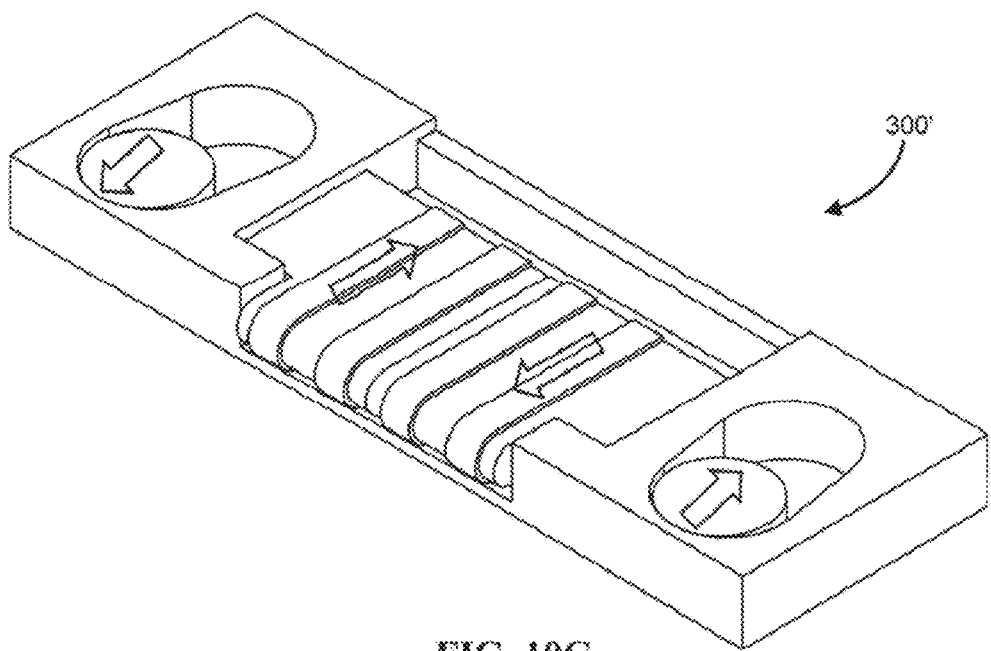

In the embodiment of FIGS. 7A and 7B, assembly 120 is formed from a single core magnet 122. However, in other embodiments, assembly 120 may be formed from multiple core magnets 122. For example, FIG. 10A shows a connector 300' having an assembly 120 formed from two core magnets 122. The core magnets 24 may have the same magnetic orientation (e.g., as shown in FIG. 10B) or different magnetic orientations (e.g., as shown in FIG. 10C). Top housing surfaces are omitted in FIGS. 10A-10C for purposes of illustration.

Figure 11A:
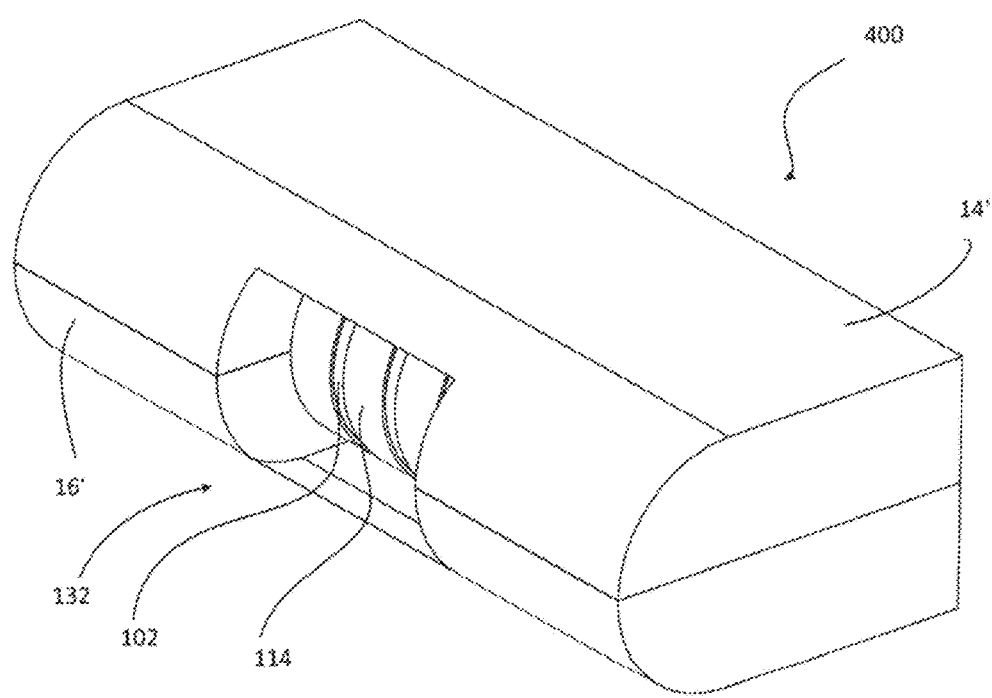
FIGS. 11A, 11B and 11C are perspective, top and side cross-sectional views of another connector.
Figure 11B:
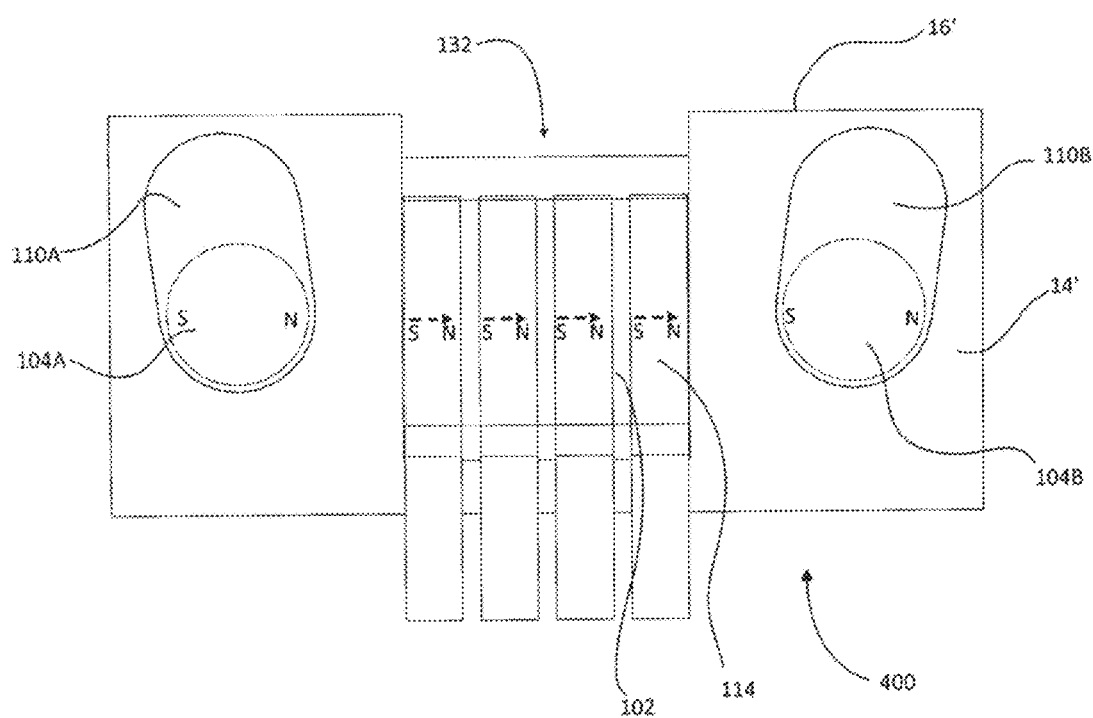
Figure 11C:
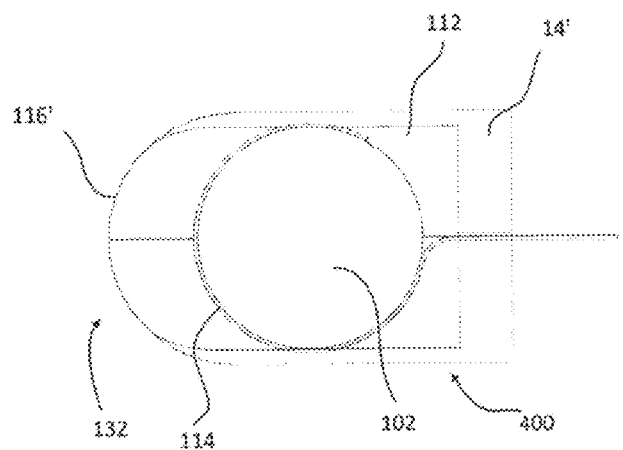

As depicted in FIGS. 3A-10B, device 10 has a flat peripheral surface 16. In other embodiments, the device may have curved surfaces. For example, FIGS. 11A-11C depict perspective, top and side cross-sectional views, respectively of a connector 400, the latter taken at line C-C shown in FIG. 11B. For purposes of illustration, the top housing surface is omitted from FIG. 11B.

Connector 400 is formed in device housing 14', which has a curved side surface 16'. Side surface 16' has a window 132 at the end of channel 112. Connector 400 is otherwise identical to connector 200 described above, and like components are identified with like numerals.

Figure 11D:
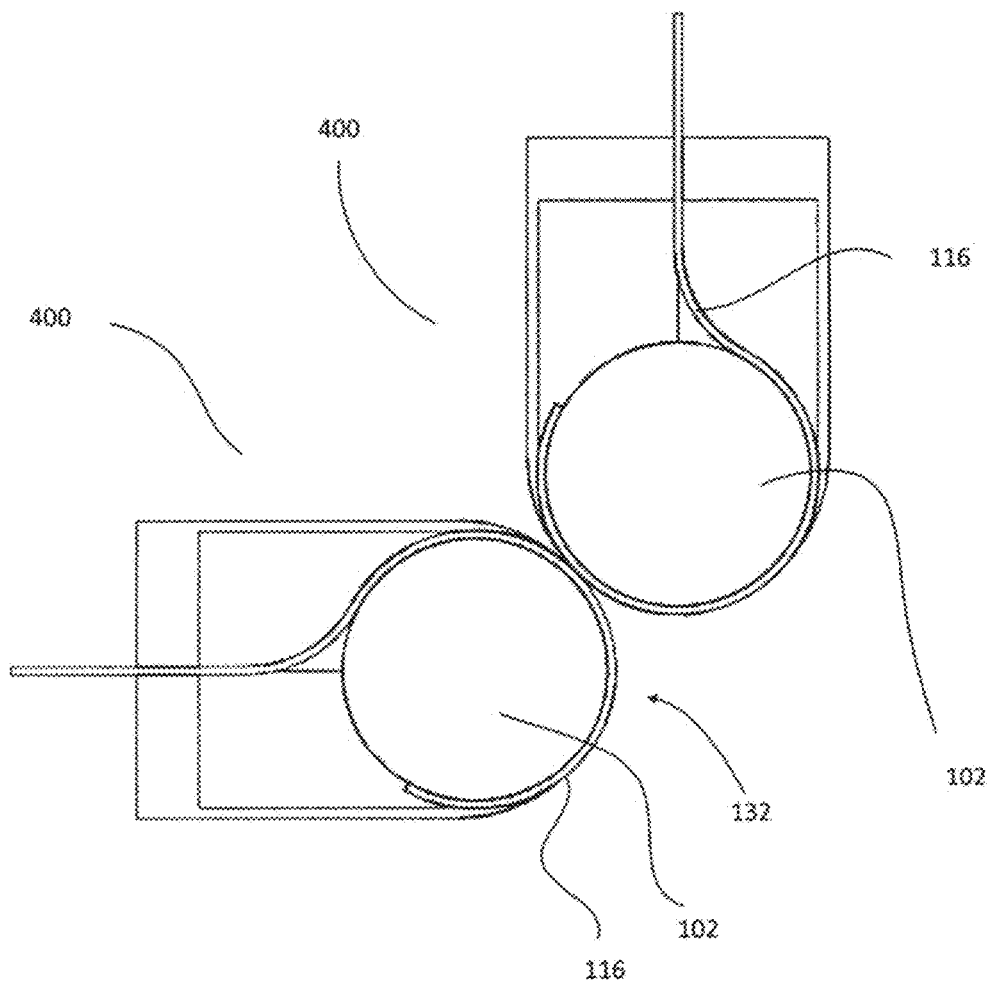
FIGS. 11D and 11E are side cross-sectional views of two connectors of FIG. 11A when engaged in two different orientations.
Figure 11E:
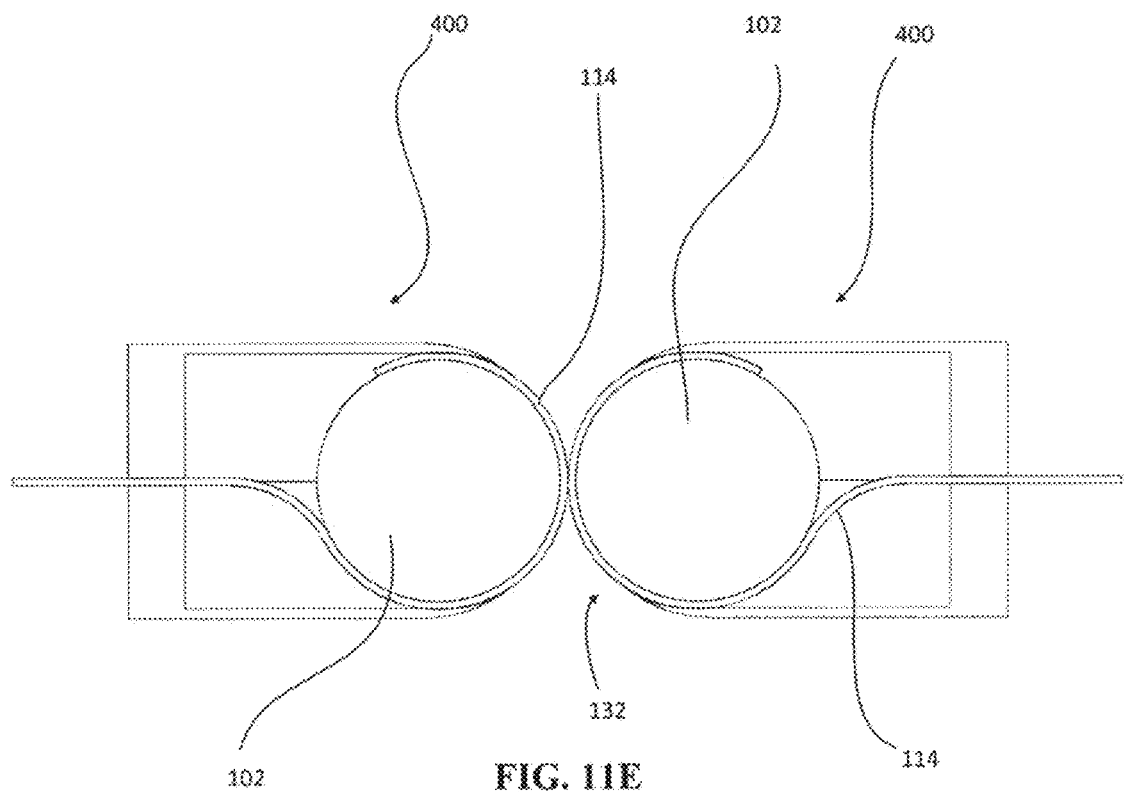

FIGS. 11A-11C depict connector 400 in a disengaged state, with magnets 102, 104A, 104B withdrawn. In the engaged state of connector 400, magnets 102 and leads 116 protrude through window 132 and cooperate with peripheral surface 16' to define a curved surface for interfacing with another connector 400. Once two connectors 400 are brought into abutment and engage one another, they may form a joint that can be pivoted around surface 16'. For example, FIG. 11D shows a side cross sectional view of two connectors engaging one another and positioned at approximately a 90 degree angle to one another. Leads 116 are urged into contact with one another by magnets 102, forming an electrical connection for data or power transmission. FIG. 11E shows connectors 400 engaging one another at approximately a 180 degree angle. Since magnets 102 and leads 116 define a curved contact surface, connectors 400 may be pivoted between the positions of FIGS. 11D and 11E without breaking the electrical connection.

Connectors 100, 200, 300, 400 have magnets 102, 104, 104A, 104B mounted in channels to move generally in a single plane. In particular, magnets 102, 104, 104A, 104B generally move in a plane parallel to the front and rear surfaces of the respective device 10.

Figure 12A:
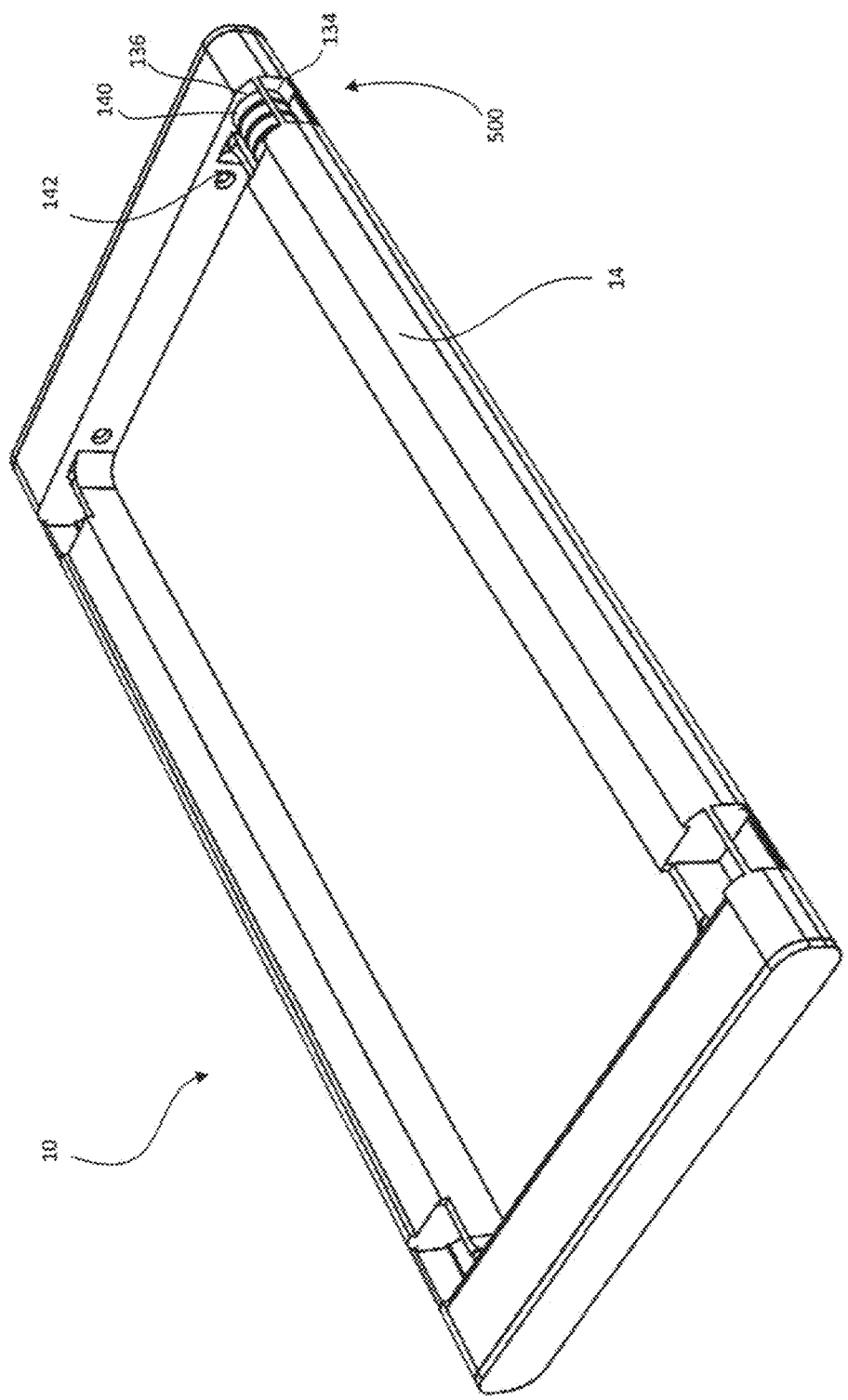
FIG. 12A is a perspective view of a device including another connector.

In some embodiments, magnets may be mounted such that they are movable in two different planes, which may be approximately orthogonal to one another. For example, FIG. 12A depicts a perspective view of a device 10 with a connector 500 with magnets operable to slide laterally (toward a side of the device) and to slide forward and backward (toward the device's front or back surfaces).

Connector 500 includes a plurality of core magnets 140, similar to core magnets 102, mounted in a channel 142. Channel 142 leads to a first window 134 in a lateral surface of device 10 and a second window 140 in a front surface of device 10.

Figure 12B:
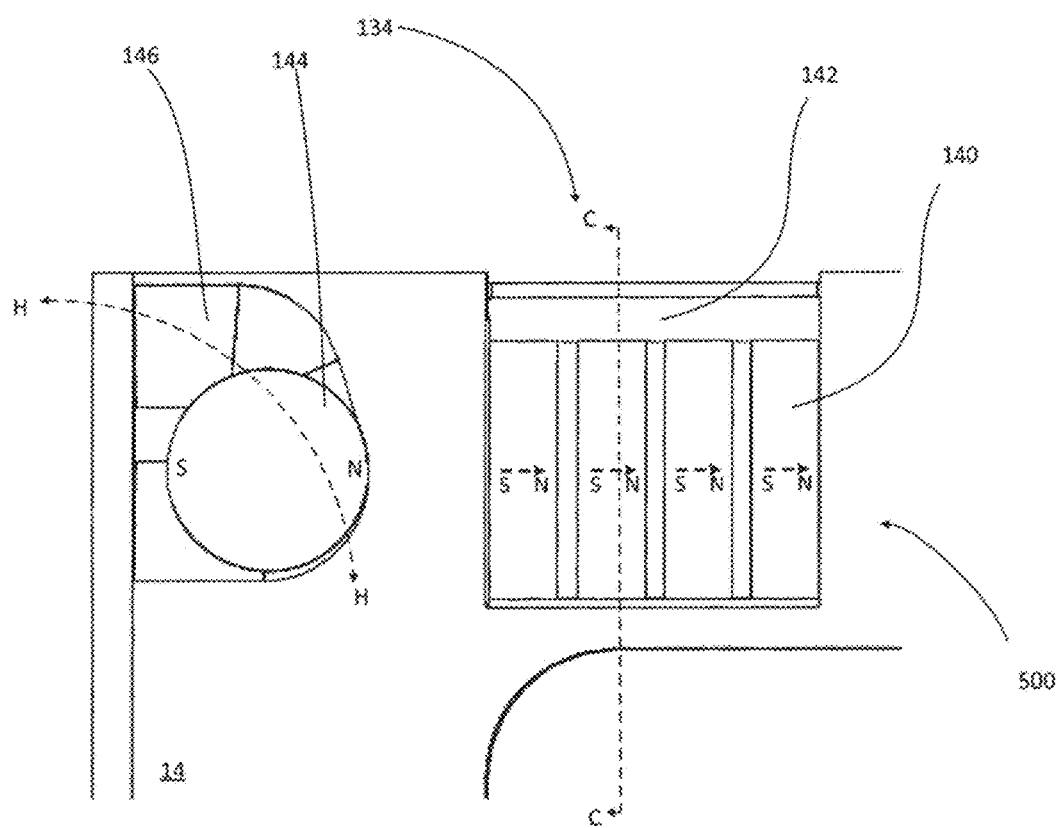
FIGS. 12B and 12C are top and side cross-sectional views, respectively, of the connector of FIG. 12A.

FIG. 12B depicts an enlarged top cross-sectional view of connector 500 in its disengaged state. As noted, connector 500 includes a plurality of core magnets 140 slidably received in a channel 142. As depicted, core magnets 140 are disk magnets, however, as will be apparent, other suitable types of magnets may be used.

Figure 12C:
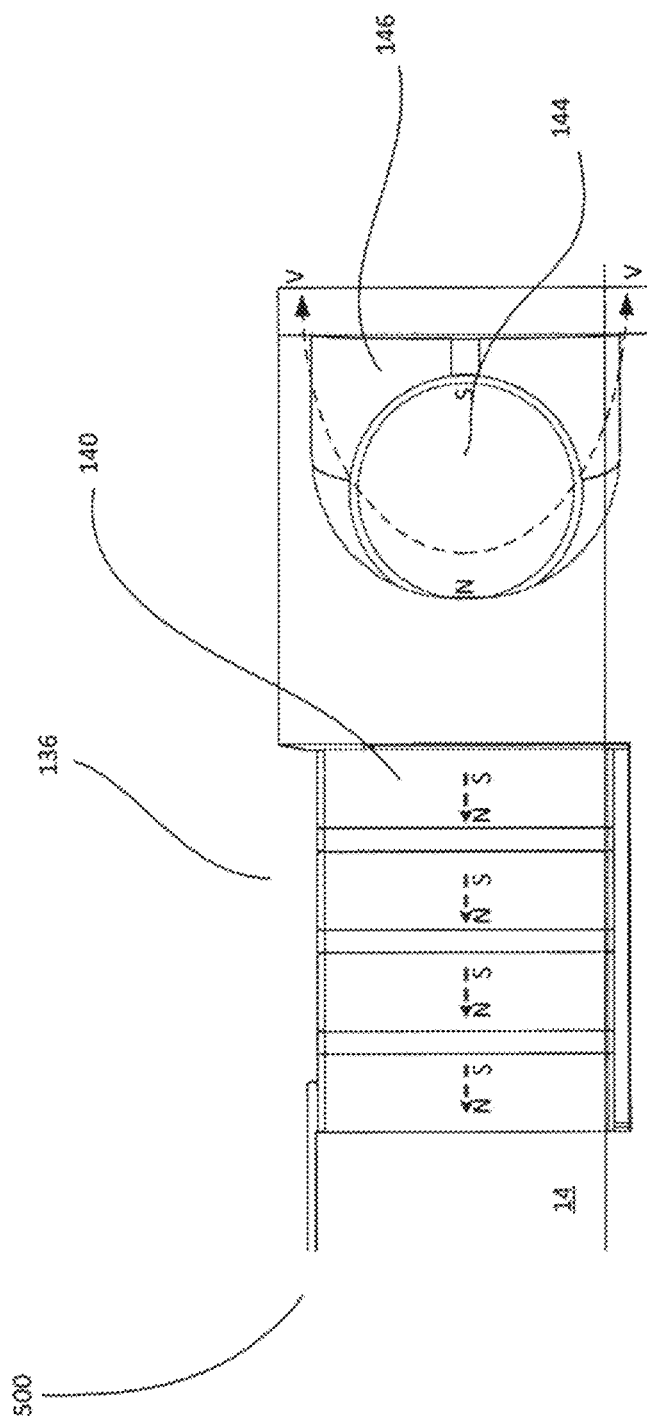

Connector 500 further includes a side magnet 144. Side magnet 144 is spherical. Side magnet 144 is slidably and rotatably received in a channel 146. Channel 146 extends from the interior of housing 14 toward side, top, front and back edges of the housing to define a three-dimensional envelope within which magnet 144 is movable. In particular, magnet 144 is movable between a first position, shown in FIG. 12B, in which magnet 144 is withdrawn relative to each of the side, top, front and back surfaces of housing 14; a second position (FIG. 13B) in which magnet 144 is extended toward a lateral surface of housing 14 to switch connector 500 to an engaged state, and a third position (FIG. 14B) in which magnet 144 is extended toward a front or back surface of housing 14 to switch connector 500 to an engaged state. Channel 146 defines a first path between the first and second positions, identified by the arrows marked H-H in FIG. 12B, and a second path between the first and third positions, identified by the arrows marked V-V in FIG. 12C.

The first position of magnet 144 (FIG. 12B) is the point in channel 146 closest to core magnets 140. Accordingly, in the absence of another connector, magnetic attraction between magnet 144 and magnets 140 biases magnet 144 to the first position. Magnetic attraction likewise biases magnets 140 to a withdrawn position within channel 142 substantially as described above with reference to connectors 100, 200, 300, 400. Magnetic attraction between magnet 144 and magnets 140 may also cause magnet 144 to rotate into alignment with magnets 140. As depicted, the north-south alignment of magnets 140 is parallel to the lateral surface of housing 14. Accordingly, magnet 144 is rotated so that its north-south poles are parallel to the lateral surface of housing 14.

Figure 13A:
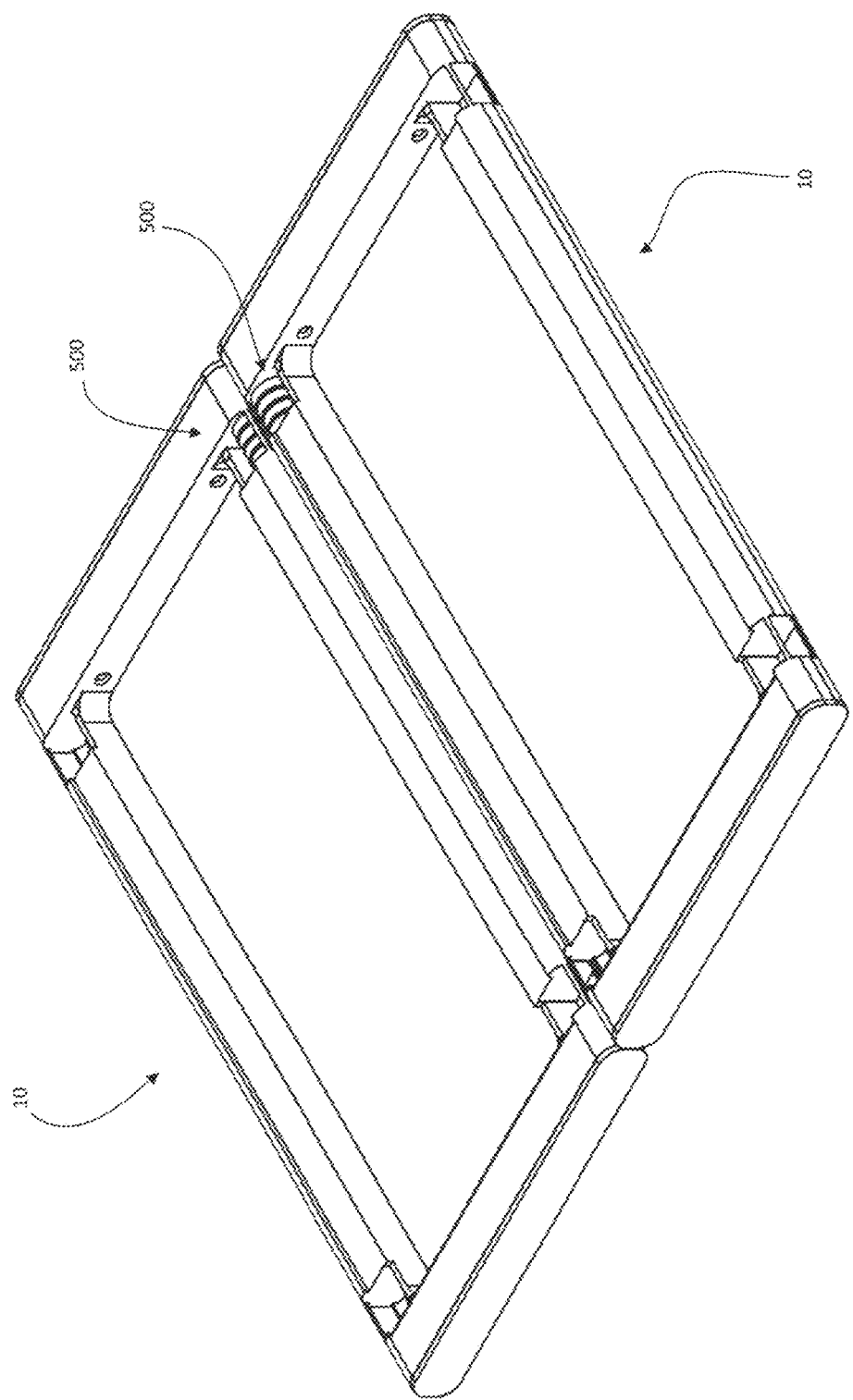
FIG. 13A is a perspective view of two devices including connectors of FIG. 12A, engaged in a first orientation.

As depicted in FIG. 13A, two devices 10 may be placed side-by-side so that connectors 500 abut one another on lateral sides of the devices 10. FIG. 13B shows a top sectional view of two connectors 500 in such a condition FIG. 13C shows a side cross-sectional view of the connectors 500 taken along line C-C in FIG. 13B.

In a manner similar to that described above with reference to connector 100, magnets 144 of adjacent connectors 500 magnetically attract one another sufficiently to overcome the bias between each magnet 144 and its respective core magnets 140. Magnets 144 are pulled toward one another and toward lateral surface 16 of housing 14. As a result of such attraction, magnets 144 move along path H-H (FIG. 12B) to the second position, depicted in FIG. 13B. Magnets 144 may also rotate to present opposite poles to one another. Meanwhile, continued attraction between magnets 140 and magnets 144 may hold magnets 144 in an orientation with north-south poles diagonal to lateral surface 16.

As described above with reference to connector 100, as side magnet 144 is pulled toward lateral surface 16 and rotated, its biasing effect on magnets 140 is reduced. Accordingly, magnets 140 of the two connectors 500 attract one another and cause one another to move toward extended (engaged) positions. In the engaged position, magnets 102 may protrude through window 134 of housing 14.

Figure 14A:
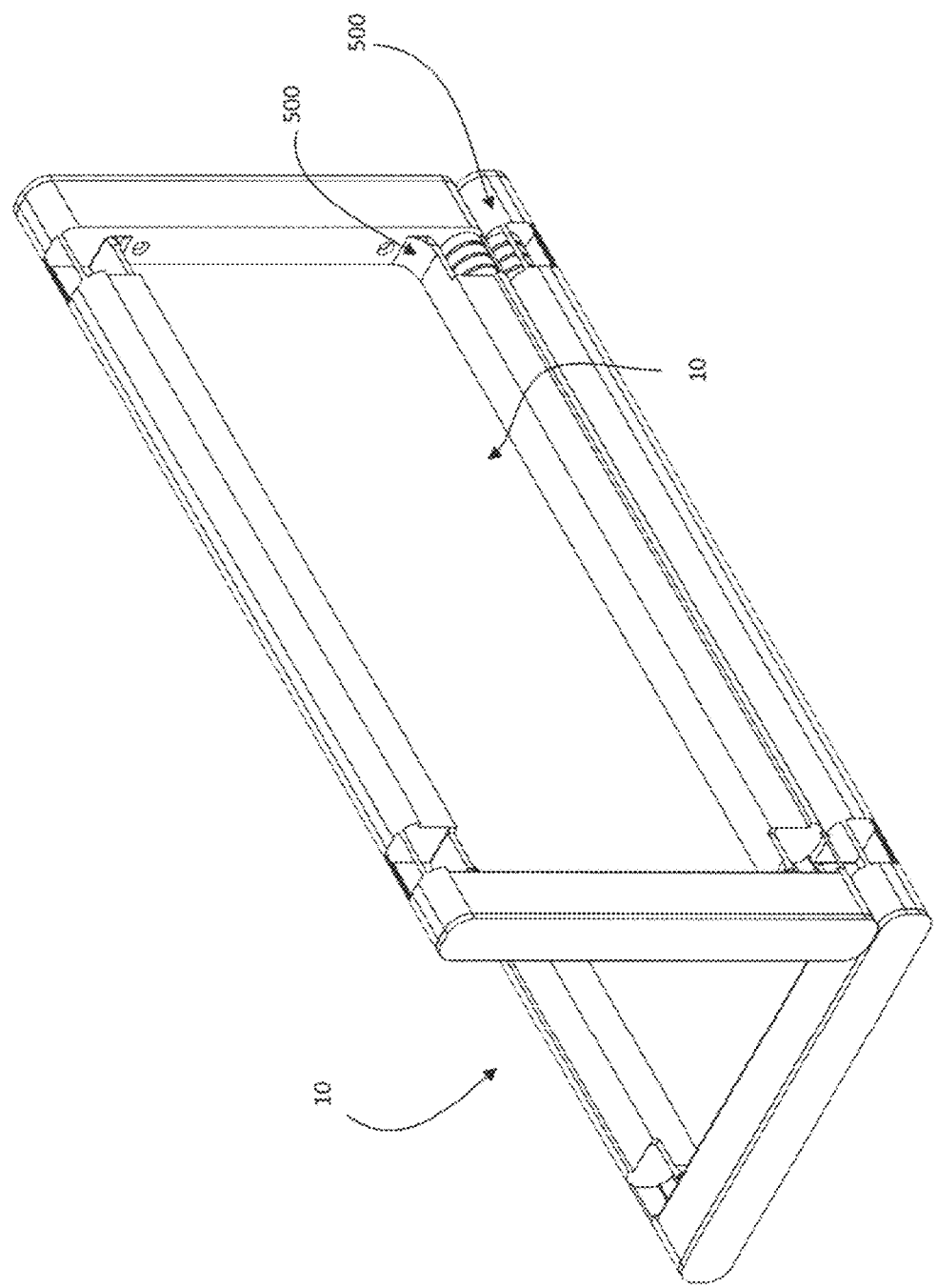
FIG. 14A is a perspective view of two devices including connectors of FIG. 12A, engaged in a second orientation.
Figure 14C:
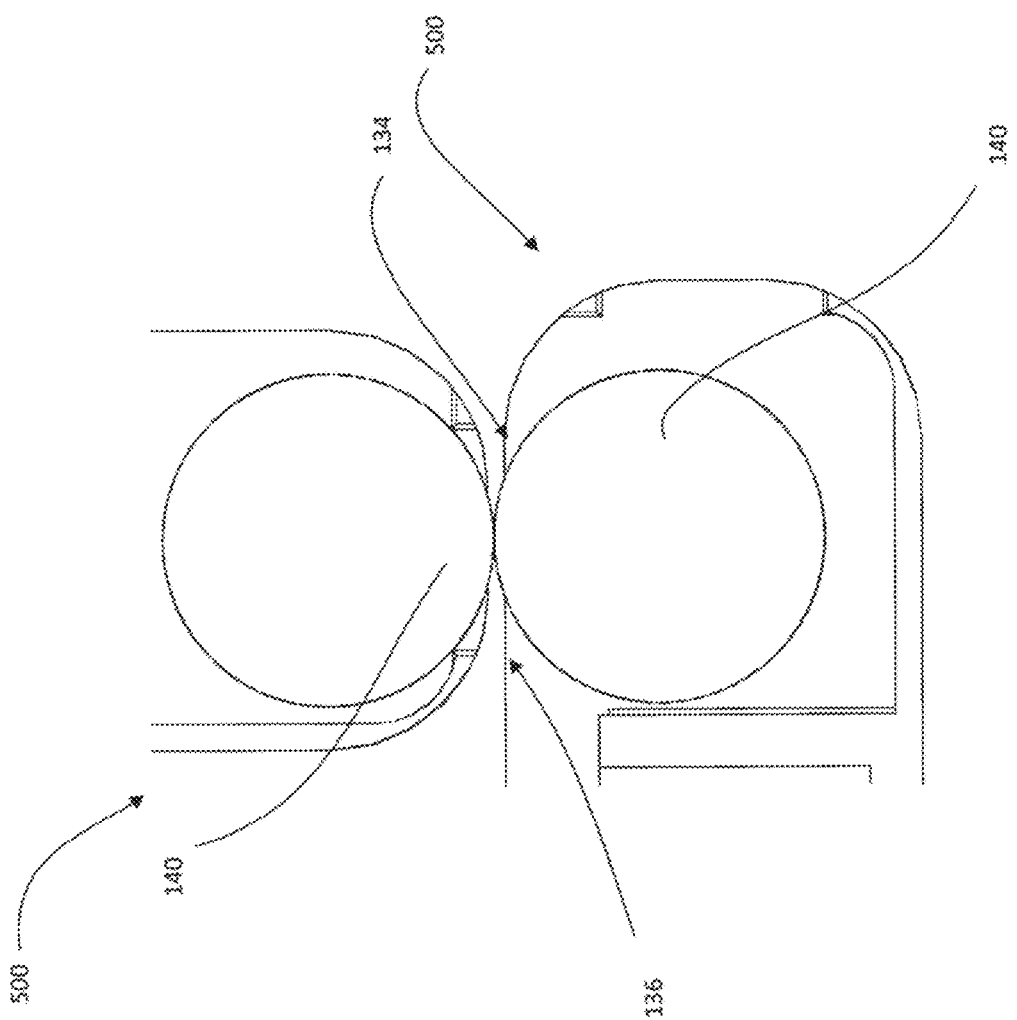

As depicted in FIG. 14A, two devices 10 may be placed in a T configuration so that connectors 500 abut one another, with a top or bottom surface of one device abutting a lateral surface of another device. FIG. 14B shows a top sectional view of two connectors 500 in such a condition. FIG. 14C shows a side cross-sectional view of the connectors 500 taken along line C-C in FIG. 14B.

Magnets 144 of adjacent connectors 500 magnetically attract one another sufficiently to overcome the bias between each magnet 144 and its respective core magnets 140. Magnets 144 are pulled toward one another. In particular, one magnet 144 is pulled toward lateral surface 16 of its device housing 14 and moves along path H-H (FIG. 12B) to the second position. A magnet 144 of the other device is pulled toward a front or back surface of its device housing 14 and moves along path V-V (FIG. 12C) Magnets 144 may also rotate to present opposite poles to one another. As will be apparent, during movement between the first and third positions, magnets 144 may rotate partly about each of a plurality of axes. Continued attraction between magnets 144 and magnets 140 may hold magnets 144 in an orientation with north-south poles diagonal to the front or back surface of the device housing 14.

As described above with reference to connector 100, as side magnet 144 is pulled toward lateral surface 16 and rotated, its biasing effect on magnets 140 is reduced. Accordingly, magnets 140 of the two connectors 500 attract one another and cause one another to move toward extended (engaged) positions. In the engaged position, magnets 140 of one device may protrude through window 134 of that device's housing 14, while magnets 140 of the other device may protrude through window 136 of the other device's housing 14.

Figure 15A:
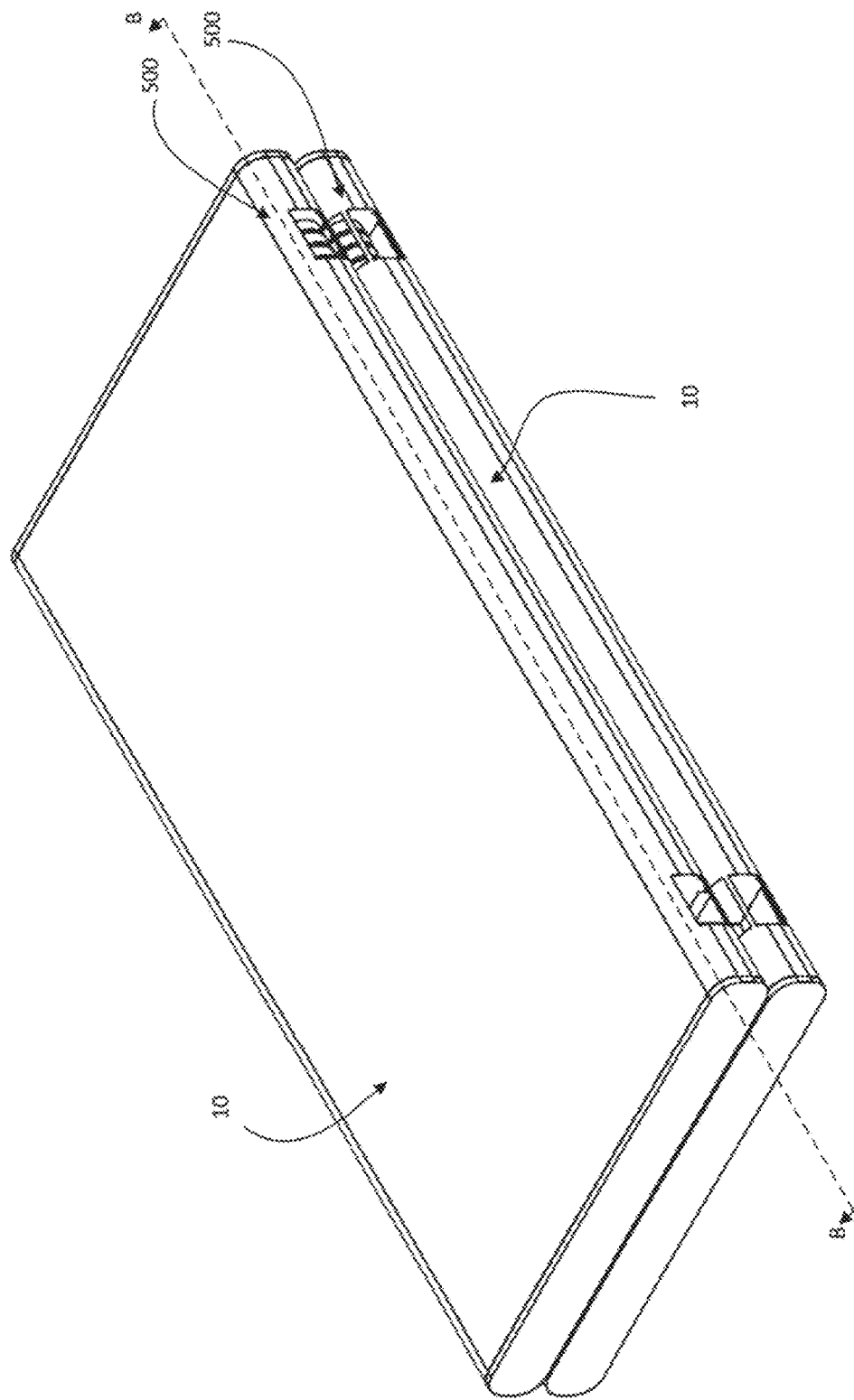
FIG. 15A is a perspective view of two devices including connectors of FIG. 12A, engaged in a third orientation.

As depicted in FIG. 15A, two devices 10 may be placed atop one another so that connectors 500 abut one another, with a top or bottom surface of one device abutting a top or bottom surface of another device. FIG. 15B shows a side sectional view of two connectors 500 in such a condition, taken along line B-B in FIG. 15A. FIG. 15C shows a side cross-sectional view of the connectors 500 taken along line C-C in FIG. 15B.

Magnets 144 of adjacent connectors 500 magnetically attract one another sufficiently to overcome the bias between each magnet 144 and its respective core magnets 140. Magnets 144 are pulled toward one another. In particular, each magnet 144 is pulled toward a front or rear surface of its device housing 14 and moves along path V-V (FIG. 12B) to the third position. Magnets 144 may also rotate to present opposite poles to one another. As will be apparent, during movement between the first and third positions, magnets 144 may rotate partly about each of a plurality of axes. Continued attraction between magnets 144 and magnets 140 may hold magnets 144 in an orientation with north-south poles diagonal to lateral the front or back surface of the device housing 14.

As described above with reference to connector 100, as side magnet 144 is pulled toward lateral surface 16 and rotated, its biasing effect on magnets 140 is reduced. Accordingly, magnets 140 of the two connectors 500 attract one another and cause one another to move toward extended (engaged) positions. In the engaged position, magnets 140 of each device may protrude through window 136 of that device's housing 14

In an example, channels 146 may be configured so that, in the first (disengaged) position, the minimum distance between magnets 144 and magnets 140 is approximately 2.9 mm; in the second position (FIG. 13B), the minimum distance between magnets 144 and the lateral surface of housing 14 is about 0.3 mm; and in the third position (FIG. 15B), the minimum distance between magnets 144 and the front or rear surface of housing 14 is about 0.7 mm.

Figure 16A:
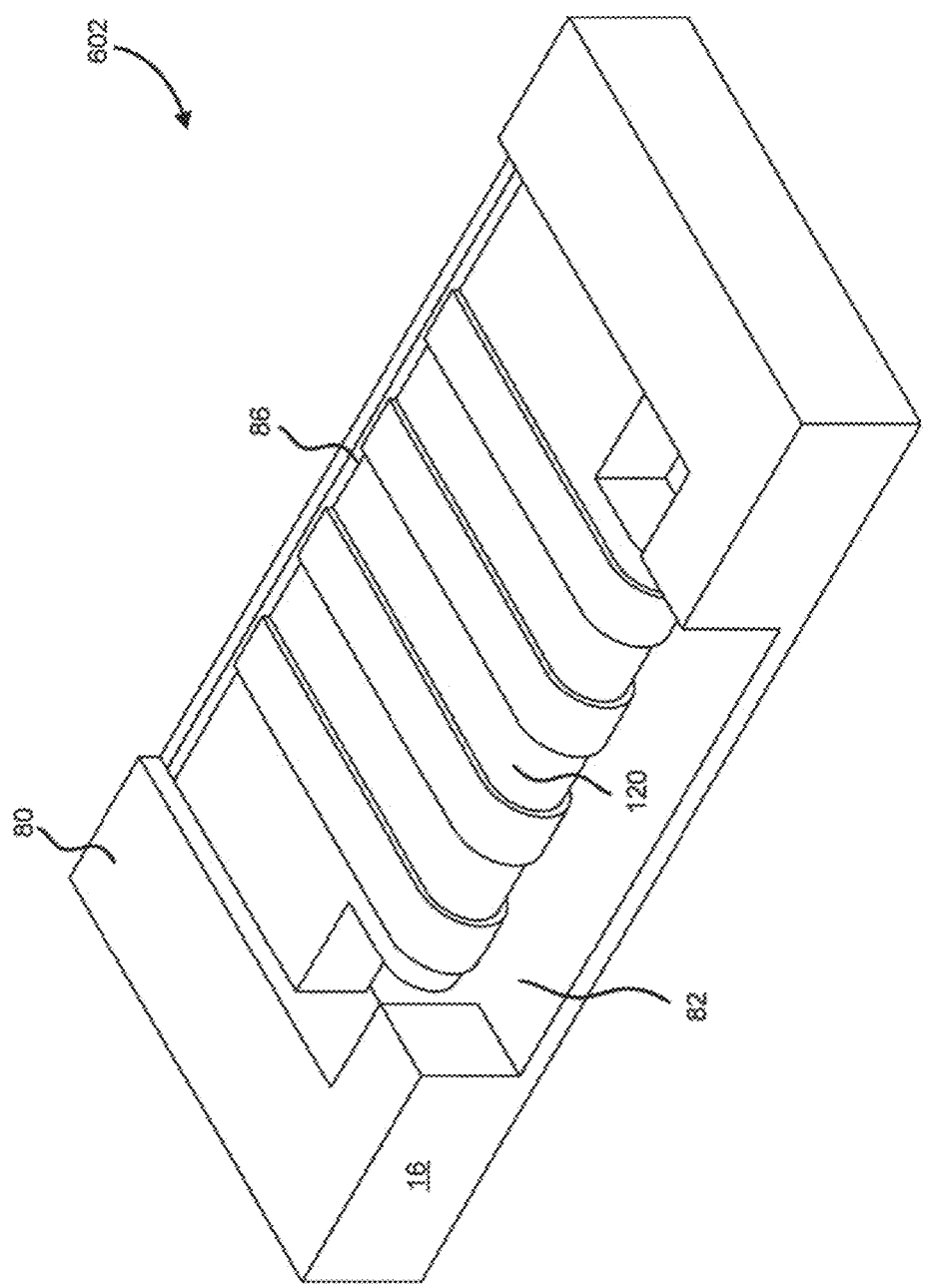
FIGS. 16A and 16B are perspective views of another connector, in disengaged and engaged states, respectively.
Figure 16B:
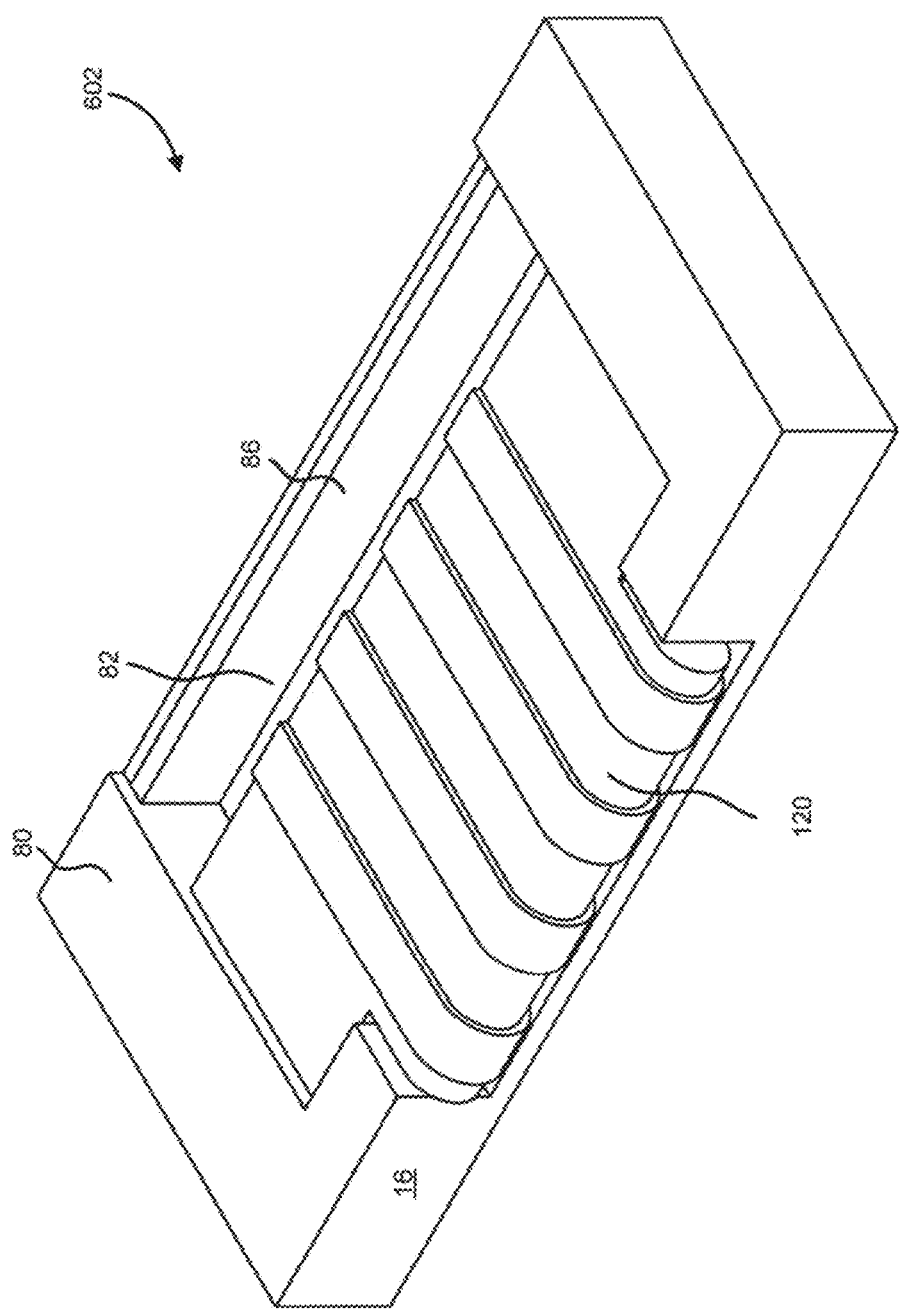

FIGS. 16A and 16B each is a perspective view of a connector 602, with top surfaces omitted for purposes of illustration. Connector 602 omits channels 110A/110B and side magnets 104A/104B of connector 300, and includes a ferrous stop 86 disposed along a rear wall of housing 80 in cavity 82. Connector 602 is otherwise substantially similar to connector 300. In FIGS. 16A and 16B, the top surface of housing 80 is not shown, for clarity of illustration.

Attraction between assembly 120 and ferrous block 86 biases assembly 120 to a retracted position within connector 602 (FIG. 16A). However, when connector 602 is brought into engagement with a corresponding connector 602, attraction between the two connectors 602 overcomes the biasing force provided by ferrous stop 86 and causes assembly 120 to move along the length of cavity 82 towards surface 16. So, assembly 120 moves to an extended position within connector 602 (FIG. 16B) such that connector 602 transitions to an engaged state, and forms magnetic and electrical connections with the corresponding connector. When the connectors are disconnected, attraction between assembly 120 and ferrous block 86 moves assembly 120 back to its retracted position.

In an embodiment, ferrous block 86 may be formed from high-iron content carbon steel. However, ferrous block 86 may be formed from other magnetizable materials. In an embodiment, ferrous block 86 may be replaced with a biasing magnet disposed along the rear wall of housing 80 in cavity 82. As will be appreciated, this biasing magnet is selected to attract assembly 120 more weakly than a corresponding connector to which connector 602 may connect.

Figure 17A:
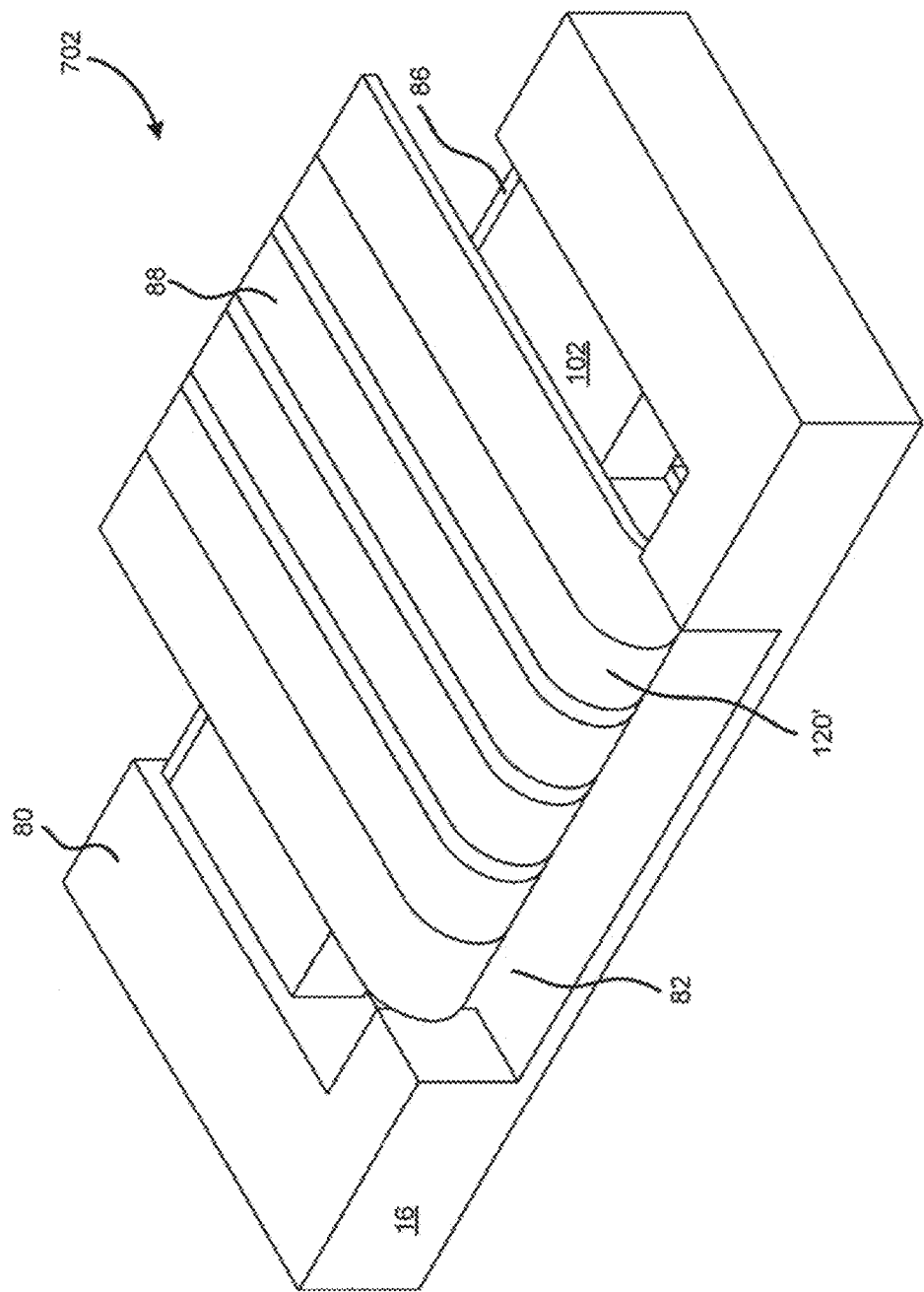
FIGS. 17A and 17B are perspective views of another connector, in disengaged and engaged states, respectively.
Figure 17B:
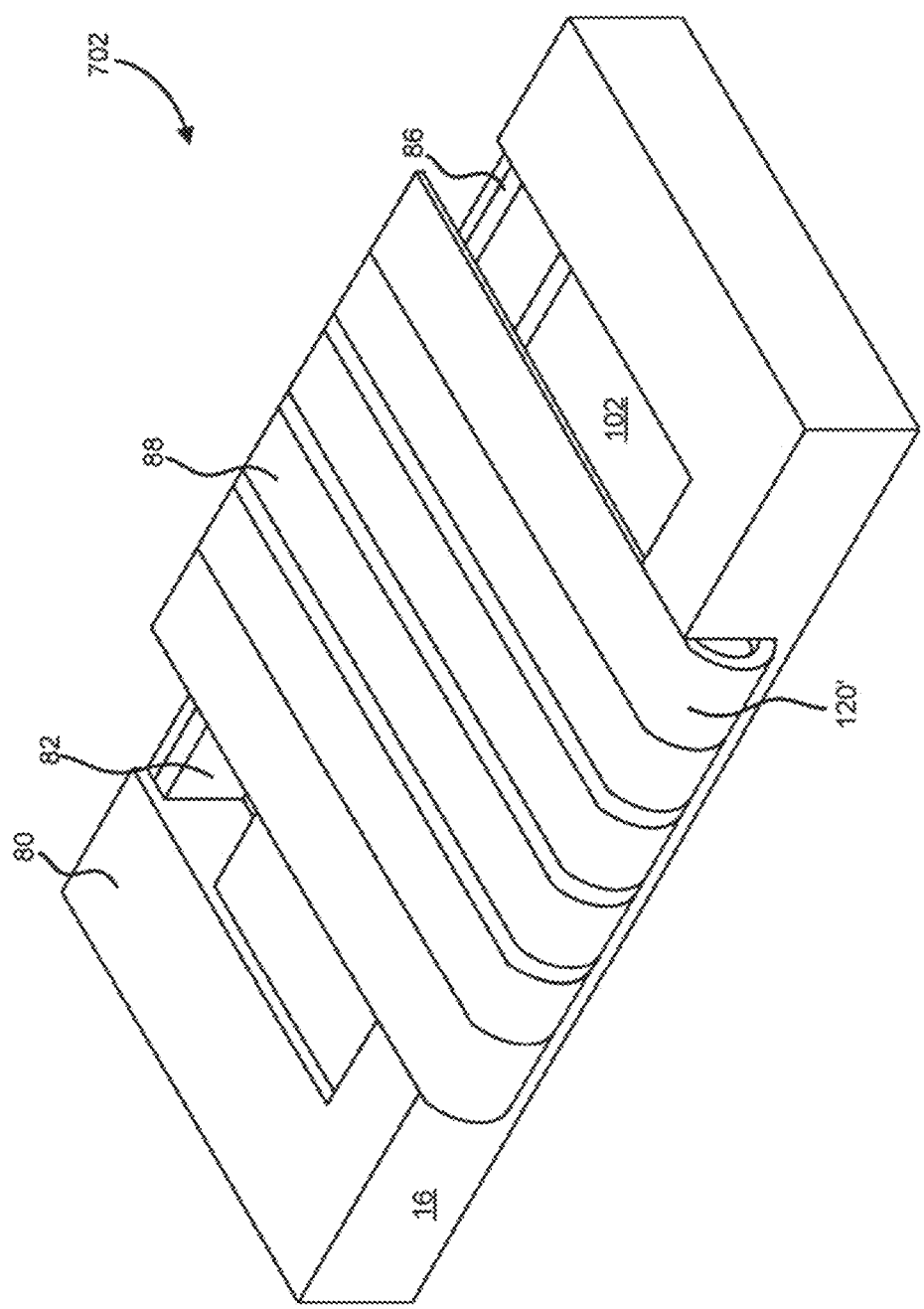

FIGS. 17A and 17B each is a perspective view of a connector 702. Connector 702 omits assembly 120, and includes an assembly 120'. Connector 702 is otherwise substantially similar to connector 602. In FIGS. 17A and 17B, the top surface of housing 80 is not shown, for clarity of illustration.

Assembly 120' differs from assembly 120 in that electrical wires 130 are omitted. Instead, assembly 120' includes a sleeve 88 that covers at least a part of magnet 122 including rounded end 128. Assembly 120' is otherwise substantially similar to assembly 122.

Figure 18B:
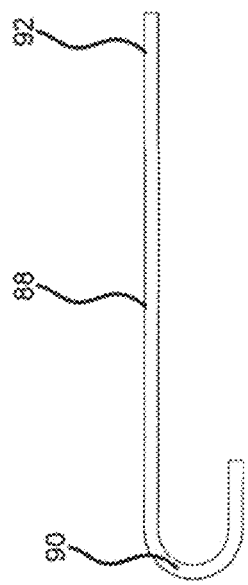
FIGS. 18A, 18B and 18C are perspective, side and top views, respectively, of a component of the connector of FIG. 17A.
Figure 18C:
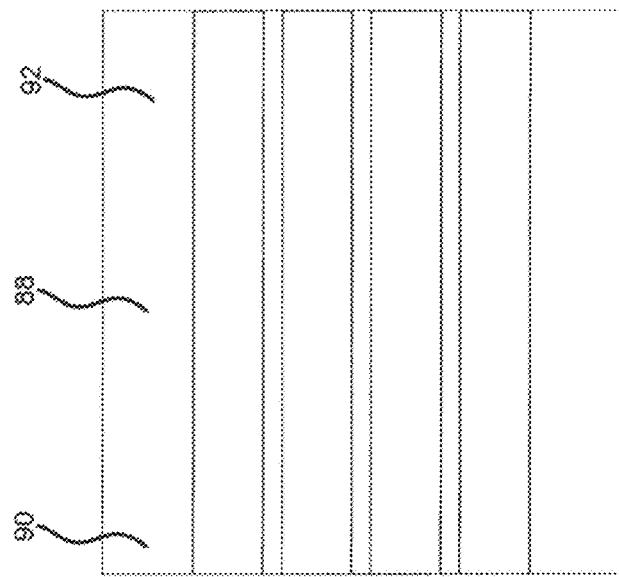
Figure 18A:
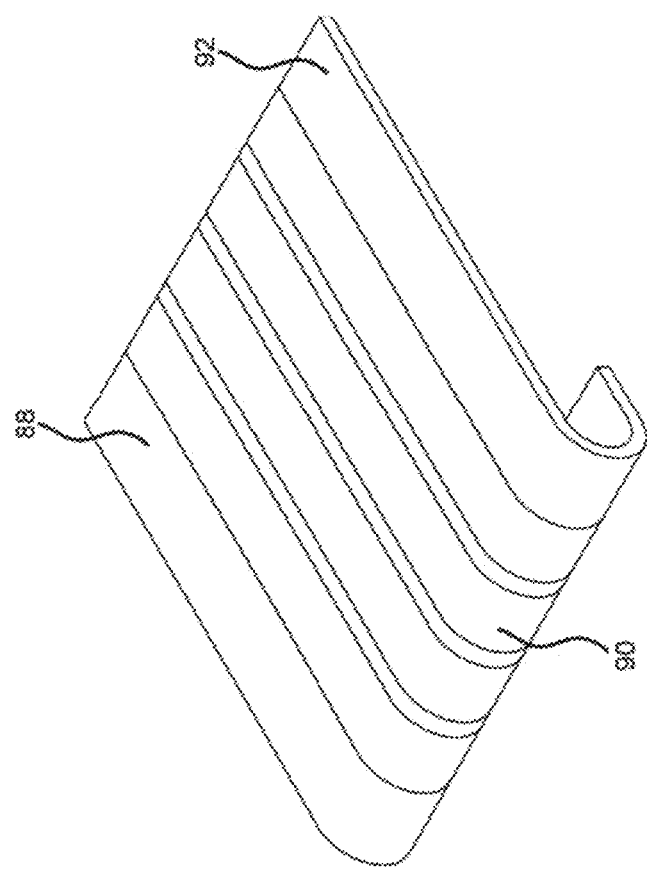

As best seen in FIGS. 18A, 18B, and 18C, sleeve 88 includes a first end 90 that wraps around rounded end 128 of magnet 122, and a second end 92 that extends towards the interior of housing 80.

The outer surface of sleeve 88 (at least at end 90) presents an array of contacts for forming electrical connections with another connector. In a specific example, each of these contacts may form a connection for a particular USB pin/wire, e.g., VCC, D−, D+, GND. As a result, a USB connection may be provided. In other embodiments, the sleeve may allow for a fewer or greater number of electrical connections. Connections other than USB (e.g., Firewire) may be provided. In embodiments in which sleeve 88 provides insulation between the contacts and magnet 122, further insulation is not required. For example, magnet 122 need not be coated with an insulating material.

In an embodiment, sleeve 88 may be a conventional flexible flat cable (FFC).

Sleeve 88 is attached to magnet 122 (e.g., by way of adhesive) such that sleeve 88 and magnet 122 move together, e.g., when connector 702 transitions between an engaged state and a disengaged state. Like assembly 120, assembly 120' is biased to a retracted position, and moves to an extended position when connector 702 is brought into engagement with a complementary connector. When connector 702 is in a disengaged state (FIG. 17A), sleeve 88 is pulled within housing 80. However, when connector 702 is in an engaged state (FIG. 17B), at least end 90 of sleeve 88 extends through an opening in the front wall of housing 80 (e.g., to connect with another connector, a metal surface, etc.).

Figure 19A:
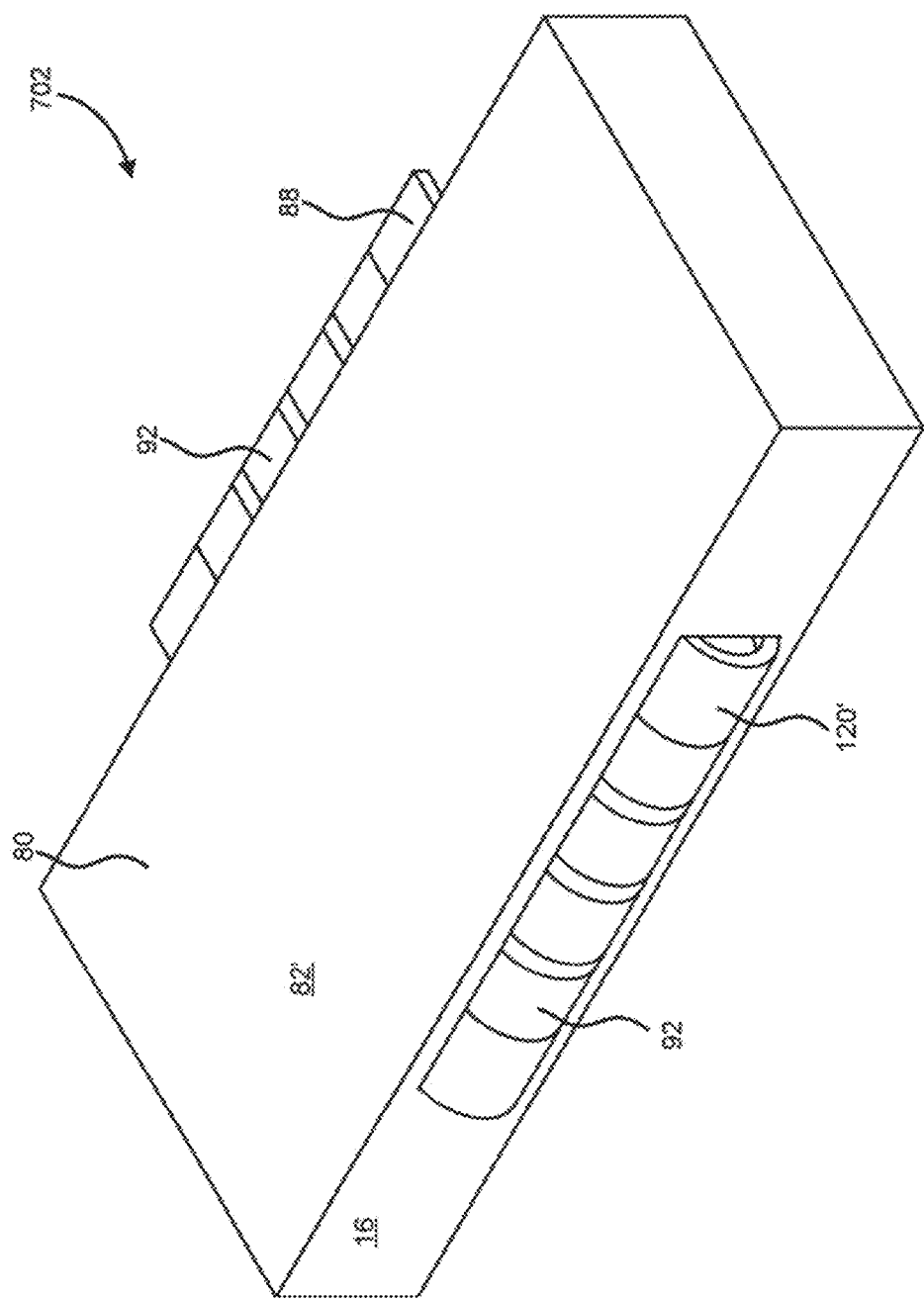

FIGS. 19A, 19B, and 19C are, respectively, a perspective view, a front view, and a top view of connector 702 with a top surface 82' of housing 80 shown. In the depicted embodiment, top surface 82' does not include electrical contacts 84. Instead, internal circuitry of a device in which connector 702 is disposed may be connected directly to end 92 of sleeve 88.

In FIGS. 19A, 19B, and 19C, connector 702 is shown to be in its engaged state such that sleeve 88 of assembly 120 extends out of housing 80 (as best seen in FIG. 19C).

In another embodiment, connector 300 may be modified to include assembly 120' instead of assembly 120.

As described above, side magnets 104, 104A, 104B are slidably and rotatably mounted in channels 110, 110A, 110B. In other embodiments, side magnets may be configured to rotate around around a pivot.

Figure 20A:
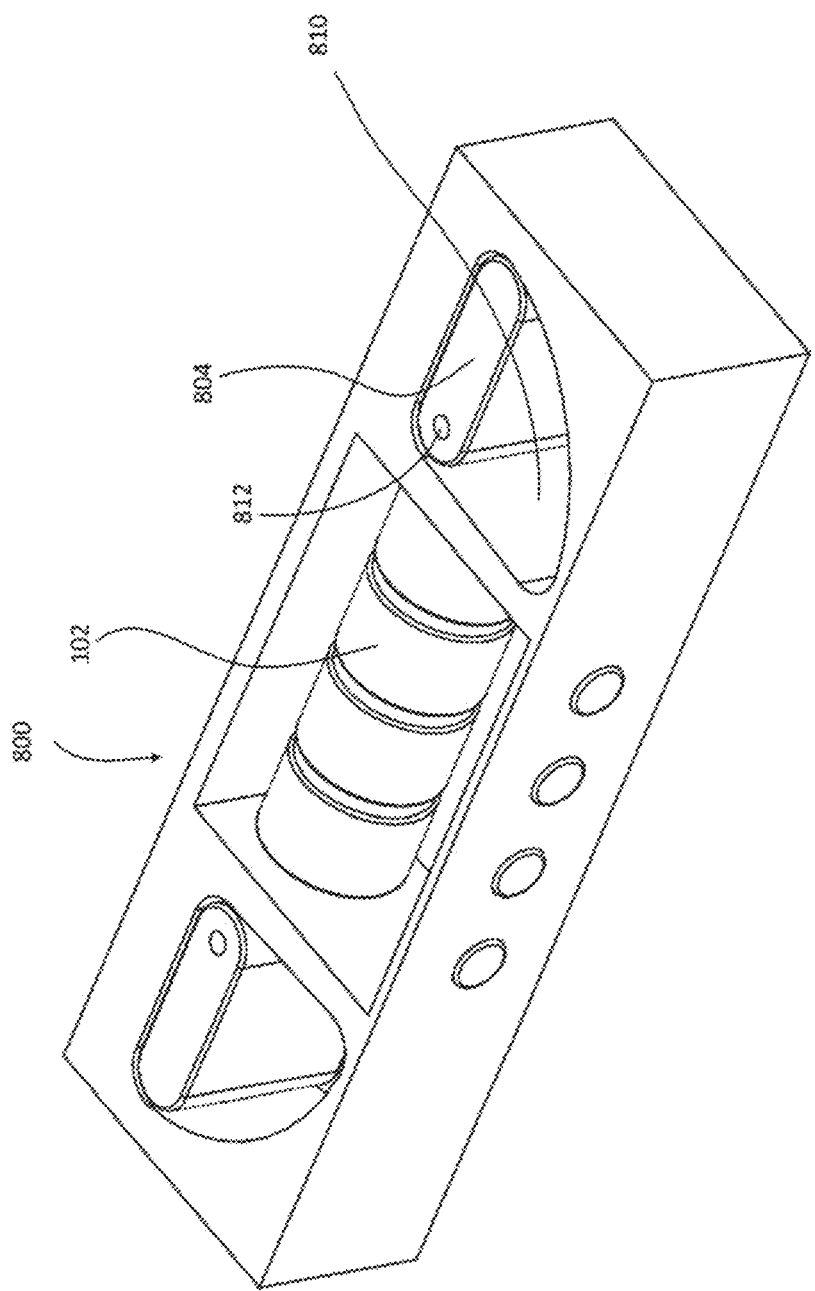
FIG. 20A is a perspective view of another connector in a disengaged state.
Figure 20B:
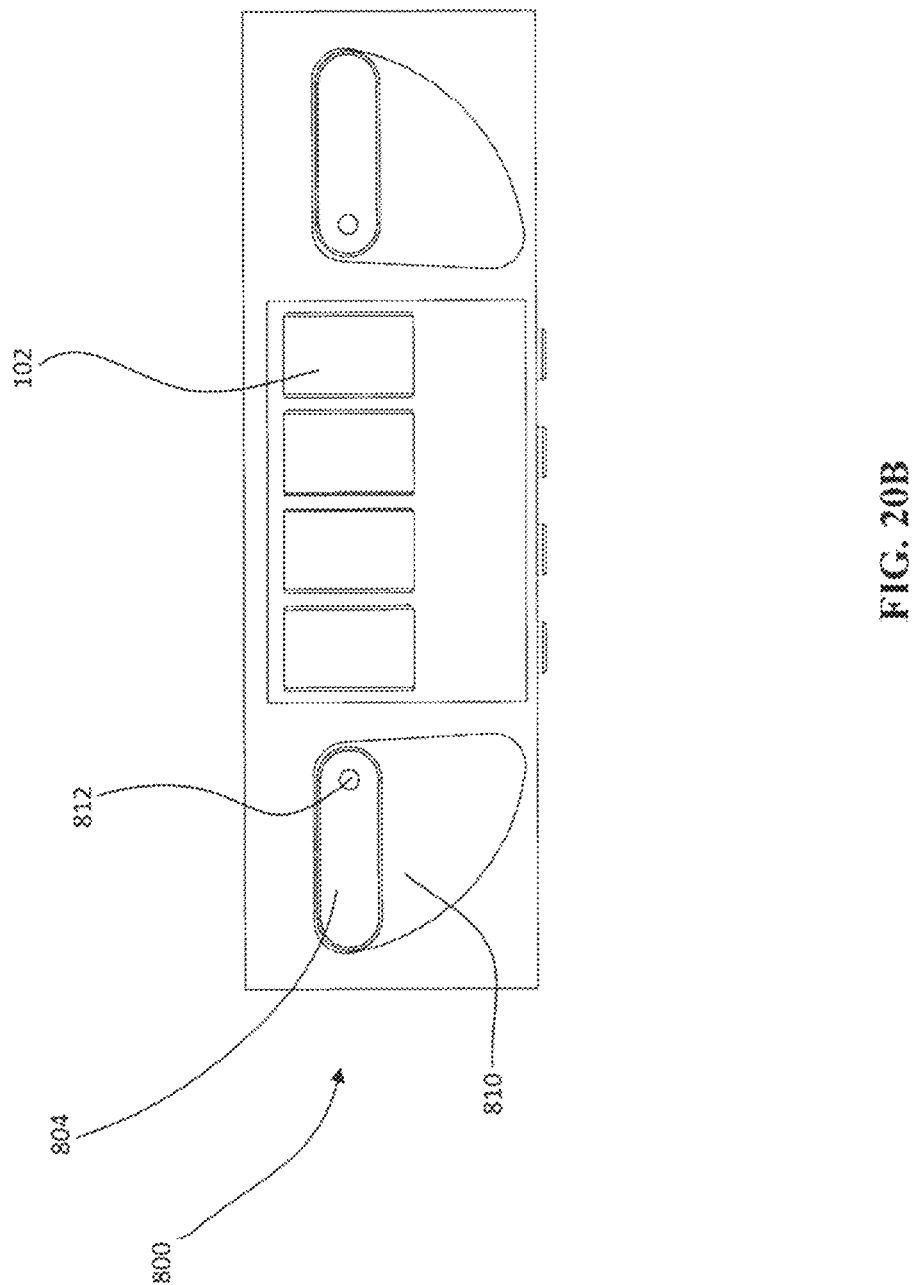
FIG. 20B is a top view of the connector of FIG. 20A.

For example, FIGS. 20A-20B depict perspective and top views, respectively, of a connector 800 with pivoting side magnets 804. Connector 800 is generally similar to connector 100 and have core magnets 102 mounted slidably in a channel 112, substantially identical to those of connector 100 described above. For the sake of illustration, top surfaces are omitted in FIG. 20B.

Magnets 804 are generally bar-shaped. Each magnet 804 is mounted proximate one of its ends to a pivot 812. Magnets 804 and pivots 812 are received in a channel 810. Magnet 804 is free to rotate about pivot 812. As will be apparent, pivots 812 and channels 810 cooperate to guide movement of magnets 804. As will be apparent, the shape of channel 810 defines the range of rotation of magnet 804.

Figure 20C:
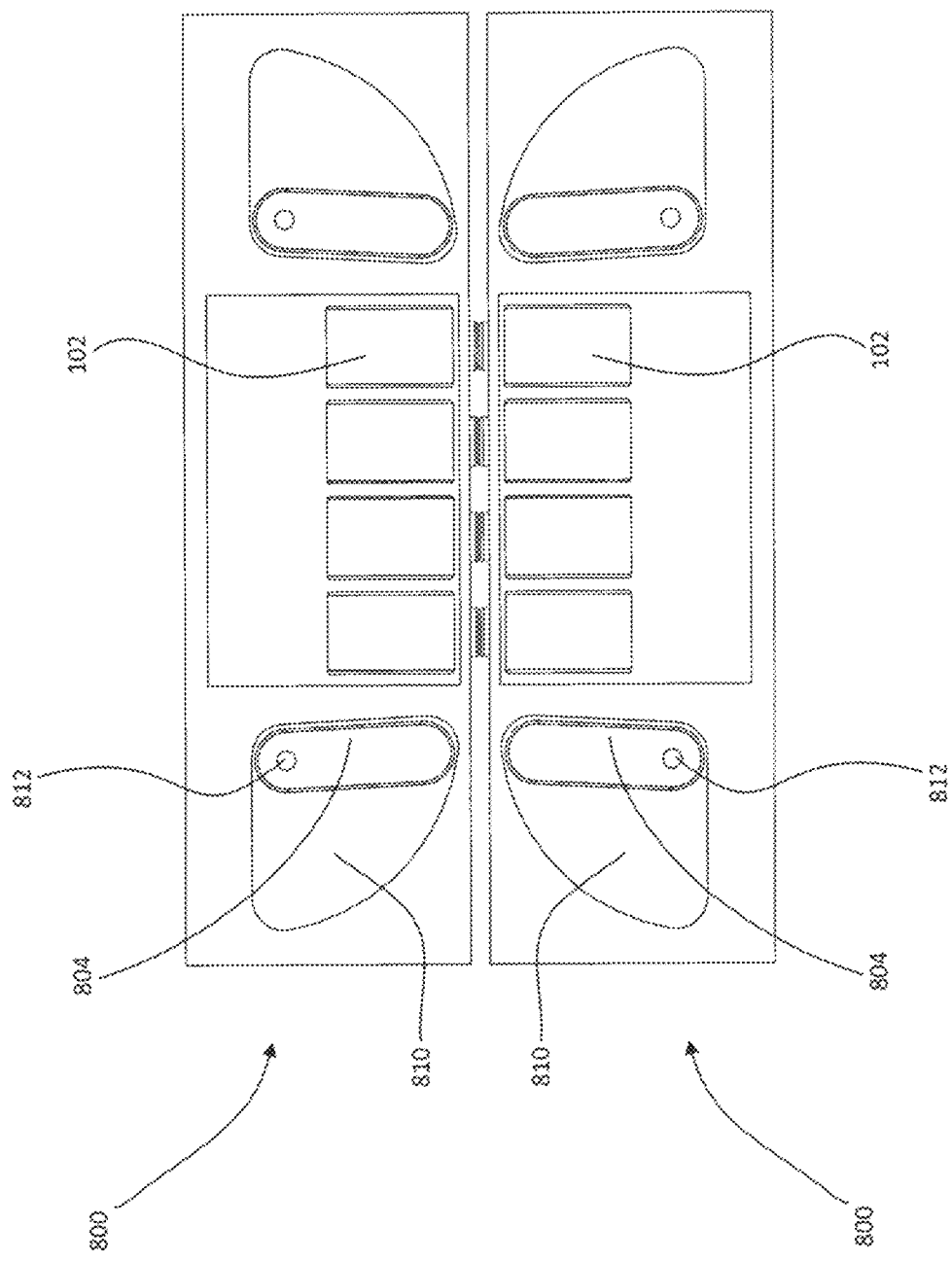
FIG. 20C is a top view of two connectors of FIG. 20A in an engaged state.

FIGS. 20A-20B depict connector 800 in the disengaged state and FIG. 20C depicts connectors 800 in the engaged state. Magnets 804, 102 bias one another to the disengaged state. As depicted, in the disengaged state, magnets 804 are rotated such that they are generally parallel to the edge of the connector. In this orientation, magnets 804 may be magnetically aligned with magnets 102 and magnetic attraction between magnets 804, 102 may bias magnets 102 inwardly. When connector 800 is positioned adjacent another connector, attraction between side magnets 804 of the two connectors overcomes the bias between magnets 804, 102 and causes the magnets 804 to rotate towards one another as depicted in FIG. 20C. In the engaged position, the magnetic poles of magnets 804 may be oriented diagonally to the edge of connector 800. As described above, rotation of magnets 804 may reduce the inward biasing of magnets 102, which may in turn allow magnets 102 to draw one another into contact.

Other types of guides are possible. For example, magnets may be mounted to pins received in slots within the housing. Alternatively, the housing may define a single guide wall rather than a channel.

In some embodiments, core magnets 102/140 may be replaced with contact assemblies. FIG. 21A is a top perspective view of an example contact assembly 102 and FIG. 21B is an exploded view of the same connector. As shown, contact assembly 1002 is formed from an interleaved stack of cylindrical magnets 1004, round conductive pads 1006, and round insulative pads 108. Contact assembly 1002 is cylindrical in shape.

Each magnet 1004 is substantially similar to a magnet 102 described above. Each magnet 1004 may attract and attach to a corresponding magnets (i.e., with an opposing polarity) on a connector of another device to establish electrical connections between the devices through the magnets.

Each conductive pads 1006 is formed from a thin layer of electrically conductive material, and is stacked in electrical communication with an associated magnet 1004. Each conductive pad 1006 includes a tab or pin that may be connected to a pin of an internal I/O interface of device 10 (FIG. 2B), to facilitate signal transmission between contact assembly 1002 and the internal I/O interface.

Each insulative pad 1008 is formed from a thin layer of electrically insulative material, and is stacked to provide electrical insulation between certain adjacent pairs of magnets 1004 and conductive pads 1006, as shown.

Collectively, the stack of magnets 1004, pads 1006, and pads 1008 allow a signal bus to be established through contact assembly 1002. This signal bus may conform to a conventional signaling standard such as the Universal Serial Bus (USB) protocol. So, each conductive pad 1006 and associated magnet 1004 may carry a signal corresponding to a particular USB pin/wire, namely, VCC, D−, D+, GND. Thus, each contact assembly 1002 may carry signals in a manner similar to a conventional 4-pin USB connector. This allows device 100 to communicate through contact assembly 1002 using the USB protocol.

In other embodiments, contact assembly 1002 may be modified to include a stack having a greater or fewer number of magnets 1004, pads 1006, and pads 1008. For example, a greater number of magnets 1004, pads 1006, and pads 1008 may be included to increase bus width and thereby increase data throughput on the bus.

Figure 22A:
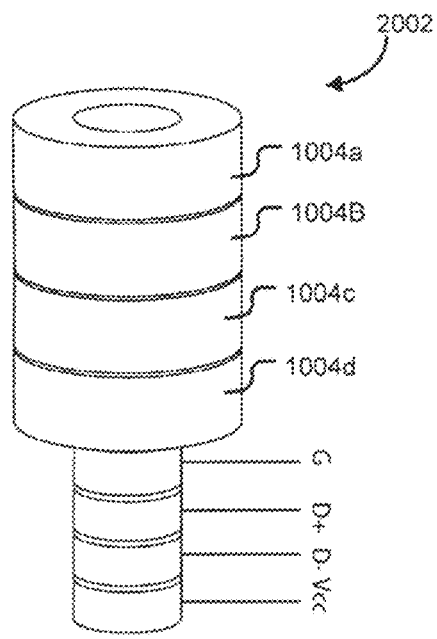
FIG. 22A is a side view of a connector assembly.
Figure 22B:
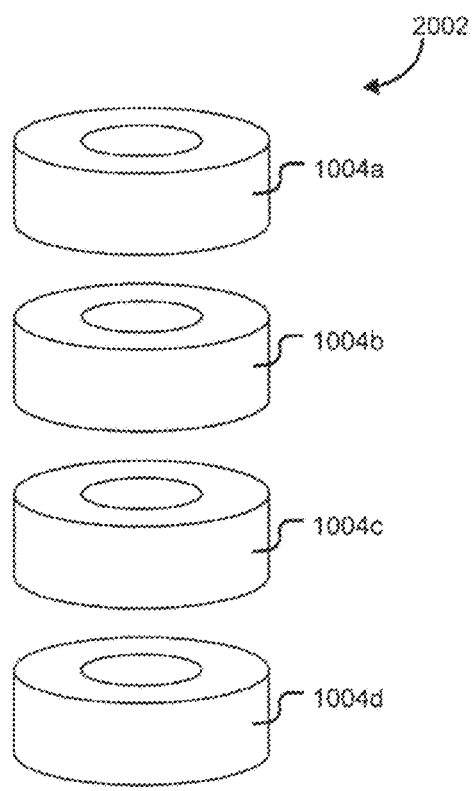
FIG. 22B is an exploded side view of the connector assembly of FIG. 22A.
Figure 22C:
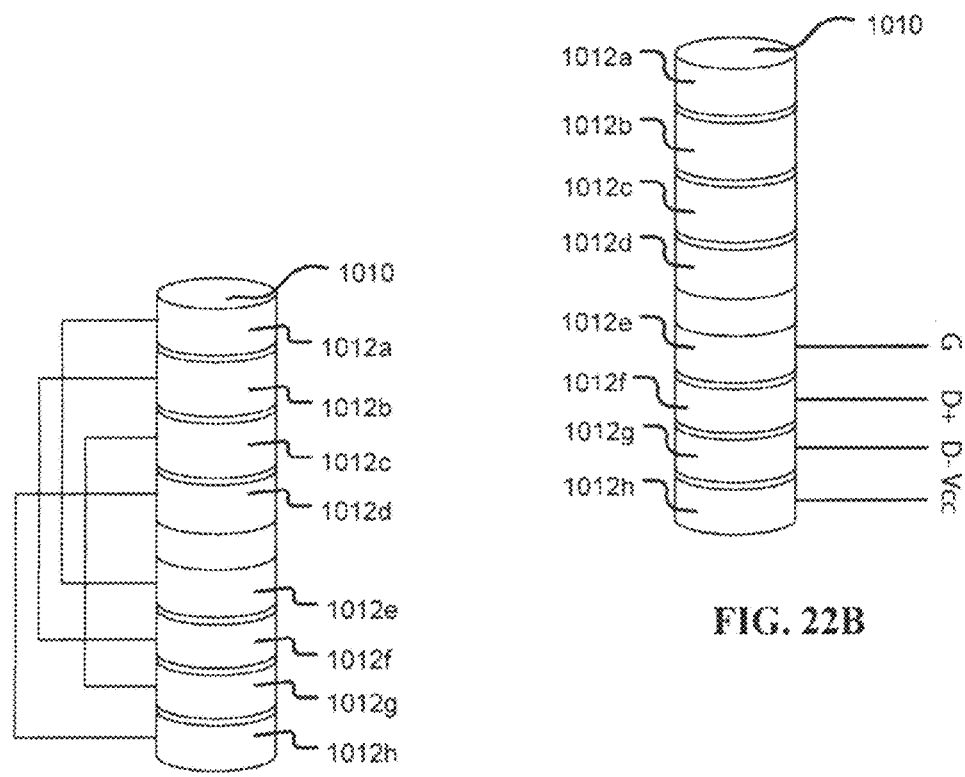
FIG. 22C is a schematic view of a plug of the connector of FIG. 22A.

FIGS. 22A, 22B, and 22C show a contact assembly 2002, according to another example embodiment, that may be used in place of contact assembly 1002. Each contact assembly 2002 is adapted to mate with another contact assembly 2002 on another device. When mated, connectors 2002 allow two devices to connect both mechanically and electrically. Contact assembly 2002 is cylindrical in shape.

FIG. 22A is a top perspective view of contact assembly 2002 including a stack of magnets 1004a, 1004b, 1004c, 1004d (collectively referred to as magnets 1004) and an elongate plug 1010 extending from a bottom end of the stack. Each magnet 1004 in the stack includes a hole extending therethrough such that a channel is formed through the stack for receiving plug 1010.

FIG. 22B is an exploded view of the contact assembly 2002 revealing the entire length of plug 1010 including its constituent segments 1012a through 1012h. FIG. 22C shows the interconnections between segments 1012a through 1012h of plug 1010.

In some embodiments, plug 1010 may be similar to a multi-connection phone plug (e.g., TRS plug) or bantam-type plug. As shown, plug 1010 includes a plurality of electrically isolated segments 1012a through 1012h, each presenting an outer contact surface formed from a conductive material. The segments 1012a through 1012h may each form a separate electrical connection As before, each magnet 1004 of contact assembly 2002 attracts and attach to a corresponding magnet on another contact assembly 1002 of another device to establish electrical connections between the devices through the magnets.

When a top end of plug 1010 (including segments 1012a through 1012d) is received within an interior channel defined by stacked magnets 1004; segment 1012a is in electrical communication with associated magnet 1004a; segment 1012b is in electrical communication with associated magnet 1004b; segment 1012c is in electrical communication with associated magnet 1004c; and segment 1012d is in electrical communication with associated magnet 1004d. Meanwhile, the bottom end of plug 1010 (including segments 1012e through 1012h) may extend into device 100 allowing segments 1012e through 1012h to interconnect with pins of an internal I/O interface of device 100 (FIG. 38).

At the same time, as shown in FIG. 22C, segment 1012a is electrically connected to segment 1012e; segment 1012b is electrically connected to segment 1012f; segment 1012c is electrically connected to segment 1012g; and segment 1012d is electrically connected to segment 1012h. In this way, each magnet 1004 may be connected to a pin of an internal I/O interface of device 100 through plug 1010.

Collectively, magnets 1004 and plug 1010 allow a signal bus to be established through contact assembly 2002. As before, this signal bus may conform to the USB protocol, and each magnet 1004 and interconnected segments of plug 1010 may carry a particular USB signal (VCC, D−, D+, GND), as shown in FIG. 22B.

Figure 23A:
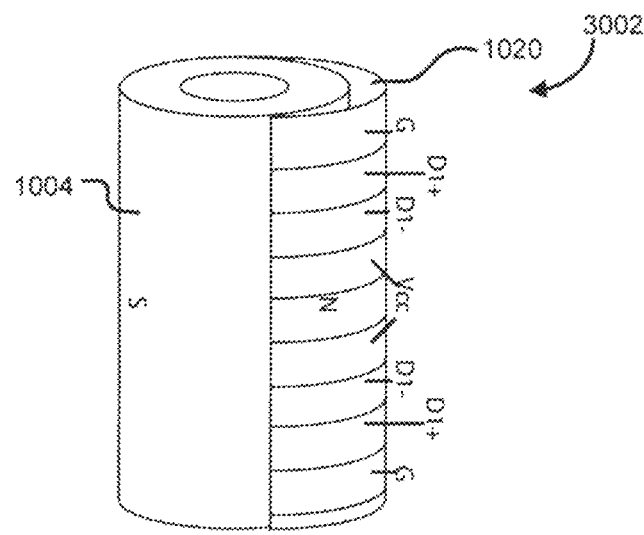
FIG. 23A is a side view of a connector assembly.
Figure 23B:
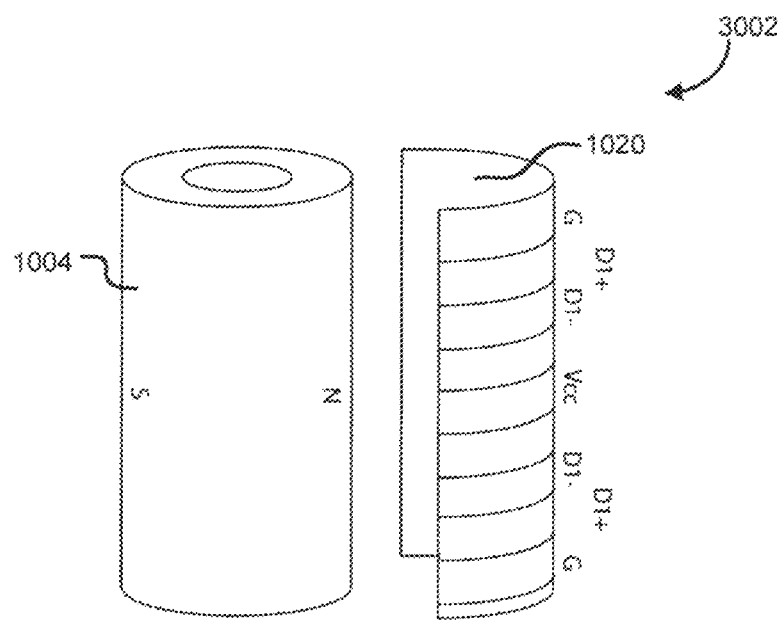
FIG. 23B is an exploded side view of the connector assembly of FIG. 23A.

FIGS. 23A and 23B show a contact assembly 3002, according to another example embodiment, that may also be used in place of contact assembly 1002. Each contact assembly 3002 is adapted to mate with another contact assembly 3002 of another device. When mated, connectors 302 allow two devices to connect both mechanically and electrically. Contact assembly 3002 is cylindrical in shape.

As shown, contact assembly 3002 includes a sleeve 1020 that wraps at least partly around the vertical face of cylindrical magnet 1004. The outer surface of sleeve 1020 presents an array of contacts for carrying signals. When magnet 1004 of contact assembly 3002 attracts and attach to corresponding magnet on a connector of another device, the contacts on sleeve 1020 form electrical connections with corresponding contacts on the connector of the other device.

Sleeve 1020 may be flexible. In an embodiment, sleeve 1020 may be a conventional flexible flat cable (FFC).

Sleeve 1020 may include a coating formed from Teflon or similar material. Such a coating my protect sleeve 1020 from wear and tear during operation. Such a coating may also smoothen rotations of a devices relative to one another about a vertical axis of contact assembly 3002.

At least one end of sleeve 1020 is insertable into an interior of a device such as device 10, for electrical connection with internal components of the device. In some embodiments, sleeve 1020 may wrap substantially or wholly around the vertical face of cylindrical magnet 1004. When sleeve 1020 is wrapped substantially or wholly around the vertical face of magnet 1004, the free ends of sleeve 1020 may unite, and press together to form a single flat cable that is insertable into a device such as device 10.

So, as will be appreciated by those of ordinary skill in the art, the length of sleeve 1020 may be adjusted, to wrap along a desired portion of the vertical face of magnet 1004, and to extend a desired distance into the interior of a device.

In some embodiments, contact assembly 3002 may include a thin shim interposed between sleeve 1020 and magnet 1004 when sleeve 1020 is wrapped around magnet 1004. The shim spans at least the portion of sleeve 1020 expected to contact another device (e.g., by way of a complementary connector on that device). In an embodiment, the shim may be a thin hollow cylinder that sheathes magnet 1004. The shim may be formed of brass. However, the shim could also be formed of another suitable material that is sufficiently malleable to be wrapped around portions of magnet 1004, and is sufficiently rigid to maintain its shape during operation. (e.g., as contact assembly 3002 comes into contact with other connectors). For example, the shim could also be formed of copper. In yet other embodiments, the shim could be formed of another metal, a carbon-based material, a plastic, or a composite material. In operation, the shim serves to spread out mechanical forces over the surface of magnet 1004, and minimizes point loads on magnet 1004. The shim also smoothens rotations of a device 100 relative to an interconnected device about a vertical axis of contact assembly 3002.

In some embodiments, the shim may be integral to sleeve 1020, and may, for example, be provided as a backing or substrate of sleeve 1020. In such embodiments, the shim may serve as a ground plane for sleeve 1020 (e.g., when the shim is formed of copper), and thereby facilitates signal transmission through sleeve 1020. The shim may also provide electromagnetic shielding.

Collectively, the contacts on sleeve 1020 allow a signal bus to be established through contact assembly 3002. As before, this signal bus may conform to the USB protocol, and each may be assigned to carry a USB signal (VCC, D−, D+, GND), as shown in FIGS. 23A and 23B.

Figure 24B:
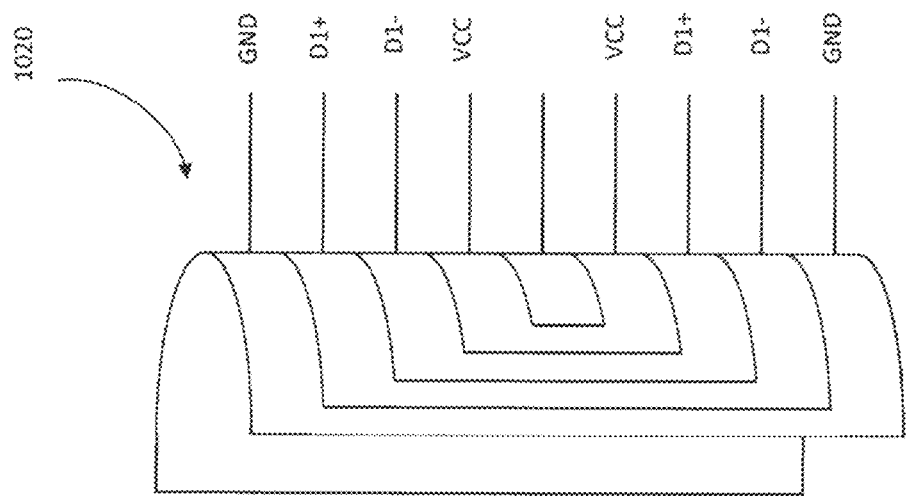
FIGS. 24A and 24B are views of a sleeve of the connector assembly of FIG. 23A.
Figure 24A:
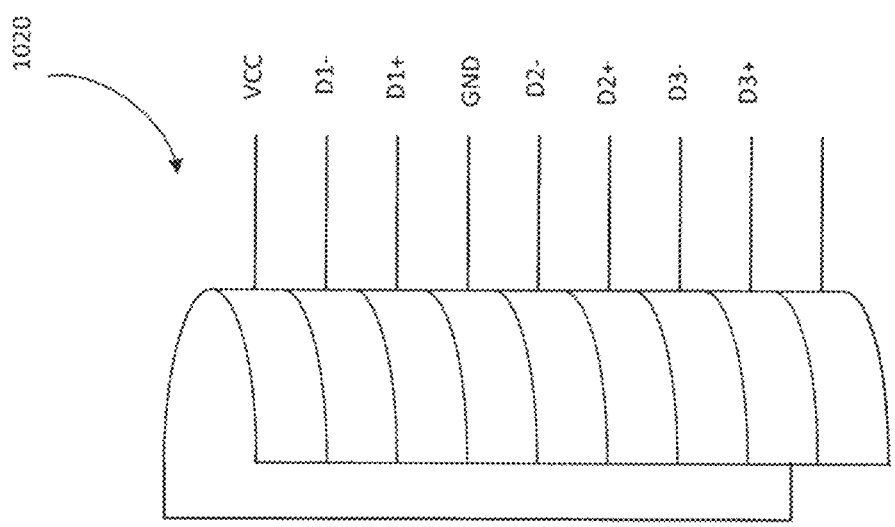

In one arrangement, each contact on sleeve 1020 may be used to carry a particular USB signal (i.e., one of VCC, D1−, D1+, GND, D2−, D2+, D3−, D3+), as shown in FIG. 24A. In this arrangement, three data channels may be provided, namely, D1, D2 and D3.

In another arrangement, the contacts on sleeve 1020 may be paired, and each pair of contacts may be electrically connected and used to carry a particular USB signal (i.e., one of VCC, D−, D+, GND), as shown in FIG. 24B. Further, the USB signals may be assigned to the contacts in a vertically symmetrical order. This redundancy of contacts and vertically symmetry allows contact assembly 3002 to be agnostic to its vertical orientation. In other words, contact assembly 3002 may be mated to another contact assembly 3002 to establish electrical and mechanical connections, regardless of their respective vertical orientations.

Of course, contact assemblies 1002 and 2002 may also be modified to have a similar redundancy and vertical symmetry of contacts (i.e., magnets 1004), to thereby provide connectors that are agnostic to their vertical orientation.

The cylindrically shaped connectors described herein (e.g., contact assemblies 1002, 2002, 3002, and 300) allow device 100 to be rotated about a vertical axis of the connector when connected to another device by way of that connector. This allows the orientation of device 100 to be adjusted relative to connected devices, without interrupting the mechanical or electrical connections therebetween. Embodiments of the cylindrically shaped connectors described herein (e.g., contact assemblies 1002, 2002, and 3002) may be genderless, and may mate with a like cylindrically shaped connectors.

In other embodiments, the cylindrically shaped connectors described herein may be modified to adhere to a protocol/connector pin-out format other than USB or to adhere to a custom protocol/connector pin-out format.

In some embodiments, magnet 1004 (FIGS. 23A and 23B) of contact assembly 3002 may be replaced by a stack of cylindrical magnets 2004.

More than two devices may be interconnected. For example, the number of devices that be interconnected may be limited by total current draw of the devices, and the ability of particular protocols to uniquely identify interconnected devices. Various combinations of disparate devices may be interconnected. Moreover, in some embodiments, multiple connections could be formed between two devices. For example, in the case of devices with connectors at each corner, devices may be placed side-by-side, with two pairs of corners abutting one another. Connectors at each pair of corners may form connections. By way of example, multiple connections may be used for multiple data lanes, increasing data bandwidth between devices, or one connector could be used for data transmission and one for power transmission.

Although the disclosure has been described and illustrated with respect to exemplary arrangements and embodiments with a certain degree of particularity, it is noted that the description and illustrations have been made by way of example only. Numerous changes in the details of construction and combination and arrangement of parts and steps may be made.

What is claimed is:

1. A connector for an electronic device, comprising:
   a housing having a peripheral surface;
   a longitudinal cavity defining a longitudinal path within said housing, said longitudinal path extending between a first extremity withdrawn from said peripheral surface and an opposite second extremity; and
   a magnetic assembly received in said longitudinal cavity of said housing, said magnetic assembly being longitudinally movable from a retracted position at said first extremity to an extended position at said second extremity, a magnetic bias magnetically biasing said magnetic assembly toward said first extremity of said longitudinal path, the magnetic assembly being movable to the second extremity against said magnetic bias, upon a complementary connector of an adjacent electronic device magnetically attracting said magnetic assembly.

2. The connector of claim 1 further comprising a block towards which said magnetic assembly is magnetically biased.

3. The connector of claim 2 wherein said magnetic assembly and said block bias said magnetic assembly into said retracted position within said connector such that when said connector is brought into engagement with said complementary connector, magnetic attraction between said connectors overcomes said magnetic bias provided by said block and causes said magnetic assembly to move along said longitudinal path toward said peripheral surface of said housing, said magnetic assembly thereby moving to said extended position within said connector, and such that when said connectors are disconnected from one another, said magnetic bias between the magnetic assembly and said block moves said magnetic assembly back to said retracted position.

4. The connector of claim 2 wherein said block is a ferrous block.

5. The connector of claim 2 wherein said block is a biasing magnet disposed at a rear wall of said housing in said longitudinal cavity.

6. The connector of claim 2 wherein said block is a stop at a rear wall of said housing in said longitudinal cavity.

7. The connector of claim 2 wherein said block is spaced apart from said second extremity of said longitudinal path.

8. The connector of claim 7 wherein said block is longitudinally spaced-apart from said second extremity of said longitudinal path.

9. The connector of claim 1 wherein said second extremity of said longitudinal path protrudes from said peripheral surface.

10. The connector of claim 9 wherein said magnetic assembly has a portion protruding from said peripheral surface of said housing in said extended position, said protruding portion having a rounded end in the shape of a semi-cylinder being rotatable relative to said complementary connector of said adjacent connector.

11. The connector of claim 1 wherein said magnetic assembly is T-shaped, has a crossbar portion and a stem portion, a portion of said peripheral surface of said housing mechanically preventing said crossbar portion from longitudinally moving farther than a predetermined position along said longitudinal path when said magnetic assembly is moved toward said second extremity of said longitudinal path.

12. The connector of claim 1 wherein said magnetic assembly comprises a plurality of core magnets.

13. An electronic device comprising the connector of claim 1.

14. A method of connecting first and second electronic devices, said first electronic device having a connector having a magnetic assembly being longitudinally movable along a longitudinal path extending between a first extremity withdrawn in said first electronic device and a second extremity, the method comprising:
   the magnetic assembly being magnetically biased towards the second extremity;
   positioning the connector of said first electronic device adjacent a connector of said second electronic device, the connector of said second electronic device magnetically moving said magnetic assembly along said longitudinal path toward said second extremity against said magnetic bias; the first and second electronic device being magnetically attracted to one another thereafter.

15. The method of claim 14 further comprising removing first second electronic device from said second electronic device; and, said magnetic bias magnetically drawing said magnetic assembly back to said first extremity of said longitudinal path subsequently to said removal.

16. The method of claim 14 further comprising a portion of said first electronic device mechanically preventing said magnetic assembly from longitudinally moving farther than a predetermined position along said longitudinal path when said magnetic assembly is moved toward said second extremity of said longitudinal path.

17. The method of claim 14, further wherein the magnetic bias between the magnetic assembly and the second extremity is exerted between the magnetic assembly and a block positioned beyond the second extremity.

\* \* \* \* \*